(12) United States Patent
Stivers

(10) Patent No.: US 9,162,169 B1
(45) Date of Patent: Oct. 20, 2015

(54) FLEXIBLE FILTER HAND BAGS FOR CATCH BASINS

(71) Applicant: Guy Alan Stivers, Tustin, CA (US)

(72) Inventor: Guy Alan Stivers, Tustin, CA (US)

( * ) Notice: Subject to any disclaimer, the term of this patent is extended or adjusted under 35 U.S.C. 154(b) by 312 days.

(21) Appl. No.: 13/831,896

(22) Filed: Mar. 15, 2013

Related U.S. Application Data

(63) Continuation-in-part of application No. 13/764,738, filed on Feb. 11, 2013.

(60) Provisional application No. 61/696,163, filed on Sep. 1, 2012.

(51) Int. Cl.
*B01D 35/28* (2006.01)
*B01D 29/27* (2006.01)
*C02F 3/32* (2006.01)
*B01D 29/00* (2006.01)

(52) U.S. Cl.
CPC ............ *B01D 35/28* (2013.01); *B01D 29/0029* (2013.01); *B01D 29/27* (2013.01); *C02F 3/32* (2013.01)

(58) Field of Classification Search
CPC .......... B01D 29/0029; B01D 29/0034; B01D 29/0036; B01D 29/0063; B01D 35/28; C02F 3/32
USPC ................................................ 210/602, 448
See application file for complete search history.

(56) References Cited

U.S. PATENT DOCUMENTS

| 4,013,559 | A | 3/1977 | Johnson |
| 4,419,232 | A | 12/1983 | Arntyr et al. |
| 5,030,343 | A | 7/1991 | Urriola |
| 5,037,541 | A | 8/1991 | Ruey-Jang et al. |
| 5,269,094 | A | 12/1993 | Wolverton et al. |
| 5,322,629 | A | 6/1994 | Stewart |
| 5,372,714 | A | 12/1994 | Logue, Jr. |
| 5,511,904 | A | 4/1996 | Van Egmond |
| 5,618,428 | A | 4/1997 | Oslund |
| 5,707,527 | A | 1/1998 | Knutson et al. |
| 5,720,574 | A | 2/1998 | Barella |
| 5,788,409 | A | 8/1998 | Johnson |
| 5,810,510 | A | 9/1998 | Urriola |
| 6,149,803 | A | 11/2000 | DiLoreto, Jr. et al. |
| 6,241,882 | B1 | 6/2001 | Allard |
| 6,277,274 | B1 | 8/2001 | Coffman |
| 6,334,953 | B1 | 1/2002 | Singleton |
| 6,527,477 | B1 | 3/2003 | Allard |
| 6,551,023 | B2 | 4/2003 | Allard |
| 6,562,233 | B1 | 5/2003 | Schilling et al. |

(Continued)

FOREIGN PATENT DOCUMENTS

GB 1136530 * 12/1968
WO WO2009030896 3/2009

OTHER PUBLICATIONS

"Shaping the Future of Water Quality", Cudo Water Storage System advertising brochure, Santa Rosa, CA 95407.

(Continued)

*Primary Examiner* — Fred Prince
(74) *Attorney, Agent, or Firm* — Alford Law Group, Inc.

(57) ABSTRACT

Various embodiments of a modular catch basin for implementation in a high performance bioswale are disclosed. The modular catch basin containing bio-media in bio-media filters to treat urban run-off. Method of installing and maintaining the modular catch basin are also disclosed.

18 Claims, 36 Drawing Sheets

(56) References Cited

U.S. PATENT DOCUMENTS

| | | |
|---|---|---|
| 6,641,335 B1 | 11/2003 | Allard |
| 6,648,549 B1 | 11/2003 | Urriola |
| 6,733,209 B2 | 5/2004 | Allard |
| 6,779,946 B1 | 8/2004 | Urriola et al. |
| 6,869,528 B2 | 3/2005 | Pank |
| 6,872,029 B2 | 3/2005 | Allard et al. |
| 6,875,350 B2 | 4/2005 | Allard |
| 6,905,599 B2 | 6/2005 | Allard |
| 6,976,808 B2 | 12/2005 | Allard |
| 6,986,621 B2 | 1/2006 | Allard |
| 7,014,782 B2 | 3/2006 | D'Emidio et al. |
| 7,040,838 B2 | 5/2006 | Allard et al. |
| 7,056,058 B2 | 6/2006 | Urriola et al. |
| 7,165,913 B2 | 1/2007 | Allard et al. |
| 7,182,874 B2 | 2/2007 | Allard et al. |
| D539,923 S | 4/2007 | Urriola |
| D539,924 S | 4/2007 | Urriola |
| D555,809 S | 11/2007 | Urriola |
| 7,374,364 B2 | 5/2008 | Allard et al. |
| D571,023 S | 6/2008 | Urriola |
| D596,698 S | 7/2009 | Urriola |
| D596,699 S | 7/2009 | Urriola |
| 7,686,540 B2 | 3/2010 | Urriola |
| 7,897,047 B2 | 3/2011 | Wanielista |
| 7,985,335 B2 | 7/2011 | Allard |
| 2002/0113025 A1 | 8/2002 | Gauldin et al. |
| 2004/0011731 A1 | 1/2004 | Sanguinetti |
| 2004/0173522 A1 | 9/2004 | Allard |
| 2005/0109693 A1 | 5/2005 | Allard |
| 2005/0184007 A1 | 8/2005 | Allard et al. |
| 2006/0060523 A1 | 3/2006 | Kerns |
| 2006/0078387 A1 | 4/2006 | Allard et al. |
| 2006/0133897 A1 | 6/2006 | Allard et al. |
| 2007/0199869 A1 | 8/2007 | Al-Assfour |
| 2007/0274784 A1 | 11/2007 | Allard et al. |
| 2008/0056625 A1* | 3/2008 | Stanton et al. .............. 383/104 |
| 2008/0073277 A1 | 3/2008 | Paoluccio et al. |
| 2008/0251448 A1 | 10/2008 | Kent |
| 2008/0251470 A1* | 10/2008 | Kent ........................... 210/791 |
| 2009/0101553 A1 | 4/2009 | Lucas |
| 2009/0250405 A1 | 10/2009 | Allard |
| 2009/0279953 A1 | 11/2009 | Allard et al. |
| 2010/0200480 A1 | 8/2010 | Kania |
| 2010/0206790 A1 | 8/2010 | Holtz |
| 2011/0011780 A1 | 1/2011 | Izumo |
| 2011/0094153 A1 | 4/2011 | Urriola |
| 2011/0147303 A1 | 6/2011 | Allard |
| 2011/0278237 A1 | 11/2011 | McInnis |
| 2011/0284442 A1* | 11/2011 | Williams ................. 210/170.09 |
| 2012/0031854 A1 | 2/2012 | Allard |
| 2012/0091057 A1 | 4/2012 | Kent et al. |
| 2012/0132581 A1 | 5/2012 | Williams et al. |
| 2012/0145612 A1 | 6/2012 | McInnis et al. |
| 2012/0152827 A1 | 6/2012 | Allard |
| 2013/0001158 A1 | 1/2013 | Condon et al. |
| 2013/0299435 A1 | 11/2013 | Coffman et al. |
| 2014/0138307 A1 | 5/2014 | Coffman et al. |

OTHER PUBLICATIONS

"Cudo General Field Installation Guide" Cudo Water Storage System manual. rev 11-12, Santa Rosa, CA 95407.

"The Stormwater Opportunity", Douglass Allard, Jon McDonald, Vivian Volz, the construction specifier, Nov. 2010.

Norris. Clare A.; U.S. Appl. No. 13/831,859; Office Action mailed May 4, 2015, 28 pages.

Prince Jr., Freddie Gary; U.S. Appl. No. 14/017,224; Office Action mailed Jun. 18, 2015 11 pages.

* cited by examiner

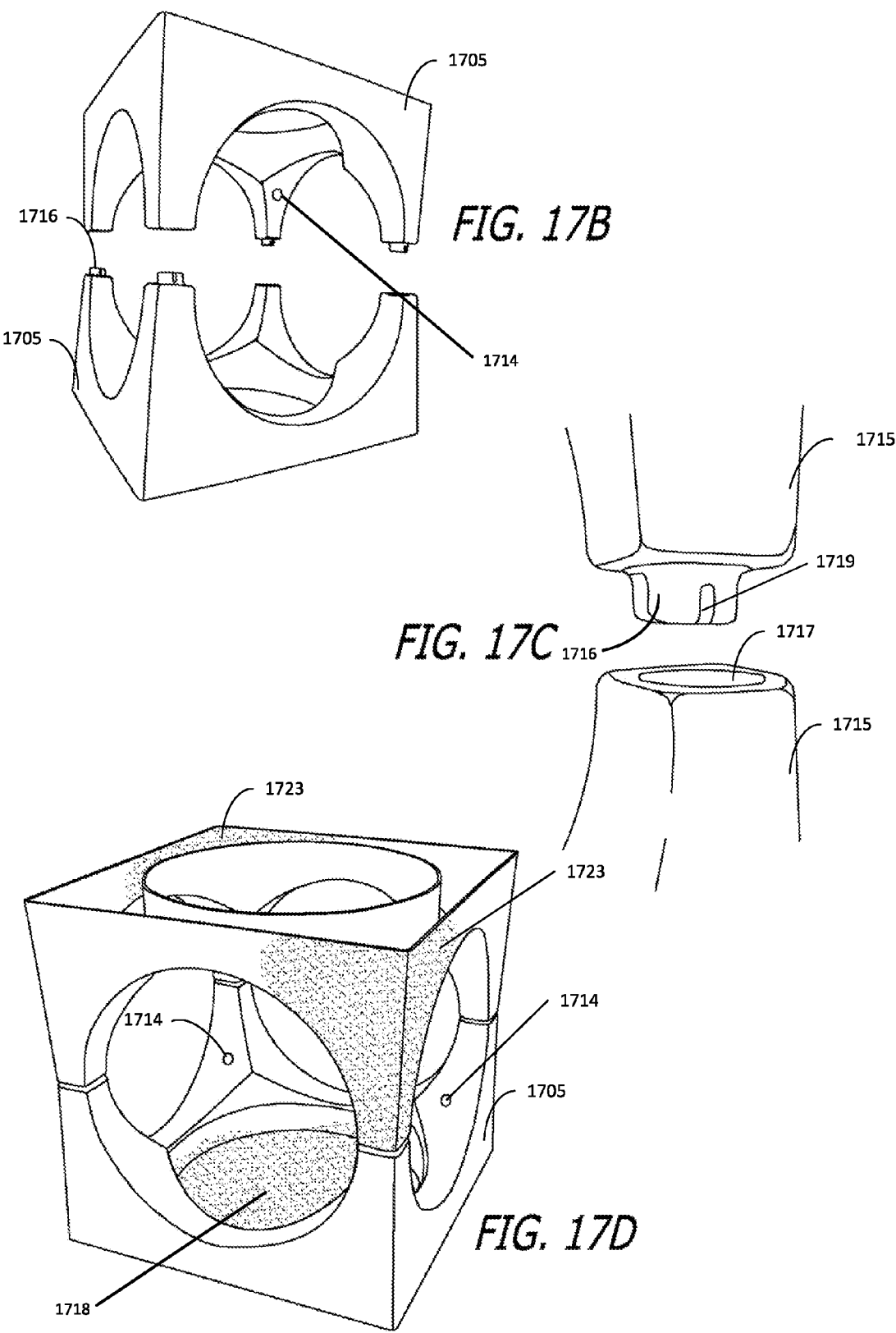

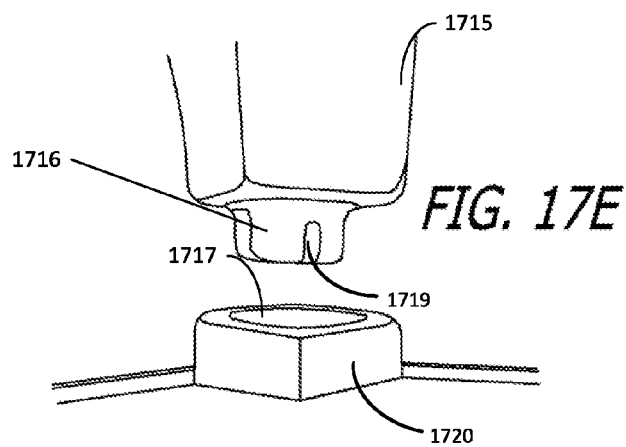
FIG. 17E
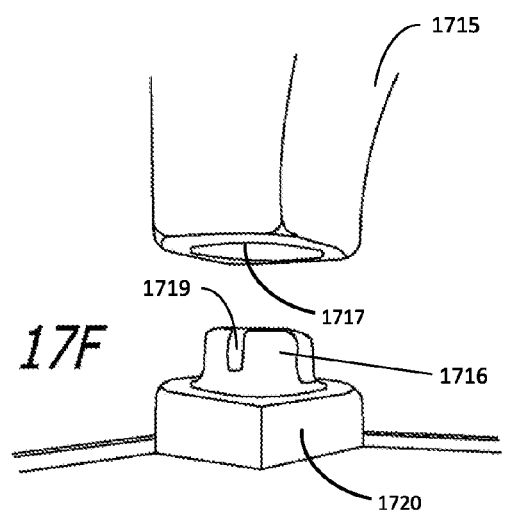
FIG. 17F
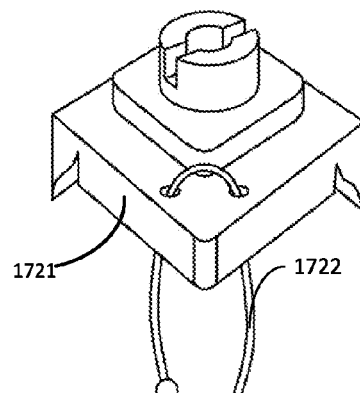
FIG. 17G
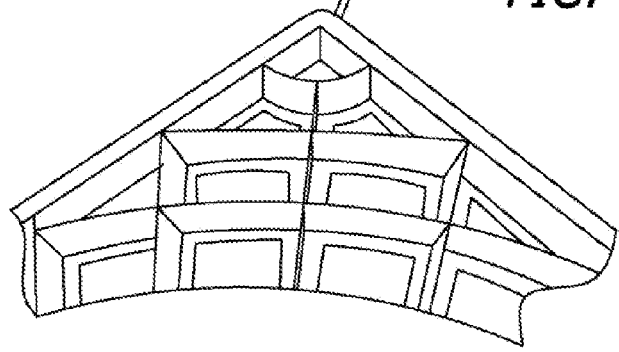

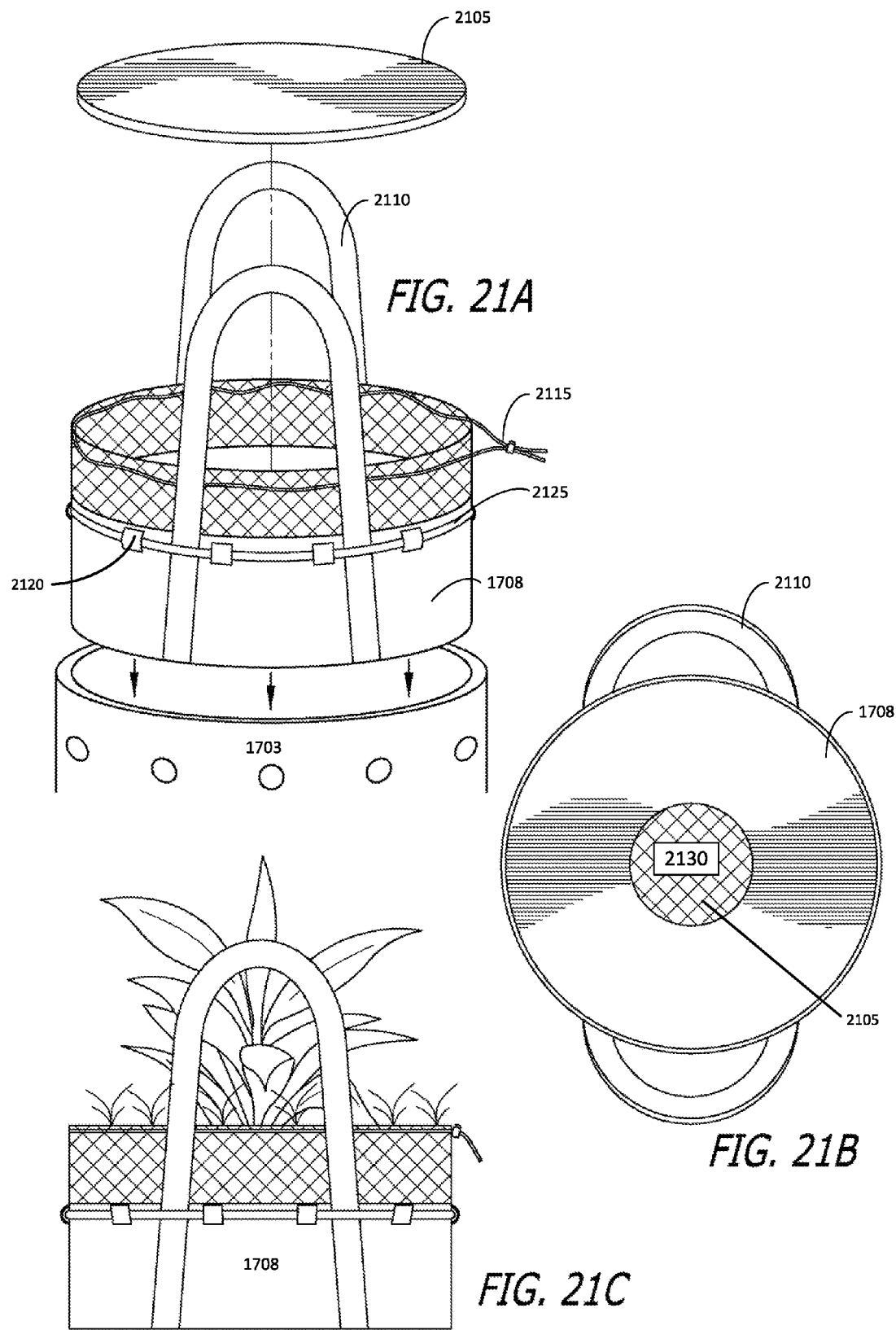

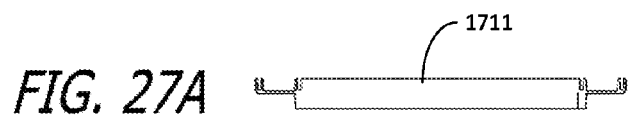
FIG. 27A
FIG. 27B
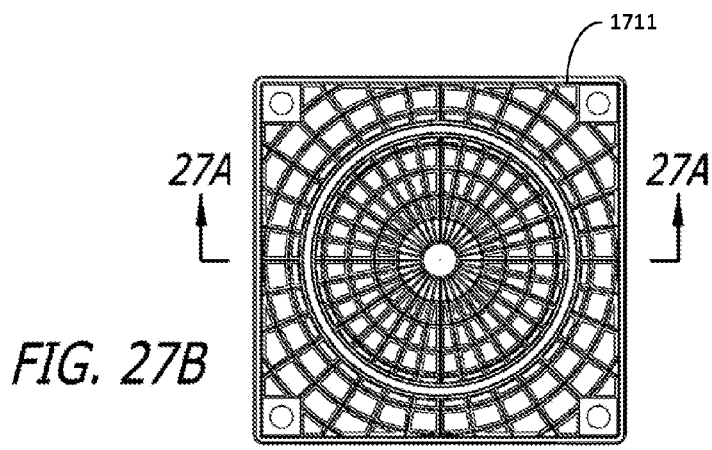
FIG. 28A
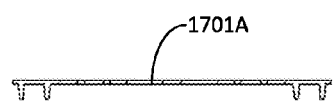
FIG. 29A
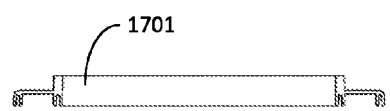
FIG. 28B
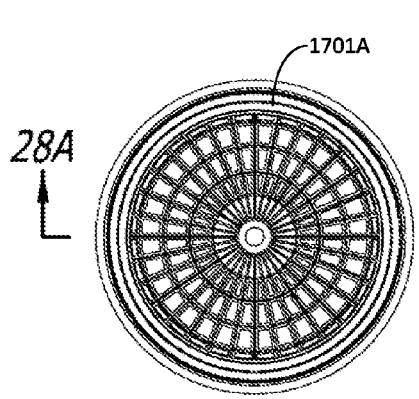
FIG. 29B
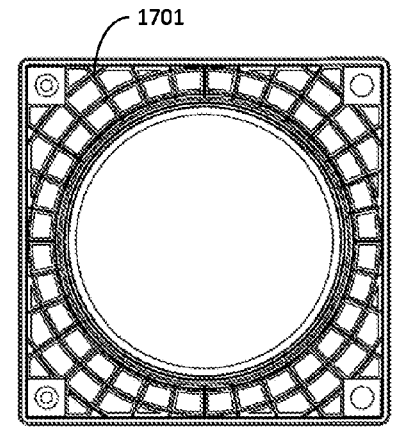

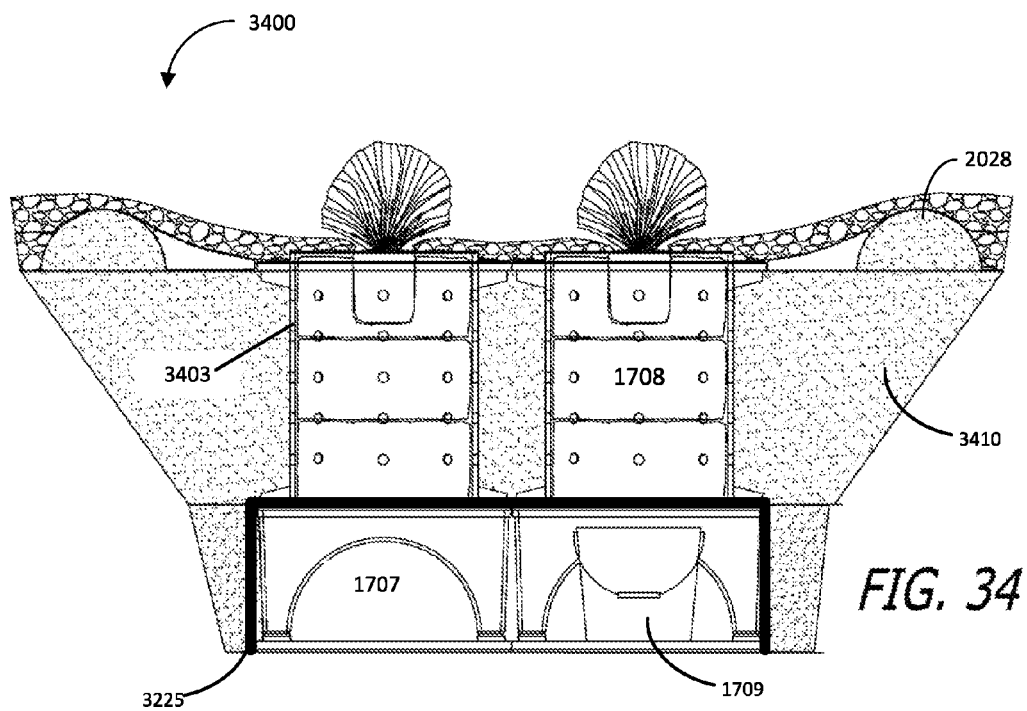
FIG. 34
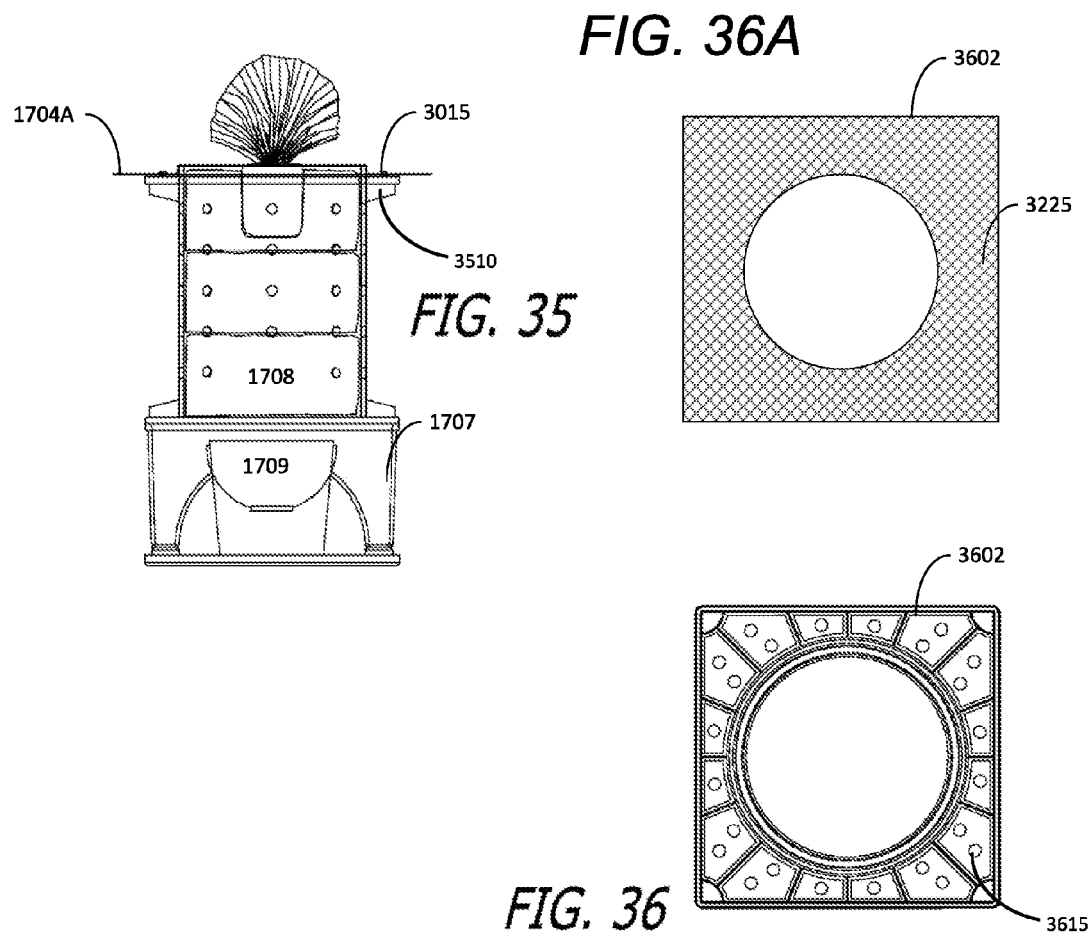
FIG. 35
FIG. 36A
FIG. 36

FLEXIBLE FILTER HAND BAGS FOR CATCH BASINS

CROSS REFERENCE TO RELATED APPLICATIONS

This non-provisional United States (U.S.) patent application claims the benefit of and is a continuation-in-part of U.S. patent application Ser. No. 13/764,738 filed on Feb. 11, 2013 by inventor Guy Alan Stivers, entitled SYSTEM AND METHOD FOR A MODULAR HIGH PERFORMANCE BIOSWALE. This non-provisional United States (U.S.) patent application further claims the benefit of U.S. Provisional Patent Application No. 61/696,163 entitled MODULAR HIGH PERFORMANCE BIOSWALE AND WATER TREATMENT SYSTEM AND METHOD filed on Sep. 1, 2012 by inventor Guy Alan Stivers et al., which is incorporated herein by reference as another example of a high performance bioswale with modular catch basins.

TECHNICAL FIELD OF THE INVENTION

The embodiments of the invention generally relate to catch basins for capturing and treating water.

COPYRIGHT & TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Current methods that utilize an on site bioswale technique are highly inefficient and tend to rapidly become ineffective due to deferred maintenance and other issues. To illustrate this point, it is helpful to understand how a typical bioswale functions in order to treat contaminated water.

During a storm event, rain falls on urban development that is composed of approximately 70% impermeable surfaces (paving, roads, buildings, etc.) and 30% permeable surfaces (grasses, shrubs, and landscapes in general). These surfaces, especially the impermeable ones, are heavily laden with contaminants such as hydrocarbons, metals, bacteria, nitrogen, phosphorous nutrients, silt, debris, herbicides, insecticides, and pesticides. Currently, rain washes these surfaces directly into municipal stormwater management systems where it ends up fouling waterways and oceans. One method of removing these various contaminants is to channel the contaminated water into a landscaped structure commonly known as a bioswale.

With more urban development has come more regulation. In the past 20 years, laws have been passed requiring that runoff from paved areas drain into adjacent landscape bioswales where it is mitigated by soil and plant biology, allowing some of it to infiltrate soils and most of it to drain to municipal stormwater management systems. A typical bioswale is a vegetated depression in the landscape that channelizes stormwater for filtration of contaminants prior to drainage into the municipal stormwater system. This setup poses some serious problems however, as discussed below.

The typical bioswale requires an extraordinary amount of maintenance to maintain its effectiveness at removing contaminants from stormwater. Over the course of many rainfalls, the bioswale fills with heavily polluted silts that cause the bioswale's biological system, primarily soil biology and vegetation, to fail. To adequately maintain the bioswale, it is required that the polluted silts be removed from the bioswale once or twice per year. This is a very expensive and labor intensive process, and usually consists of removing the top 1"-2" of soil and vegetation from the entire length of the bioswale. It may also be necessary to modify the irrigation system. Other issues related to this burdensome process include soil preparation, revegetation, and disposal of polluted debris. In other words, the bioswale has to be rebuilt periodically to maintain its effectiveness. Few bioswales are maintained to this level. However, stormwater quality legislation requires that many current and future bioswales be adequately maintained for effectiveness. Thus there is a need in the art for a high performance modular bioswale system for treatment of runoff water that is highly effective yet relatively easy to construct and maintain. It is to these ends that the embodiments of the invention have been developed.

SUMMARY OF THE INVENTION

The embodiments of the invention are summarized by the claims that follow below. Insofar as a summary is required, the embodiments of the invention may be generally described as a modular catch basin for filtering storm water or urban run-off. The modular catch basin and surrounding high performance bioswale uses pond liners instead of pipes so there is less clogging. The pond liner is easily maintained and captures surface flow more readily than pipes or other means currently in use.

The modular catch basin is novel in that it uses a gravity flow filtration system versus forcing water through a filter. No expensive, high maintenance, high energy cost pumps are needed for filtering. Pumps may be used to pump water from the cisterns for irrigation. The use of a solar pump is possible.

The modular catch basin system uses one or more bio-media filters to filter the storm water. Run-off is channeled by pond liners towards the modular catch basin, where the run-off falls through the one or more bio-media filters. The bio-media filters are uniquely adapted to exchange gases with the environment. Air is needed for biology to remove pollutants. Trap gas must be vented and exchanged for oxygen. Methane, a common organic gas, must be released as it is toxic to grass plant and other biology used in the bio-media filter.

The modular catch basin is also ingeniously constructed to be installed and maintained by landscape professionals with minimal use of civil engineers.

BRIEF DESCRIPTION OF THE DRAWINGS

Elements in the Figures may not be drawn to scale in order to enhance their clarity and improve understanding of these elements and embodiments of the invention. Furthermore, elements that are known to be common and well understood to those in the industry may not be depicted in order to provide a less obstructed view of the various embodiments of the invention.

FIG. 17B is a perspective view of upper and lower hollow support structures.

FIG. 17C is a magnified perspective view of the complimentary legs of two hollow support structures.

FIG. 17D is a perspective view of upper and lower hollow support structures joined to form a filtration housing.

FIG. 17E is a magnified perspective view of the leg (with a peg end) of a hollow support structure above a complementary mounting corner receptacle.

FIG. 17F is a magnified perspective view of the leg (with a receptacle end) of a hollow support structure above a complementary mounting corner peg.

FIG. 17G is a magnified perspective view of a snap in mounting corner above the corner of a grate.

FIG. 21A is a perspective view of an open bio-media filter.

FIG. 21B is a plan view of an open bio-media filter.

FIG. 21C is a side view of a bio-media filter with optional vegetation.

FIGS. 27A-27B are side and plan view of a bottom grate for the modular catch basin.

FIGS. 28A-28B are side and plan views of a top grate mountable to the perforated hollow cylinder of the forbay catch basins.

FIGS. 29A-29B are side and plan views of another embodiment of a top grate mountable to the perforated hollow cylinder and the hollow modular cube structural housing of the detention catch basins.

FIG. 34 is side view of an embodiment of the invention depicting an exemplary catch basin without a filtration housing.

FIG. 35 is side view of an exemplary catch basin with drainage shoulders.

FIG. 36 is a plan view of an exemplary connector ring with perforations.

FIG. 36A is a plan view of an exemplary connector ring with perforations wrapped in a filter fabric.

DETAILED DESCRIPTION

In the following discussion that addresses a number of embodiments and applications of the embodiments of the invention, reference is made to the accompanying drawings that form a part hereof, where depictions are made, by way of illustration, of specific embodiments in which the invention may be practiced. It is to be understood that other embodiments may be utilized and changes may be made without departing from the scope thereof.

Figure 1:
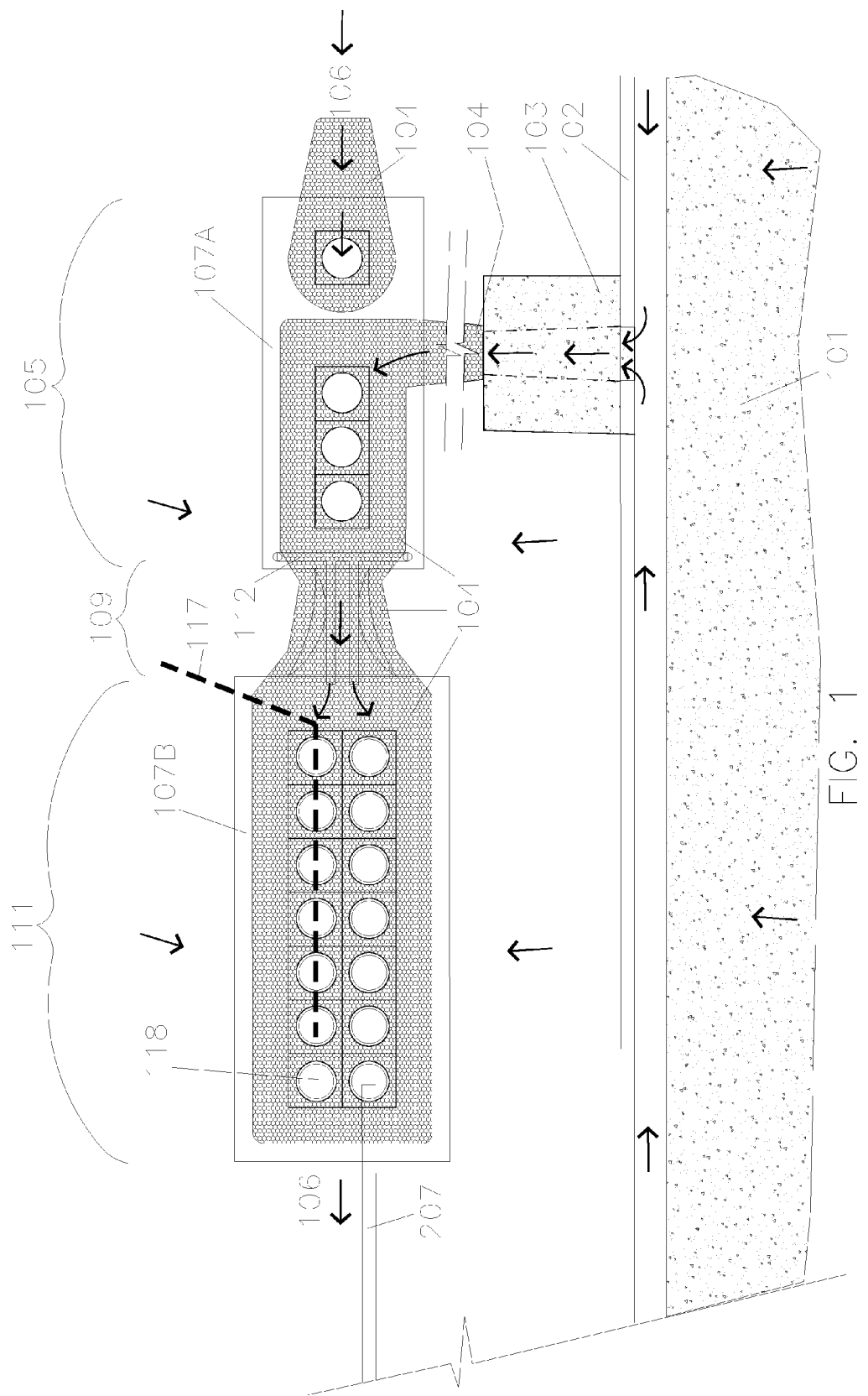
FIG. 1 is a top plan view of a preferred embodiment of a high performance bioswale system, depicting its primary components including a forebay and a primary detention basin.
Figure 2:
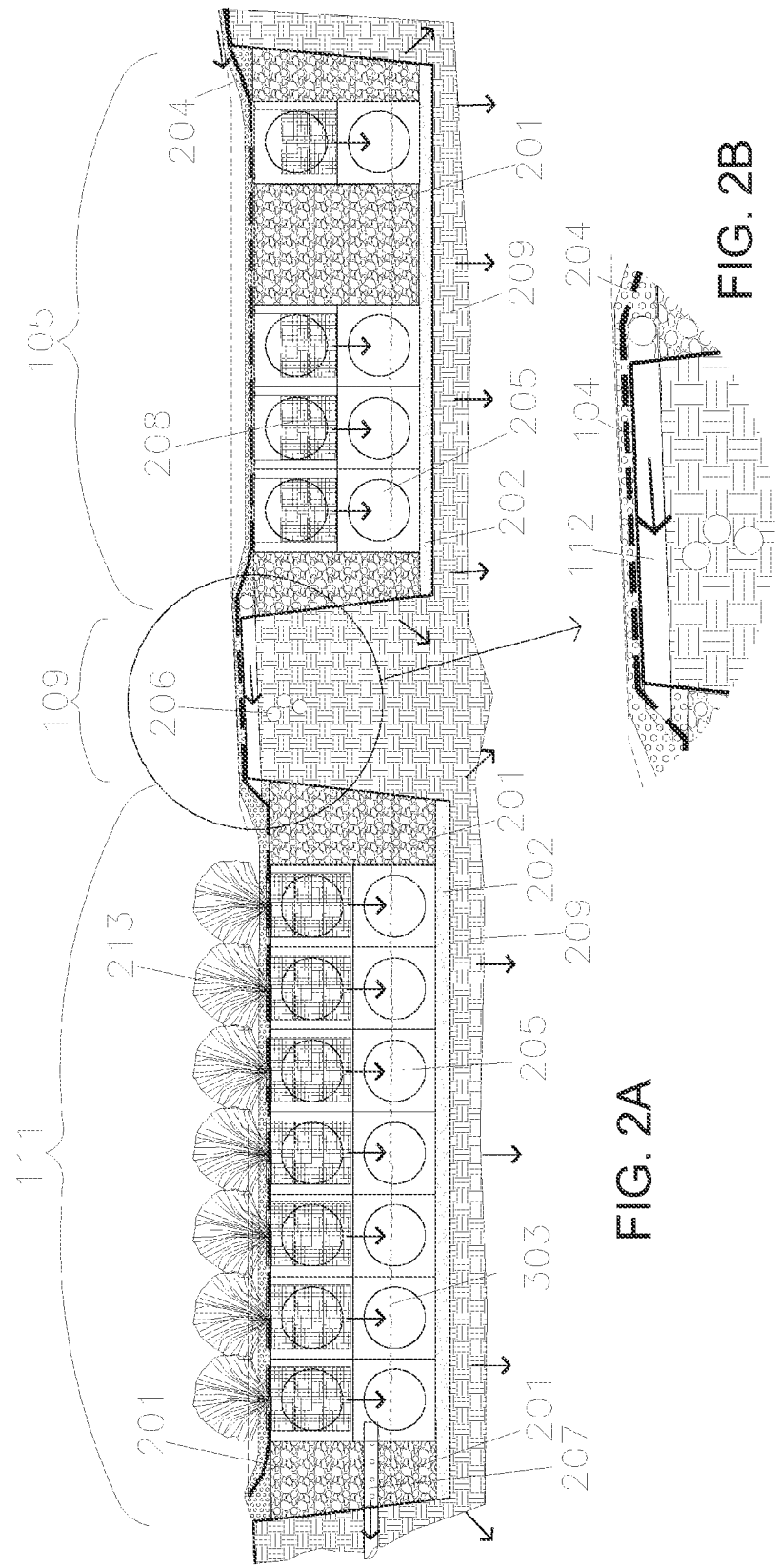
FIG. 2A is a longitudinal cross sectional view of a high performance bioswale system.
FIG. 2B is a magnified view of a drainage pipe depicted in FIG. 2A.

FIG. 1 illustrates an exemplary embodiment depicting a top-plan view of the high performance bioswale system 100 (note however, that "system 100" generally refers to all embodiments). FIG. 2 illustrates a longitudinal cross section of FIG. 1. FIG. 1 and FIG. 2 will be discussed extensively with one another for ease of transmitting the scope of the system 100 to the reader. System 100 is modular in nature, and can be adjusted and sized to varying dimensions and settings as will be explained in further detail throughout these descriptions and various embodiments.

Water Inflow to System

System 100 may be situated near a paved area 101, such as a driveway, an asphaltic concrete parking lot, or other similar type of area. Adjacent the paved area 101 is a curb 102, such as a concrete curb, separating the paved area 101 from a landscaped/planting area. Integrated with the curb 102 is a drainage channel 103, such as a concrete drainage channel, that may already exist on curb 102, or that may be constructed into curb 102 and located proximate to system 100. Typically, water runoff, also termed as urban runoff or stormwater runoff, from rain or other urban sources, will flow down around paved area 101 and down along curb 102 and into drainage channel 103. For ease of clarification, the water from paved area 101 will hereinafter be referred to as urban runoff. An example of the typical water flow from urban runoff is illustrated with the various arrow indicators in FIG. 1 with respect to paved area 101, curb 102 and drainage channel 103.

Once urban runoff flows through drainage channel 103, it will flow into pond-lined channel 104. Pond-lined channel 104 collects and fluidly conveys urban runoff from drainage channel 103 to forebay 105. Pond-lined channel 104 also collects and fluidly conveys landscape runoff (which may be stormwater, grey water, etc. but for ease of reference will be referred to simply as landscape runoff) to forebay 105, such as from a preexisting landscape swale 106. Pond-lined channel 104 may be formed with a pond liner material as well as a non-woven geotextile underlayment material for purposes of securing a watertight barrier. In one embodiment, pond-lined channel 104 may be formed with a pond liner of a 45-mil Ethylene Propylene Diene Monomer ("EPDM") material without limiting the scope of the system 100. After urban runoff flows into drainage channel 103, pond-lined channel 104 directs urban runoff to forebay 105. Pond-lined channel 104 also directs landscape runoff to forebay 105.

Pond-lined channel 104 is able to move large volumes of surface water with ease allowing for fast waterflow rates. Further, pond-lined channel 104 alleviates the need to use other mechanisms for directing runoff to a bioswale, such as piping mechanisms that are often used in the industry. The use of piping requires labor-intensive installation as well as frequent maintenance for clogging issues, and can only withstand a certain amount of water flow rate and volume.

Pond-lined channel 104 may be covered with decorative rock 204. The primary function of decorative rock 204 is to serve as a ballast to provide form. Decorative rock 204 also serves to provide water displacement so that runoff may flow evenly into the catch basins of forebay 105. A tertiary function of decorative rock 204 is to provide an initial silt and large debris filtration layer to increase the overall effectiveness of the water flow to system 100. Finally, decorative rock 204 also has aesthetic appeal with the surrounding environment and may be easily manipulated by landscape personnel who may service system 100 on a periodic basis.

Forebay

Once urban and landscape runoff (hereinafter referred to simply as runoff, unless otherwise indicated) has passed onto pond-lined channel 104, its flow is directed to forebay 105 of system 100, which serves to give runoff a pretreatment. In so constructing forebay 105 of system 100, forebay excavation 107A area may first be excavated with a backhoe, for example. This area is adapted to receive forebay 105 components and acts as a surrounding enclosure. The forebay excavation 107A area is then lined with a filter fabric in order to reduce siltation and maintain water holding capacity. The filter fabric enclosure also assists in prolonging the life and use of forebay 105. Sand base 202, may thereafter be installed, leveled and enclosed in filter fabric to keep sand from migrating in excess into surrounding soils. Sand base 202 serves to maintain a generally level base for the components of forebay 105. Once laid, the other components of forebay 105 may be installed, including lower detention basin 205 and the catch basins and other components, which are depicted in FIG. 1 as circles within squares in both forebay 105 and primary detention basin ("PDB") 111. The excess space of 107A may then be backfilled with gravel 201, which may be 1.5" in size and serve as a natural filtrating element and water containment of system 100. Pond-lined channel 104 may thereafter be placed and topped with decorative rock 204.

Once in place, forebay 105 acts as an entry point for runoff via guidance by pond-lined channel 104. Forebay excavation 107A may act more specifically as an entry point for landscape runoff that may not be channeled by pond-lined channel 104. As depicted in FIG. 1, this is one reason pond-lined channel does not extend to the outer edges of forebay excavation 107A. However, this should not be considered as a limitation and may be modified for other purposes, as will be discussed below. For this purpose, however, landscape runoff is generally considered as pretreated water and does not require the level of treatment as that required by urban runoff, thus it is not an absolute requirement that it flow through the catch basins of forebay 105.

Runoff that is directed to the catch basins of forebay 105 will first pass over pond-lined area of forebay 105 which may be covered with a layer of decorative rock 204. Decorative rock 204 however, serves many purposes beyond the aesthetic. Decorative rock 204 may be 5" in depth and serve to capture additional silt and larger debris from water entering forebay 105. Large debris is also separated from the fine silts, metals, hydrocarbons, nutrients and contaminants in the runoff which may be directed toward the forebay 105 catch basins for sequestering. Decorative rock 204 also may act to assist in displacing stormwater evenly into the cylinders of forebay 105 catch basins. Additionally, decorative rock 204 covers drain down grommets (not depicted in FIG. 1, see FIG.

20A for example, but located near the outside edges of each catch basin) as well as any irrigation lateral lines and emitters that may be present. It may also be used as mulch surrounding grass plants 213.

After passing through decorative rock 204, runoff will then flow toward forebay 105 catch basins. In an exemplary embodiment of system 100, forebay 105 may contain three catch basins for urban runoff and one catch basin for landscape runoff Each of the catch basins is placed next to each other in a row in the direction of water flow, and is situated generally parallel to the length of the bioswale area. The catch basins serve to receive runoff directed from drainage channel 103 and landscape swale 106. One reason for the separate catch basins in forebay 105 is that different contaminants may be found in the landscape as compared to urban surfaces such as parking lots and streets, where roughly 75% of contaminants may be washed toward system 100 during the first 15 minutes of a storm. Furthermore, these catch basins may be elevated approximately one inch from pond-lined channel 104 as to allow for even distribution of runoff into the catch basins.

In an exemplary embodiment of system 100, each catch basin of forebay 105 may include a CUDO® cube. A CUDO® cube may have dimensions of 24" cubed with circular openings that are 18" diameter on each of its six sides. The catch basins (or CUDO® cubes) are enveloped with a filter fabric that may be permeable in nature. In another embodiment, the catch basins may be fully or partially wrapped in an impermeable pond liner.

Each catch basin of forebay 105 contains cylinders (discussed in further detail in FIG. 7) that may be placed through the top of a modular cube structural housing and extend through one or more cubes to a bottom grate. In the exemplary embodiment, each cylinder is elevated approximately one inch above pond-lined channel 104 so that runoff displaced by decorative rock 204 may be evenly distributed throughout forebay 105 before entering each of forebay's 105 catch basins. Each cylinder may also be topped with a perforated cap (a top grate) so that runoff may drain through and larger debris separated out before runoff enters the inner area of the cylinders of the catch basins. These cylinders may contain a certain number of bio-media filters 208. Thus, once runoff passes through the perforated cap and into the inner portion of the catch basin cylinder, it will flow onto bio-media filters 208. Bio-media filter 208 may contain a particular bio-media that is suited for the particular purpose of the location of system 100, but primarily to sequester contaminants and give a level of treatment to runoff entering forebay 105. In the exemplary embodiment, forebay 105 catch basin may contain two vertically stacked bio-media filters 208.

Depending on the bio-media filter 208 permeability design and bio-media type, runoff may filtrate therethrough and contaminants may be sequestered in the media allowing a cleaner level of water (pretreated runoff) to pass down through the bottom of bio-media filters 208 of the catch basins and into a lower cistern-like device labeled here as lower detention basin 205. In the depicted embodiment of the system 100, detention basin 205 may also be comprised of a CUDO® cube with dimensions of 24" cubed and circular openings that are 18" diameter on each of its six sides. Depending on the needs of the location, however, other devices may be used as for lower detention basin 205 with varying dimensions such as height, or composed of varying materials. Detention basin 205 may have perforated plastic side grates, and can be wrapped in a filter fabric, which allows for pretreated runoff to move in or out of detention basin 205. Use of a filter fabric around basins 205 also allows for pretreated runoff to safely infiltrate into native soil 209, as represented by the numerous downward pointing arrows depicted in FIG. 2.

Finally, forebay 105 may serve to receive, mitigate and regulate approximately 80 gallons of runoff per minute. Other variations and sizes of forebay 105 may be employed for larger capacities and volumes of water depending on logistics and the location involved. Furthermore, the modular aspect of forebay 105 and its inner components allow for easy accessibility as well as ease of maintenance should bio-media filters 208 need to be cleaned, removed, replaced or silt need to be removed from lower detention basin 205.

Transition Via Drainage Pipe

When forebay 105 fills with pretreated runoff, the pretreated runoff surface level rises to an elevation allowing it to flow via drainage pipe 112 to PDB 111. Drainage pipe 112 may be situated just below the surface of pond-lined weir 109—a part of pond-lined channel 104. In the exemplary embodiment, drainage pipe 112 may be comprised of a perforated pipe situated near the two upper corners of forebay 105 closest to PDB 111, and may be connected to two non-perforated pipes situated parallel to one another extending in the direction from forebay 105 to PDB 111, see FIG. 1. Pretreated runoff may enter drainage pipe 112 on either end of the perforated pipe section or through any of the perforations where it may thereafter be channeled to either of the two non-perforated pipes that are perpendicularly connected to the main entry perforated pipe and are sloped at an angle of not less than 2% leading to PDB 111. Pretreated runoff will exit drainage pipe 112 onto pond-lined channel 104 of PDB 111, see FIGS. 2 and 2A.

Drainage pipe 112 serves as the primary component that moves pretreated runoff from forebay 105 to PDB 111. In the event that drainage pipe 112 fails to serve its function (for example becomes blocked), after pretreated runoff fills forebay 105 it will be channeled to PDB 111 via pond-lined weir 109. In the event that pond-lined weir 109 fails to serve its function, pretreated runoff will nevertheless be guided towards PDB 111 as it is down slope from forebay 105, and in the exemplary embodiment, will be situated within a preexisting swale. For purposes of clarity, however, discussion of the FIGS. hereinafter will only refer to pretreated runoff moving via drainage pipe 112 into PDB 111 area.

Below drainage pipe 112 and pond-lined weir 109 is a soil area between forebay 105 and PDB 111, which may be 4' in width. This will typically be undisturbed native soil 209, but may be used for re-routing existing utility lines or installing irrigation lines to facilitate the surrounding landscape. See e.g. 206.

Primary Detention Basin

In so constructing PDB 111 of system 100, PDB excavation 107B area may first be excavated as with forebay 105. The entire PDB 107B area is then lined with a filter fabric. Sand base 202 is then installed, leveled and enclosed in filter fabric. Once laid, the other components of PDB 111 may be installed, including lower detention basin 205 and the PDB catch basins. The excess void of 107B may then be backfilled with gravel 201, Pond-lined channel 104 may thereafter be placed and secured tightly around each of PDB 111's catch basins and then topped with decorative rock 204, which serves the same purposes as described above with reference to forebay 105.

In an exemplary embodiment, PDB 111 may be comprised of fourteen (14) catch basins, which are lined up in rows of seven (7) and are substantially parallel to each other and the length of system 100. These catch basins are similar to those found in forebay 105, but have notable differences as will be discussed below.

When pretreated runoff from forebay 105 flows through drainage pipe 112 into the PDB 111 area, the cylinder inside each of the fourteen catch basins of PDB 111 is elevated approximately one-inch above the pond-lined channel 104, in accordance with the method used in forebay 105. The elevated cylinders allow for pretreated runoff traveling from drainage pipe 112 to become more evenly distributed throughout PDB 111 before entering each of PDB's 111 catch basins.

The catch basins of PDB 111 contain different contents for purposes of serving as the primary water filtration treatment and may vary depending on the needs of system 100 and the particular location involved. PDB's 111 catch basins also each have a cylinder that may contain three bio-media filters stacked vertically upon one another.

The top bio-media filter 208 is designed to allow for a grass plant 213 to be planted therein so that its roots may grow down through the top of bio-media filter 208 into the middle and bottom of bio-media filters 208. This also allows for maximum biological effectiveness for grass plant 213 growth. Grass plants 213 serve as an additional biological component to filtrate contaminants and contaminates from pretreated runoff. In an exemplary embodiment, use of grass plants 213 in PDB's 111 catch basins may be particularly effective as they have a relatively high "root to shoot" ratio, which provides for substantially more biological activity than shrubs. In particular, grass plants 213 are desirable for use in PDB 111 as their biological properties include being a natural accumulator that can sequester metals as well as metabolize nutrients, hydrocarbons, inorganic materials, and bacteria. Grass plants 213 are also desirable for use in PDB 111 since they are durable, reliable, easy to maintain, and highly tolerant to the effects of various urban conditions. One species of a grass plant 213 that may be used is the vetiver species, which is known as a hyperaccumulator with phytoremediation properties.

Middle and lower bio-media filters 208 may contain a combination of water "polishing" agents such as sandy loam soil (directed to metals sequestration), bio-char (directed to enhance sorption of nutrients), and water purifiers (such as chlorinated tablets for irrigation). Other combinations of bio-media may be utilized in the bio-media filters without deviating from the scope of the embodiments of the invention.

Pretreated runoff filtrates down through each bio-media filter 208 of PDB's catch basins and percolates into lower detention basin 205 as depicted by the various arrows in FIG. 2. Once in lower detention basin 205, water may be considered fully treated. PDB's 111 detention basin 205 may also be comprised of CUDO® cubes, have perforated plastic sidewalls and be wrapped in filter fabric, which allows for treated water to move in or out of detention basin 205. Use of a filter fabric around detention basin 205 also allows for drainage to infiltrate into native soil 209. In other embodiments, a non-permeable pond-liner may be used to contain treated water in basins 205, as will be discussed below. The embodiment employing a non-permeable pond-liner may be useful when treated runoff or other water is used for reuse water. Furthermore, any particular device may be used as a lower basin that may have varying dimensions or properties, and the scope should not be limited to CUDO® cubes. Atlantis® crates may serve the same purpose. They are made of a hardened plastic, have six sides that are completely permeable, are structurally sound, and may just as easily be wrapped in a filter fabric or impermeable pond liner to either detain or retain treated water.

Where filter fabric is wrapped around detention basin 205, however, treated runoff may then pass through the filter fabric, infiltrate into native soil 209, and thereafter into an aquifer. If the water flow is voluminous in nature and the treated water level in PDB's 111 lower detention basin 205 rises toward the height of detention basin 205, it may then be directed into outflow pipe 207. Outflow pipe 207 may convey treated water into a city stormwater drainage system, for example.

Outflow pipe 207 may be positioned at one end detention basin 205 on the opposite end from where runoff primarily enters system 100. Outflow pipe 207 may also be positioned toward the upper level of detention basin 205 where it is desirous that most treated water eventually percolate into native soil 209. In the event there is a high volume of water accumulating in detention basin 205, outflow pipe 207 serves to act as a secondary drainage system. The inlet portion of outflow pipe 207 runs from detention basin 205 through gravel 201 area and into native soil 209. Outflow pipe 207 may be positioned at a slope with a minimum 0.5% grade allowing for adequate water outflow.

The portion of outflow pipe 207 that runs through the gravel 201 area may contain perforations along its length and may be wrapped with a filter fabric to reduce clogging. The perforations in outflow pipe 207 allow for it to receive drainage from gravel 201 area as well as any overflow from detention basin 205. Outflow pipe 207 may be sized to fit the amount of water volume processed in system 100. For example, outflow pipe 207 may generally be between 4"-6" in diameter.

Reuse Pipe

Another aspect of system 100 includes a water reuse pipe 117, which is a dedicated pipe line used to convey water from other locations directly to PDB 111 for cleaning and reuse. Other water sources may include general runoff, air conditioning condensation from surrounding structures, washdown water, harvested roof rainwater, and grey water from sinks and showers. For ease of reference, water channeled to PDB 111 via water reuse pipe 117 will be deemed reuse water, however, this term is not to limit the scope of the function of water reuse pipe 117. In the exemplary embodiment, this water may be reused after treatment, but this is not necessary.

As shown in FIG. 1, water reuse pipe 117 may be installed as running down the length of one row of PDB's 111 catch basins. The portion of water reuse pipe 117 running down the length of PDB 111 is perforated so that water can be deposited down into the upper catch basin portions of PDB 111 for treatment. Each of PDB's 111 catch basins containing water reuse pipe 117 may be covered with a non-perforated cap 403 so that only water from water reuse pipe 117 is directed to those particular catch basins. Additionally, the water reuse pipe 117 may be aligned by the side or between rows of PDB 111 catch basin cylinders. In the latter regard, the integration of runoff and reuse water may provide for maximum efficiency and maintenance of system 100.

Figure 3:
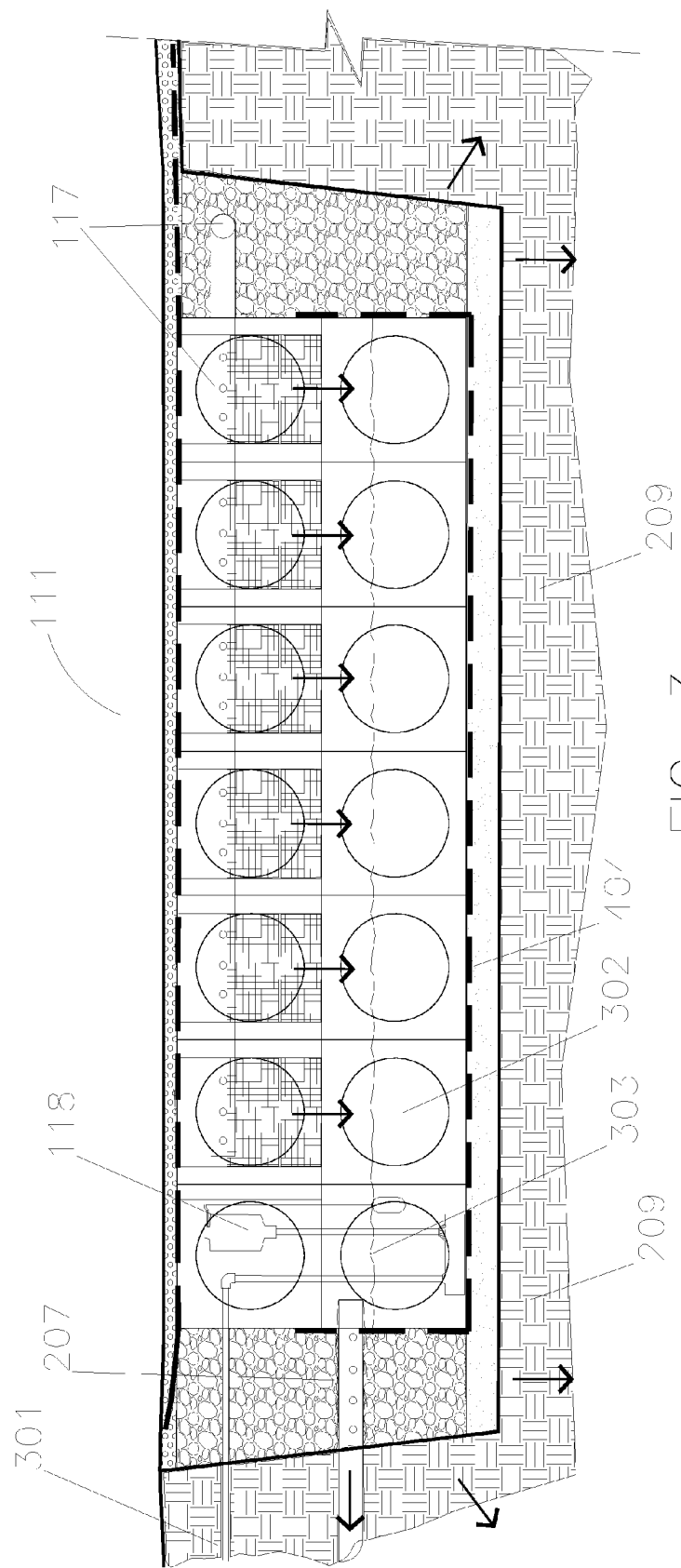
FIG. 3 is a longitudinal cross section view of an embodiment for a primary detention basin, representing a water reuse system comprised of a water reuse pipe and an irrigation pump.

FIG. 3 is a longitudinal cross section of a particular embodiment depicting water reuse pipe 117 and its preferred components: lower retention basin 302 and irrigation pump 118. As noted above, reuse water is conveyed via water reuse pipe 117 to PDB 111, where the water percolates through the initial catch basins and bio-media of PDB 111 down into lower retention basin 302. In this embodiment however, the initial catch basins of PDB 111 would only contain two bio-media filters 208 such as to allow adequate room for water reuse pipe 117.

Lower retention basin 302 may be composed, for example, of CUDO® cubes collectively wrapped in an impermeable pond-liner 404, which allows for treated reuse water to be pumped out by irrigation pump 118. Irrigation pump 118 may operate as a result of conventional power sources or from solar-powered sources. Irrigation pump 118 may be fitted into one end of PDB's 111 lower retention basin 302 and catch basins so that treated reuse water may be pumped via irrigation mainline 301 to the surrounding landscape, to the grasses planted in the top bio-media bio-media filter 208 of PDB 111, or elsewhere for other uses. Irrigation mainline 301 is the main water line running to the drip, bubbler and hose irrigation systems and may also supply pressurized wash-down water. Irrigation mainline 301 runs out from irrigation pump 118 through gravel 201 and into native soil 209. Irrigation pump 118 is also provided with a potable water source to ensure that irrigation to surrounding landscape and grasses can occur when reuse water is in short supply.

The catch basin that contains the components of irrigation pump 118 does not contain bio-media filters 208 that are found in the other catch basins of PDB 111 so as to allow adequate room for irrigation pump's 118 components. Furthermore, the impermeable pond-liner allows for surrounding sand, silt and other grit, which would otherwise foul the pump and lateral lines and emitters, to be segregated from system 100. Depending on components used, retention basin 302 may hold 17" of treated reuse water (or approximately 42 gallons per basin). When retention basin 302 fills to excess capacity, as is exemplified by water level line 303, outflow pipe 207 may serve to direct treated reuse water to a city stormwater system.

It should be noted, however, that FIG. 3 depicts an ideal configuration for actually reusing water. This embodiment may be modified such that reuse water conveyed to PDB 111 via reuse pipe 117, is allowed to infiltrate into native soil 209 or be conveyed to a city storm drainage system via outflow pipe 207 rather than actually be reused. Irrigation pump 118 in either scenario would then be unnecessary.

Figure 4:
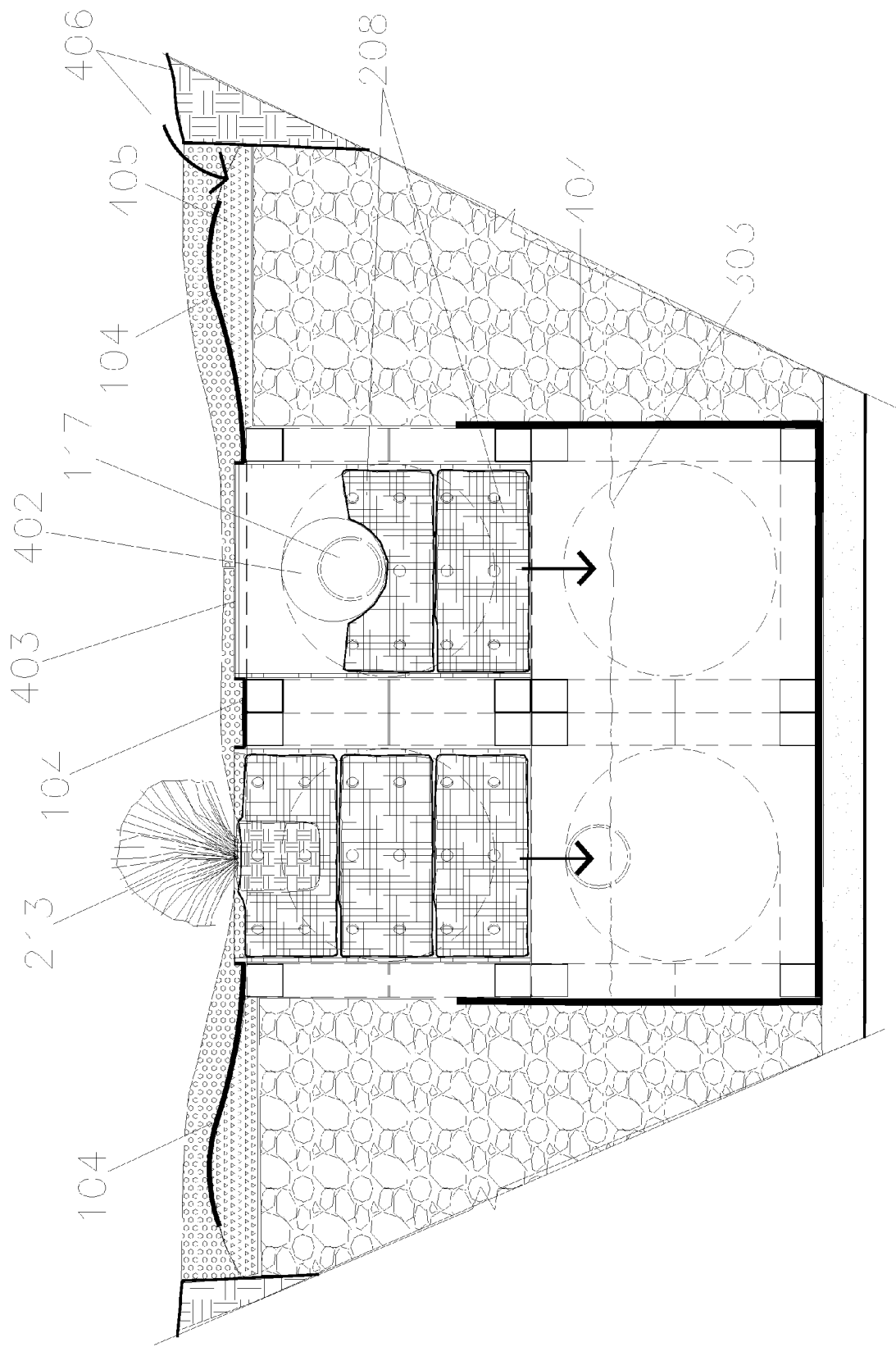
FIG. 4 is a side cross section view depicting an embodiment for a primary detention basin, with a water reuse pipe, and the preferred embodiment of an upper catch basin.

FIG. 4 illustrates a cross-section and partial view of PDB 111 area, including water reuse pipe 117 as well as the surrounding environmental elements of PDB 111, and depicts how water reuse pipe 117 may be positioned within the cylinder area of a catch basin. In this view, water reuse pipe 117 is situated within the cylinder of a catch basin through a cylinder opening 402 that accommodates the size of water reuse pipe 117. Cylinder opening 402 may be 8" in diameter and is located on each side of cylinder so that water reuse pipe 117 may run therethrough. As noted earlier, water reuse pipe 117 may be a flexible and perforated pipe, 4" in diameter. In this view, water reuse pipe 117 is placed over a set of two bio-media filters 208 that may contain a combination of filtrating materials targeted to the particular area system 100 is located. Reuse water flows out of the perforated openings in water reuse pipe 117 onto bio-media filters 208 for filtration treatment.

Water reuse pipe 117 may be removed from the row of cylinders in the event that it needs to be cleaned or maintained or when bio-media filters 208 located beneath need to be replaced. Installment of water reuse pipe 117 may require one attachment proximate the area where water reuse pipe 117 enters the first catch basin in the row of catch basins (not shown).

A non-perforated cap 403 may be used to cover cylinder so that water reuse pipe 117 is sequestered from other water sources, however, in another embodiment, the non-perforated cap 403 may be perforated to allow additional water flow into the cylinder.

Surrounding each cylinder is pond-lined channel 104 and decorative rock 204 that is placed around the top area of PDB 111. As explained above pond-lined channel 104 and decorative rock 204 help for water flowing into PDB 111 to generally drain evenly into cylinders. The cylinders themselves further effectuate this goal by being positioned slightly above the level of pond-lined channel 104 (about one inch).

Pond-lined channel 104 and protective rock layer 204 in PDB 111 also serve to capture silt and other debris not previously filtered out in forebay 105. Additionally, pond-lined channel 104 serves as a cleaning base when the components for forebay 105 and PDB 111 are removed for cleaning. The components of forebay 105 and PDB 111 can be rinsed down onto pond-lined channel 104. The residue rinsed onto pond-lined channel 104 can then be rinsed into lower retention basin 302 and left to dry before being vacuumed out. This allows for easy, effective and efficient maintenance of system 100 that may coincide with particular wet and dry seasons.

As mentioned earlier, a non-woven underlayment material is layered beneath pond-lined channel 104. Under pond-lined channel 104 may be a pea gravel base 405, or other such material or structure which may be from 2" to 6" in depth to help support the slope of pond-lined channel 104 that helps to direct water to catch basins. Adjacent to the pea gravel base 405 is the surrounding swale grade 406 area. Drainage from the surrounding landscape flows down around swale grade 406 and into the excavation areas 107B and 107A (as previously discussed above). Landscape runoff taking this route bypasses pond-lined channel 104, but as noted, this runoff is considered pretreated. Landscape runoff is further treated by entering system 100 through filter fabric and gravel 201 area, and by the time it leaves system 100, it is considered fully treated. Furthermore, most water entering system 100 will enter via other primary avenues, i.e. drainage channel 103 and landscape swale 106.

Figure 5:
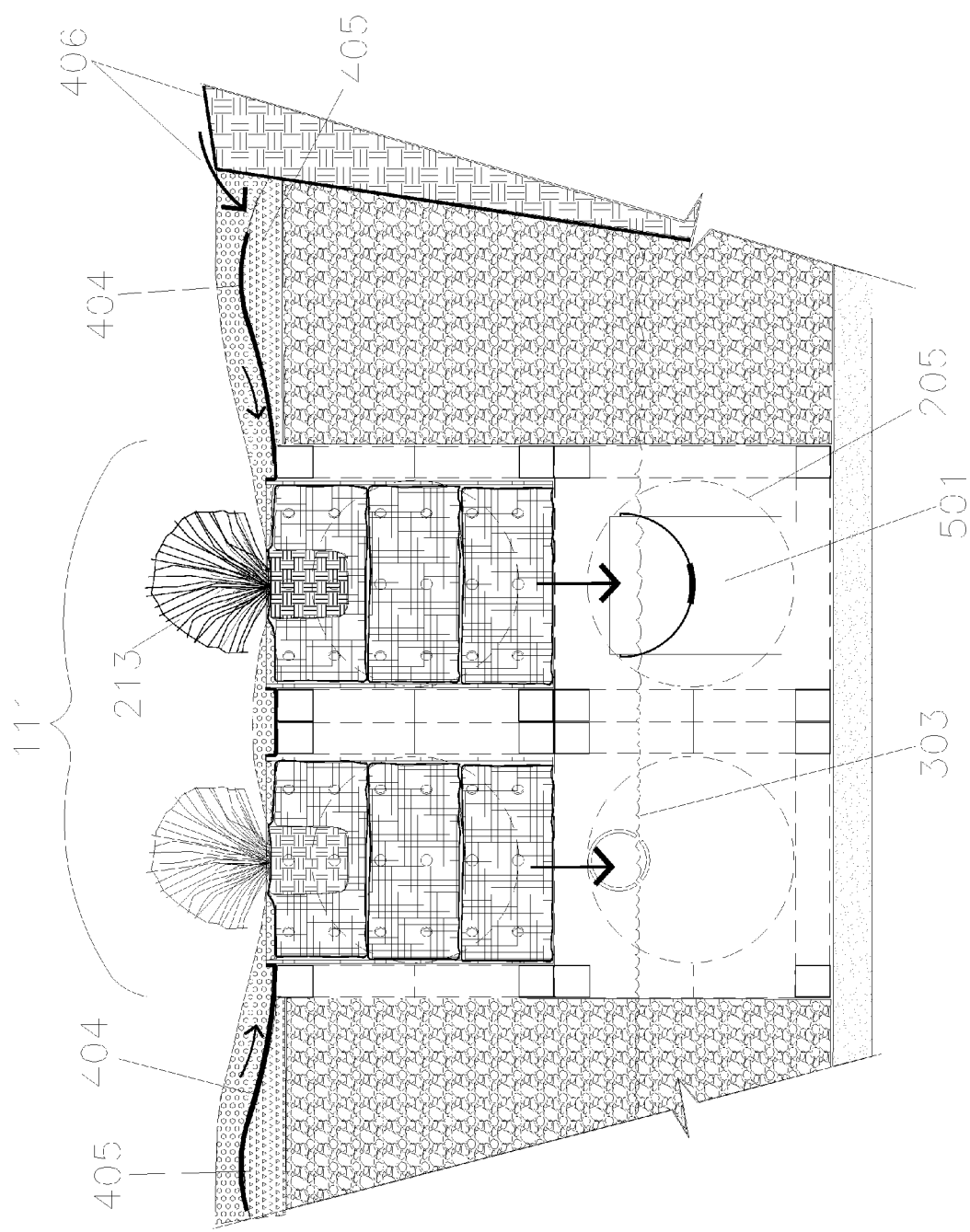
FIG. 5 is a side cross section view primarily depicting a water testing device, which may be used to test the effectiveness of a high performance bioswale system.

FIG. 5 illustrates an alternate cross-section view of PDB 111, including a cross-section view of catch basins with a set of three bio-media filters with grass plant 213 planted at the top as well as the surrounding components of PDB 111 discussed above in FIG. 4. Depicted in this view is water testing device 501 that is situated in lower detention basin 205 (but could also be placed in lower retention basin 302, for example) and that allows for the collection of water quality samples. Testing the quality of water that has filtrated down through bio-media filters 208 enables a user or maintenance personnel to determine whether the bio-media is still effective or needs replacement.

In this view, the water testing device 501 is placed in lower detention basin 205. However, water testing device 501 may be placed in any part of lower detention basin 205 beneath initial catch basins for purposes of testing bio-media filters' 208 effectiveness over time. In one embodiment, water testing device 501 may be a container, such as a bucket, used to collect water samples. However, this should not be construed as limiting the scope of the system 100.

Figure 6:
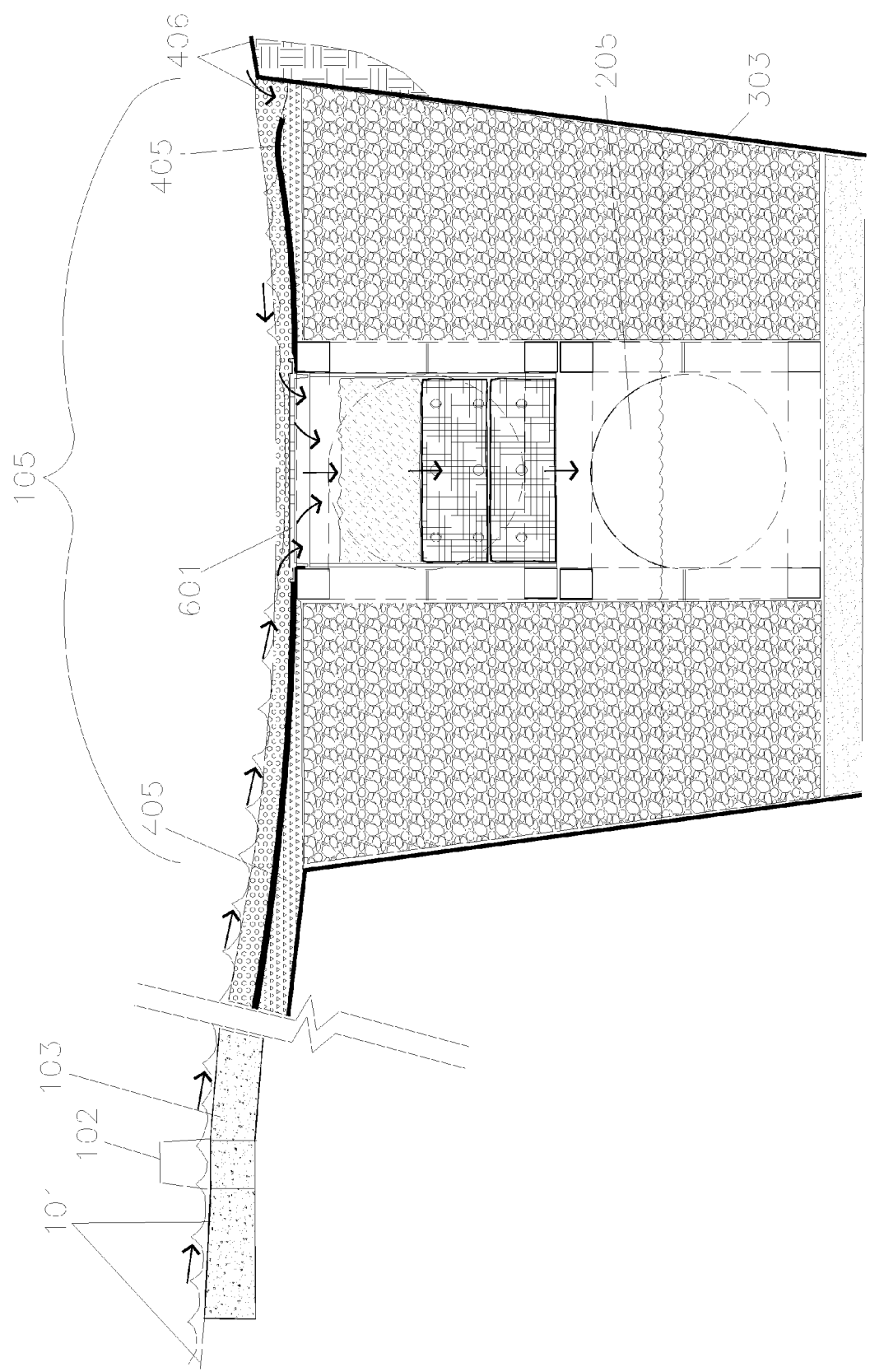
FIG. 6 is a side cross section view of an embodiment of a forebay depicting water flow through its primary components.

FIG. 6 illustrates a cross-section view of forebay 105, including a catch basin and the manner in which runoff may flow into said catch basin. As discussed above in FIG. 1, urban runoff may flow from paved area 101, such as a street, down along curb 102 and into drainage channel 103. The urban runoff is then directed to system 100 via pond-lined channel 104. An example of the water flow is generally indicated by the series of arrows. Also depicted is perforated cap 601 to receive runoff, silt, and finer debris. Larger debris that cannot pass through the perforation diameter is held in decorative rock 204 situated upon pond-lined channel 104.

Figure 7:
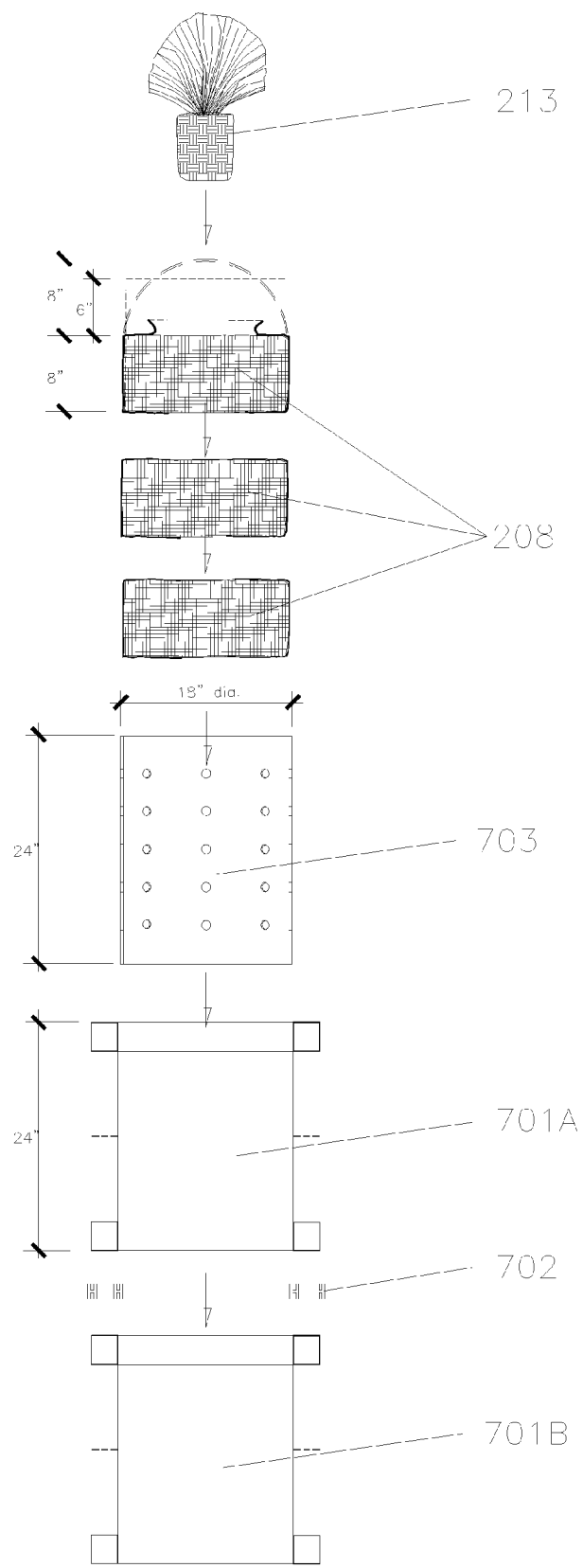
FIG. 7 is an exploded view an exemplary embodiment of a catch basin located in a primary detention basin.

FIG. 7 depicts an exploded view of the primary components comprising PDB 111. FIG. 7 also depicts most of the same components that are used in forebay 105. The upper unit may be a catch basin as represented by 701A. The lower unit may be part of a lower detention or retention basin as represented by 701B after water filtrates through 701A and its components. 701A and 701B may be connected by optional connector ring 702, wherein an additional grate or similar device may be located, upon which bio-media filters 208 may rest. Inside catch basin 701A is a perforated cylinder 703, which would contain bio-media filters 208 and grass plant 213.

Basin 701A may contain perforated cylinder 703, which is fitted within the inner space of basin 701A. The perforated surface of cylinder 703 allows for air circulation throughout basins 701A and 701B as well as gas exchange between the biological elements of bio-media filters 208 including grass plant 213. Cylinder 703 may contain three bio-media filters 208 within it. Bio-media filters 208 fit snuggly around the entire circumference of cylinder 703 so that water entering basin 701A interacts and filters through the bio-media of bio-media filters 208. As explained earlier, bio-media filters 208 may contain a mixture of bio-media targeted for specific types of primary filtration and cleaning depending on geographical factors. Cylinder 703 may be 18" in diameter and 24" in length and constructed of a PVC pipe or a rubberized laminated material. In an exemplary embodiment, forebay 105 cylinders 703 may have twenty-four ¾inch diameter openings that are equally spaced throughout cylinder 703. PDB 111 cylinders 703 (which typically would contain an additional bio-media filter) may have forty ¾inch diameter openings also equally spaced throughout cylinder 703. The holes serve the purpose of allowing bio-media filters 208 a means to breathe, which is beneficial for the optimal functioning of system 100 as a whole.

Each filter portion may be fabricated of a permeable plastic material, and contain a particular type of bio-media. Depending on the bioswale, runoff flow rate, and other specified factors, the bio-media may be targeted with a specified mixture of design soil, including known proprietary bio-media that may be licensed or sold. For example, a design soil may contain a specified mixture of organic and inorganic minerals that target and sequester contaminants such as metals, hydrocarbons, bacteria, and organic and inorganic nutrients. The type of bio-media as well as permeability of the filter material may be customized accordingly.

In the exemplary embodiment, bio-media filters 208 may be generally comprised of a permeable woven plastic that is generally 18 inches in diameter and 8 inches in depth. The bottom center of bio-media filter 208 may contain a 6 inch diameter circular opening, which is covered with a pliable mesh material. The pliable mesh material that covers the bottom opening of bio-media filter 208 allows for grass plant 213 to easily grow its roots down from the top bio-media filter 208 to the bottom bio-media filter 208. The bottom bio-media filter 208 may contain a permeable woven plastic insert that covers the bottom opening in order to prevent bio-media material from falling out or from the roots of grass plant 213 from growing down into basin 701B. The permeable plastic insert may also be used in the center bio-media filter 208 if it is desired, for example, to prevent the roots of grass plant 213 from growing into the bottom bio-media filter 208 or to segregate filtration material from entering the bio-media filter 208 below it.

Each bio-media filter 208 may contain one or more reinforcing lifting straps. Each lifting strap may be 1.5" wide and extend approximately 8" above the bio-media filter 208. The lifting straps allow a user or other maintenance crews to more easily install and remove bio-media filters 208 when needed. Other dimensions and sizes may be used for lifting straps without limiting the scope of the embodiments of the invention. The lifting straps may be further reinforced to bio-media filter 208 by attaching a portion of the lifting straps around the top and bottom portions of bio-media filter 208. The lifting straps may be attached to bio-media filter 208 by being sewn in around the opposite sides of bio-media filter 208.

Around the upper circumferential edge of bio-media filter 208 is a pliable plastic ¾inch mesh material which extends approximately 6 inches upwards in length and has a drawstring mechanism integrated with its upper most portions. When a user desires to secure the bio-media contents in bio-media filter 208, the drawstring mechanism can be tightened down over the top area of bio-media filter 208. As mentioned earlier, the top bio-media filter 208 holds grass plant 213. In one embodiment, when the drawstring mechanism is tightened down around the bio-media it can only be tightened to a certain extent leaving a generally circular opening of approximately 6" in diameter, which also serves to provide some space for grass plant 213. Rock mulch may be placed on top of the pliable mesh material and around grass plant 213.

The drawstring mechanism also provides a user with easy access to the bio-media in bio-media filter 208 when replacement of its contents is desired. The drawstring mechanism also allows a user to easily open bio-media filter 208 as well as move the rock mulch aside when opening bio-media filter 208. If desired, a user (such as a landscape laborer or maintenance crew member) may remove bio-media filter 208 out of cylinder 703 by its lifting straps in the event the entire unit requires replacement or cleaning. The contents of bio-media filter 208 may be sent to a composting center for recycling and later reuse in a landscaped area.

Figure 8:
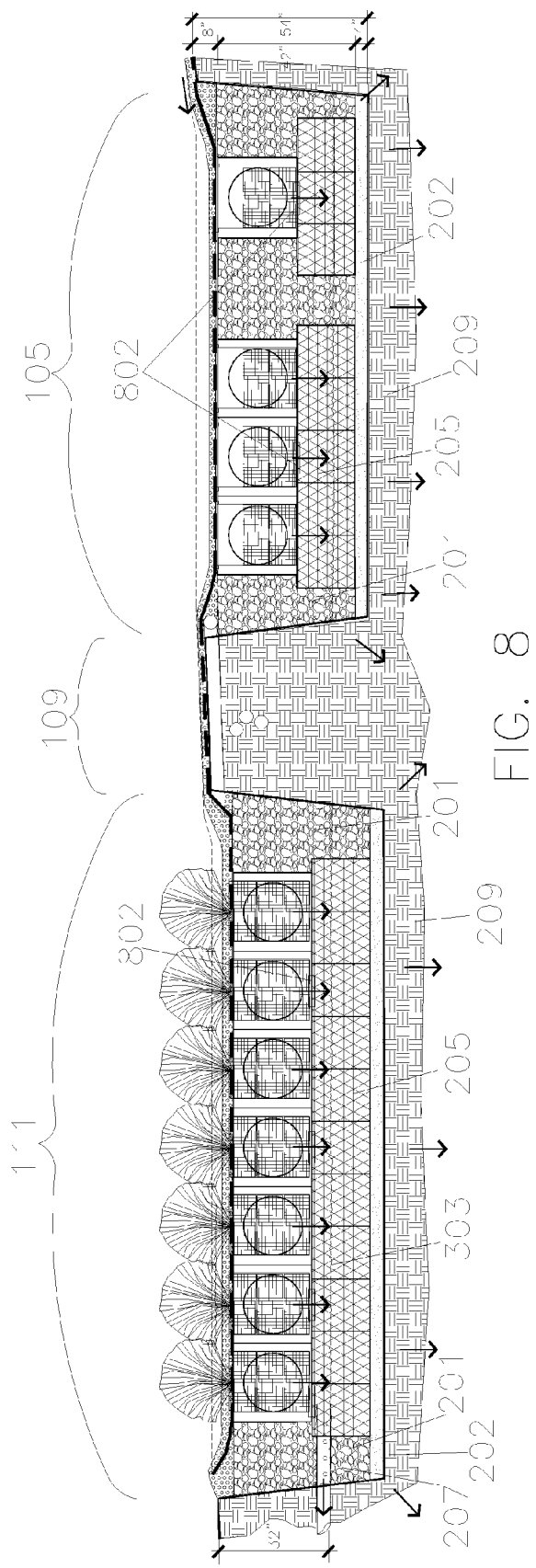
FIG. 8 is a longitudinal cross section view of another embodiment of a high performance bioswale system depicting potential alternative lower basins.

FIG. 8 illustrates an alternative embodiment of system 100, which includes the use of water storage crates in lower detention basin 205 when system 100 is installed in an excavated area of less than approximately 4'-9' feet in depth. Atlantis® detention crates may be used, however, this is not to limit the scope of system 100. In this embodiment, water storage crates comprise lower detention basin 205 and are placed beneath the catch basins in forebay 105 and PDB 111. The crates may be placed in a staggered manner beneath the catch basins. However, other configurations and placements may be applied in constructing lower detention basin 205 without deviating from the scope of system 100.

At the top of one or more of the water storage crates of lower detention basin 205 are ports 802. Port 802 is an opening located at the top of lower detention basin 205 that may be approximately 6.5" in diameter. In the embodiment illustrated in FIG. 8, there are four ports 802 spaced along lower detention basin 205 in PDB 111, as well as two ports 802 located in lower detention basin 205 in forebay 105.

Figure 9B:
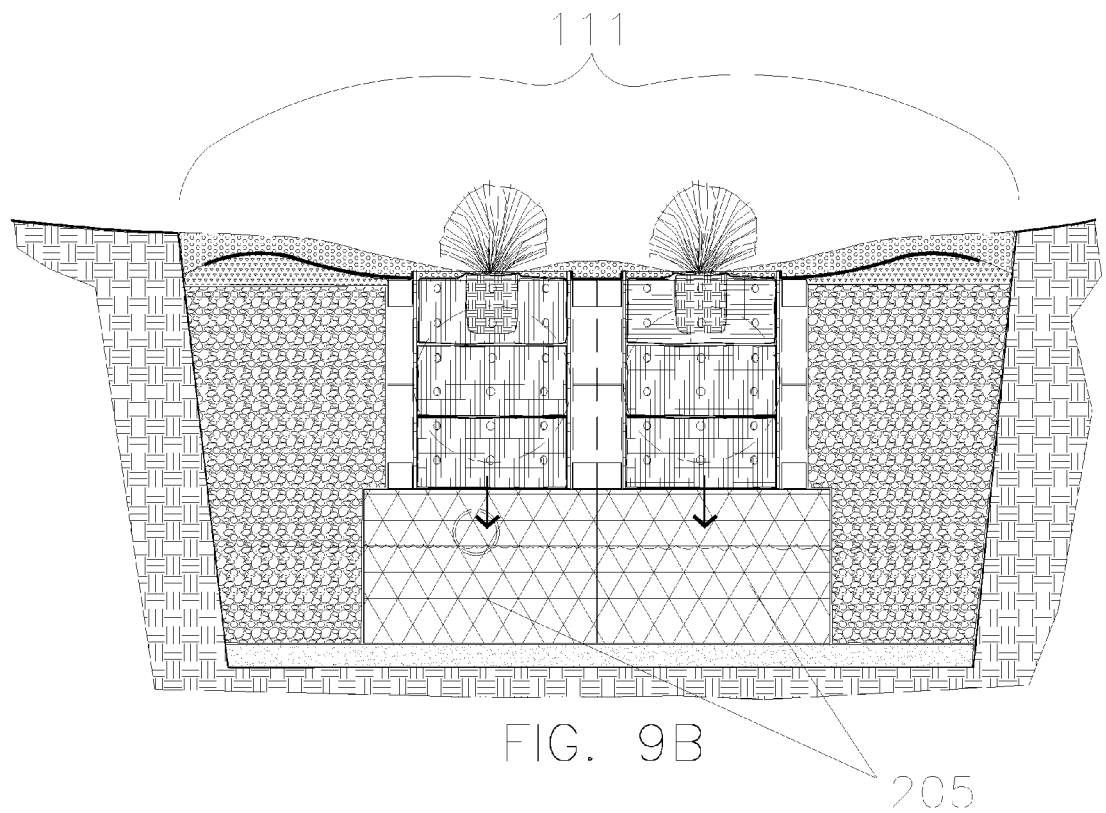
FIG. 9B is a side cross sectional view of a primary detention basin depicted in FIG. 8.
Figure 9A:
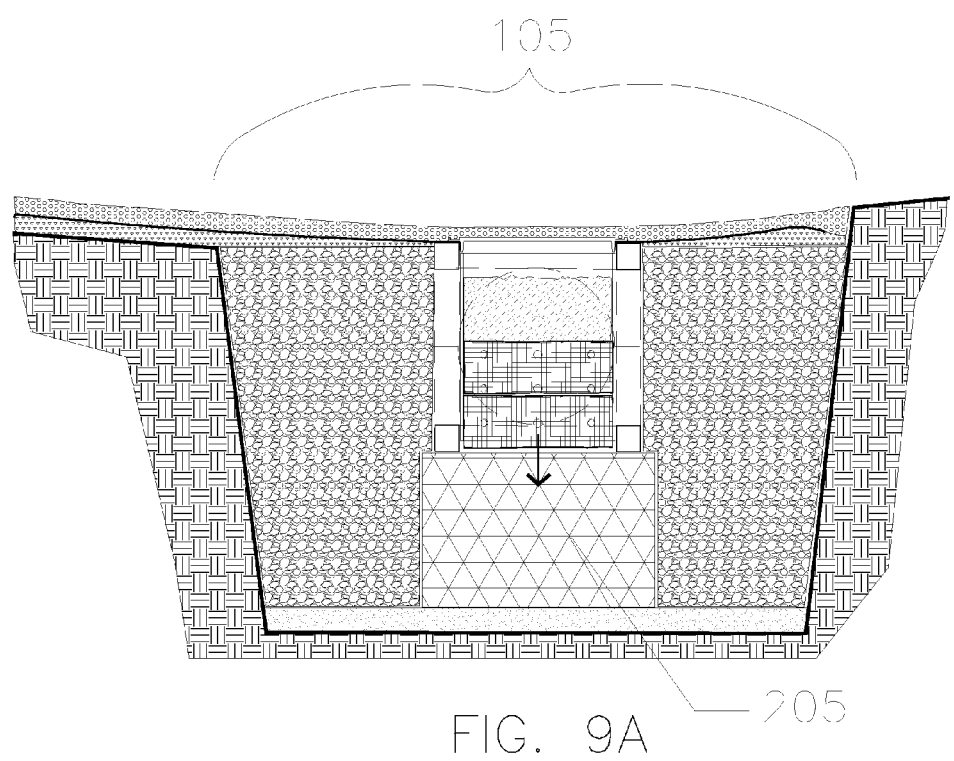
FIG. 9A is a side cross sectional view of a forebay depicted in FIG. 8

FIG. 9 illustrates cross sections of the alternative embodiment of system 100 depicted in FIG. 8. FIG. 9A is a representation of forebay 105 with an alternative lower detention basin underneath initial catch basin. As described above, the initial catch basin where runoff would first flow through may be comprised of the preferred embodiments described in FIG. 7 including specified bio-media filters 208 that are suitable for the particular location and purpose of system 100. Water would thereafter filtrate from the bottom of the filters of the catch basin and into lower detention basin 205.

In FIG. 9B, water passing from forebay 105 into the PDB 111 via drainage pipe 112, or other means, would flow through the components of PDB 111 catch basins as described above. After flowing through said catch basin, as represented by the arrows showing the gravity induced flow, the treated water would then percolate into lower detention basin 205, where it would fill and thereafter drain into the city stormwater system via outflow pipe 207.

Stormwater Treatment Basin

Figure 10:
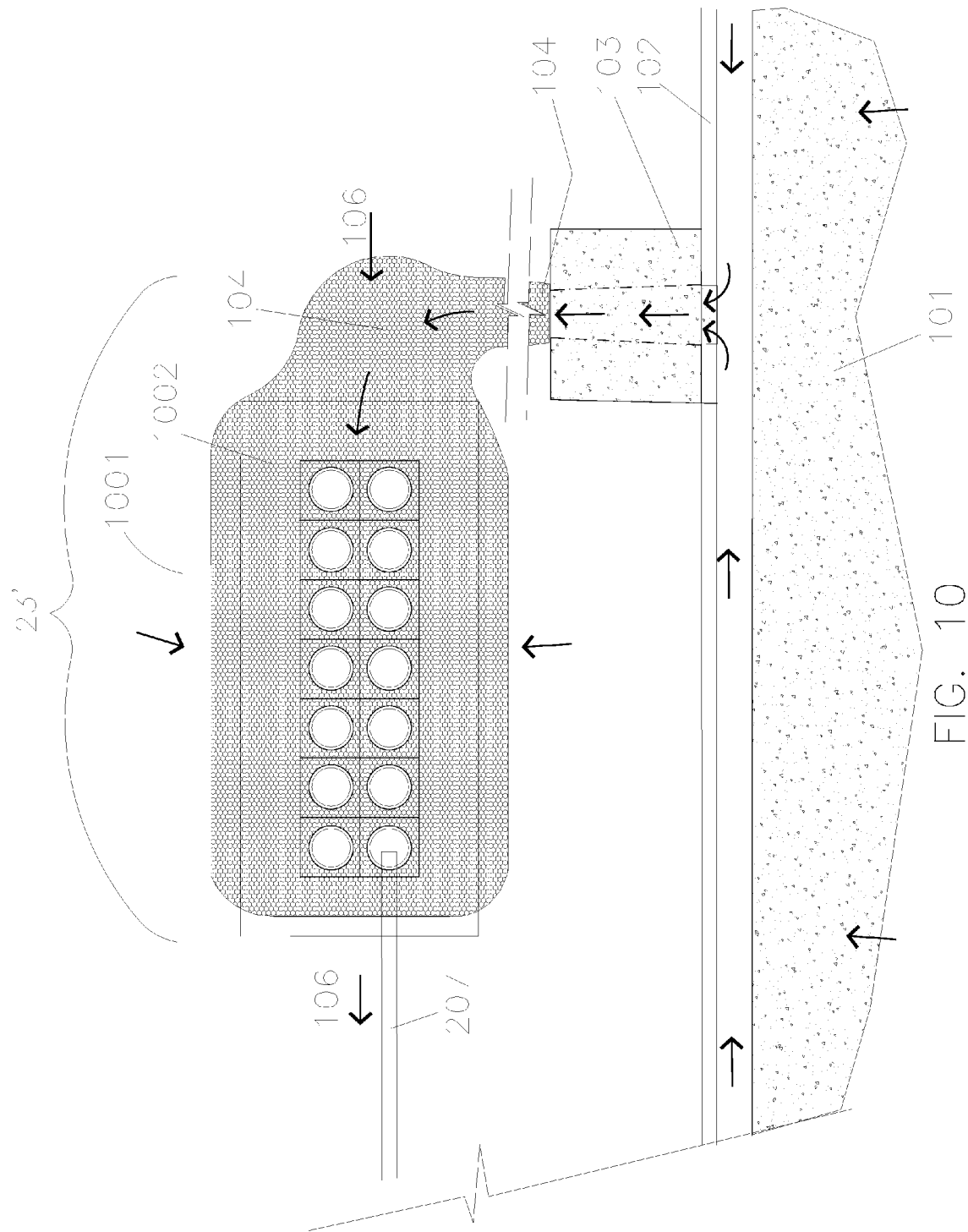
FIG. 10 is an alternative embodiment of a high performance bioswale system representing a top plan view of a singular stormwater treatment basin sans forebay.

FIG. 10 illustrates an embodiment such as for certain parts of the watershed where infiltration into the ground is not desirable, limited, or not permitted. This embodiment may be termed a stormwater treatment basin 1001 ("STB") where runoff is treated and enters the city's stormwater system. In this particular embodiment, forebay 105 as described above is foregone, however, its function is implemented into STB 1001. This may be done where space is limited, for example. It should also be noted that pond-lined channel extends beyond the edges of STB excavation 1002 to force greater amounts of landscape runoff to be given pre and primary treatment in system 1001. In most other respects, STB 1001 functions similarly to system 100 described above as runoff is still channeled into STP 1001 via drainage channel 103, landscape swale 106, and pond-lined channel 104. It also goes through pretreatment and primary treatment phases while passing through particular catch basins, but rather than these processes being separated in space and time, they are efficiently combined.

Figure 11:
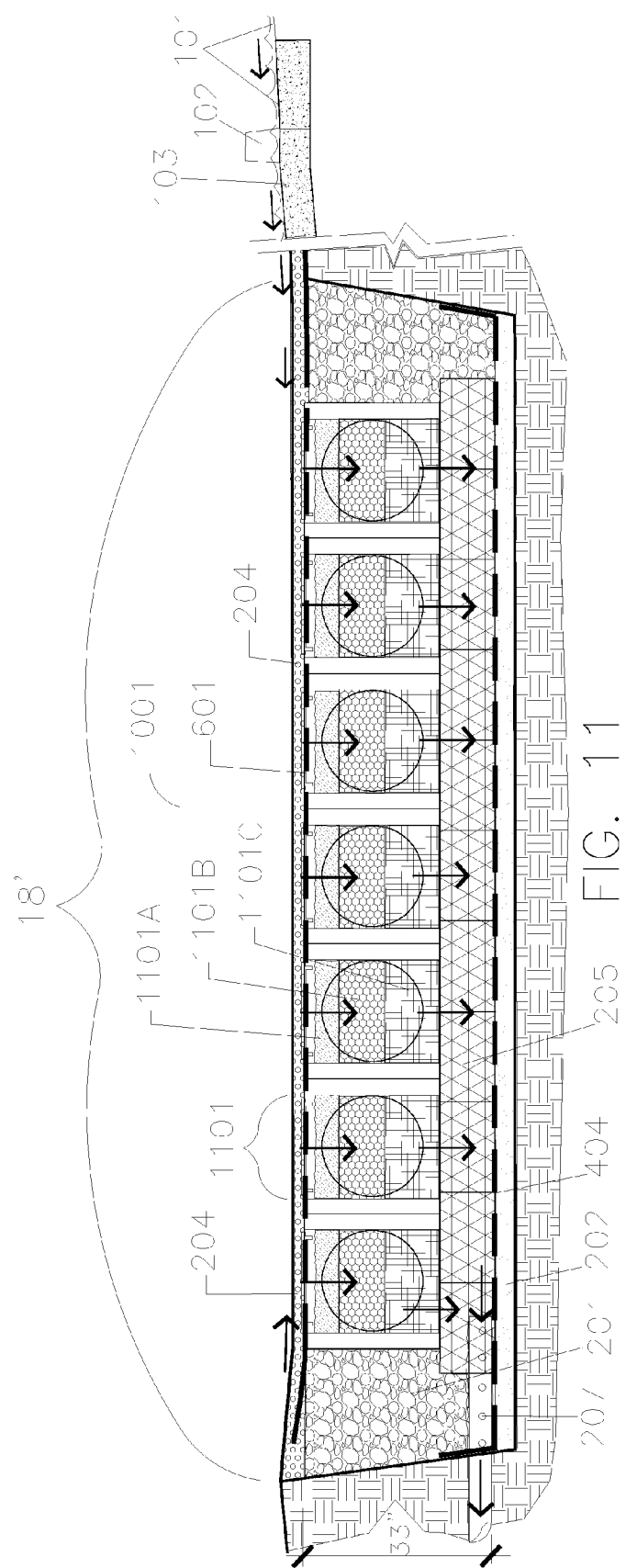
FIG. 11 is a longitudinal cross section view of a stormwater treatment basin, which depicts a preferred embodiment for simultaneous pretreatment and primary treatment of water.

In FIG. 11, runoff would be directed from drainage channel 103 and landscape swale 106 onto pond-lined channel 104 and through decorative rock 204 all as discussed above and for similar purposes. It would then be channeled to the 1" elevated pre and primary treatment cylinders 1101, which could be comprised of, for example, CUDO® cubes, or some similar variation. The top portion of the pre and primary treatment cylinders 1101 would be comprised of a perforated cap 601, such as to serve as an additional filter for large debris and as platform on which to place decorative rock 204. Runoff would be evenly distributed to each pre and primary treatment cylinder 1101. The initial 6" of each pre and primary treatment cylinder 1101 would serve as a silt detention basin 1101A. Water would thereafter percolate into a pretreatment filter 1101B, which, for example, could be 8" deep and comprised of activated carbon. The water would then percolate into the primary treatment filter 1101C, which, for example, could be 12" deep and comprised of a particular bio-media depending on the needs of the particular site.

After pre and primary treatment, by force of gravity, the treated water would then percolate into a lower detention basin 205, which could be comprised of small Atlantis® crates similar to those as mentioned above. These crates' function would be analogous to that of the lower detention basins 205 comprised of CUDO® cubes described above. These crates could also be wrapped with an impermeable pond liner 404 to ensure water does not flow into the ground. FIG. 11, however represents an alternative depiction in that rather than lower detention basin 205 being fully wrapped in pond liner 404, pond liner 404 is extended across the entire bottom of STB excavation 1002 directly above sand base 202. This allows for water to move freely between the void created by the crates. This embodiment also allows for lateral moving water from native soil 209 to be captured all four sides of STB excavation 1002. Once lateral moving water enters gravel 201 area from native soil 209, it will drain downward and be captured within pond liner 404 to be efficiently removed from the area. The arrows in the outflow pipe 207 represent the flow of water from STB 1001 of this particular embodiment to the city storm drainage system, for example, and not into the ground.

Figure 12:
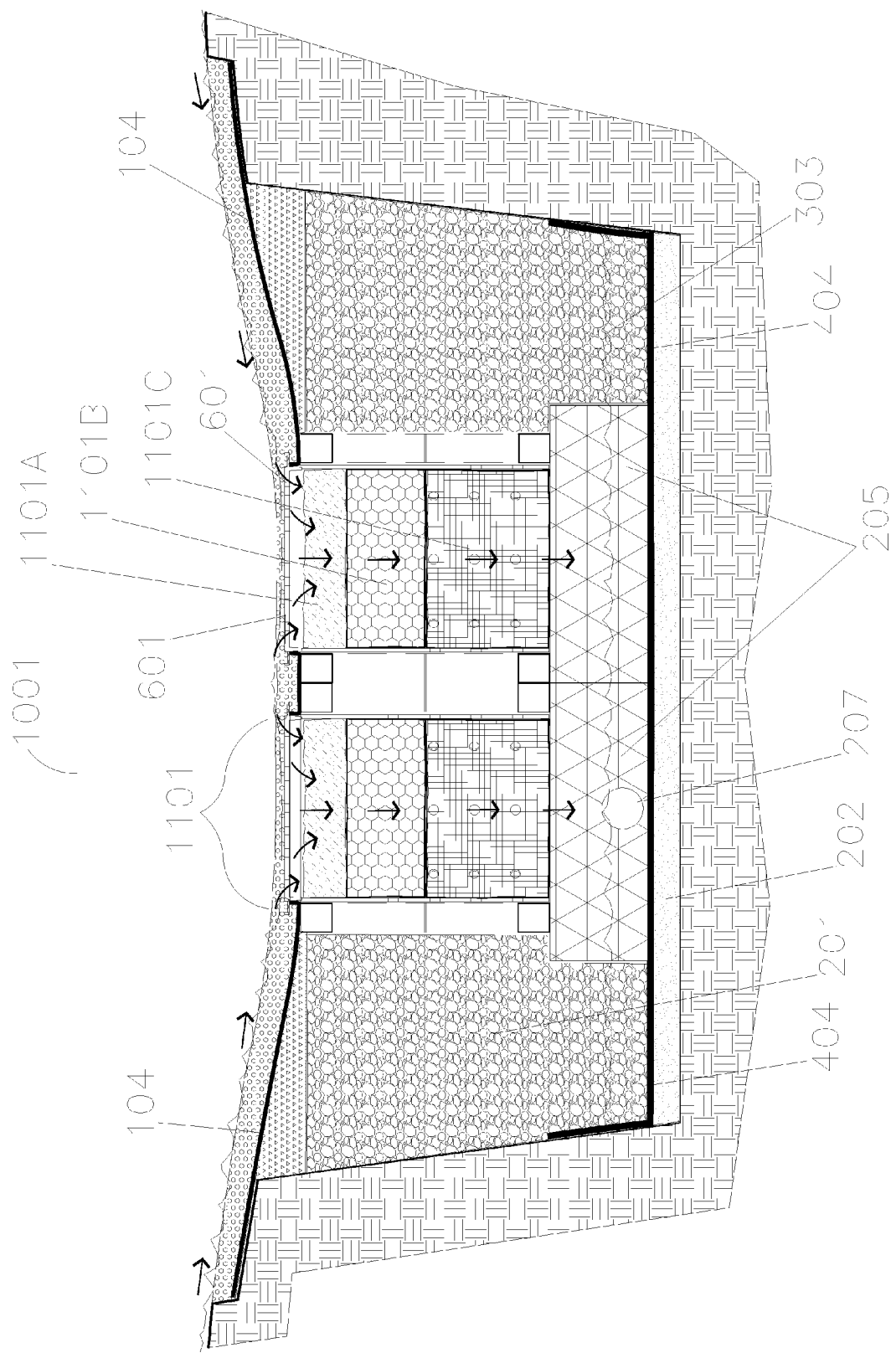
FIG. 12 is a side cross section view of FIG. 11 depicting water flow entering a high performance bioswale system, being treated, and exiting via an outflow pipe.

FIG. 12 depicts a side cross-section view of FIG. 11. In this depiction the slope of the swale can be easily seen, as well as the extended pond-lined channel 104, which helps to efficiently direct runoff to STP 1001 to pre and primary treatment cylinders 1101. As discussed above pre and primary treatment cylinders 1101 have silt detention basin 1101A, pretreatment filter 1101B, and primary treatment filter 1101C. Treated water then settles into the lower detention basin 205 where it is able to flow out of STP 1001 via outflow pipe 207.

OTHER EMBODIMENTS

Figure 13:
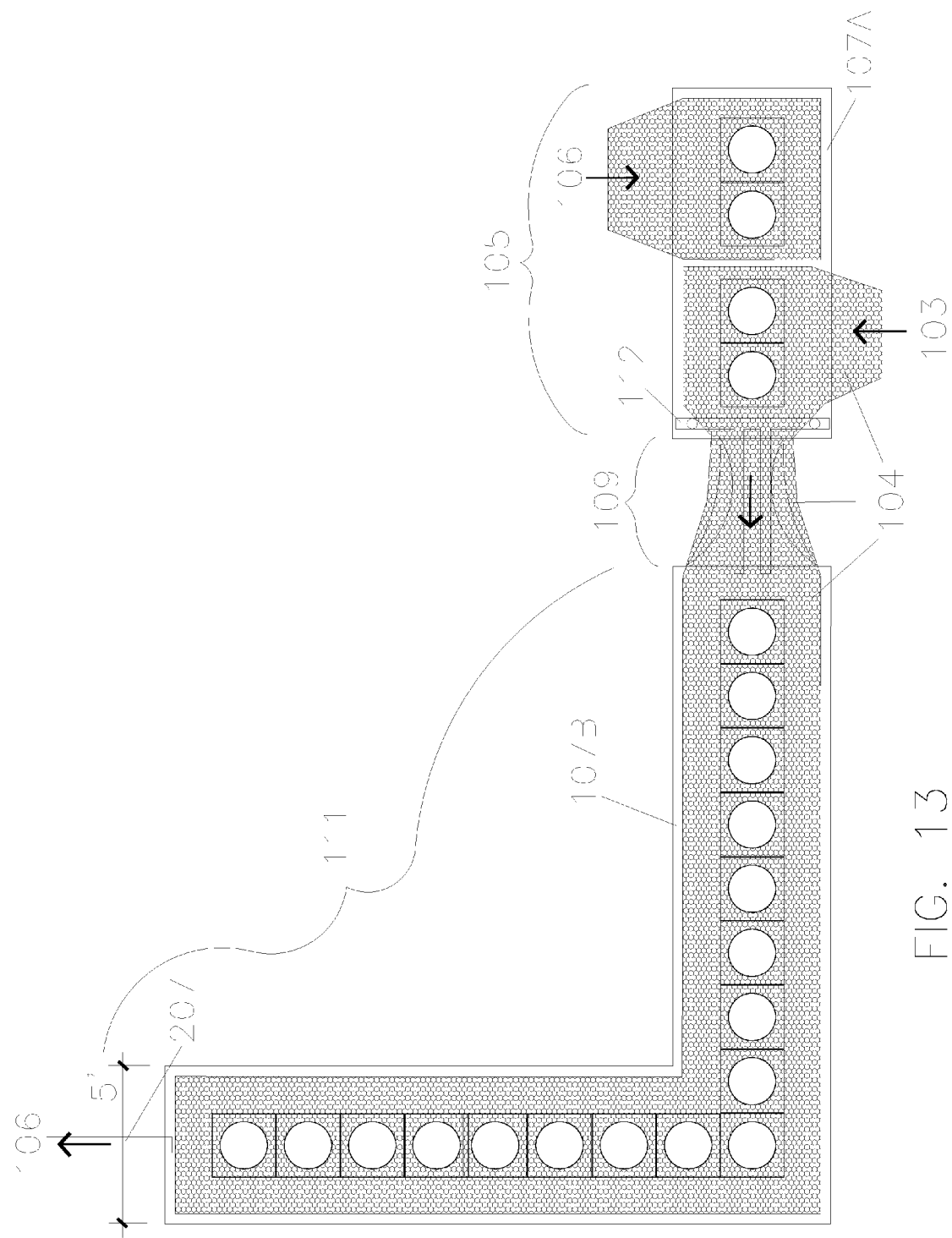
FIG. 13 is a top plan view depicting an alternative embodiment of an "L" shaped high performance bioswale system.

FIG. 13 depicts an alternative embodiment of system 100. This depiction represents the modular capability of system 100 to meet the needs of any particular site that would, for example, necessitate an "L" shaped high performance bioswale. This embodiment is not to limit the scope of system 100, but may be useful to install near the corner of a building, or where real estate space is scarce. The modular nature of system 100 may also allow for it to be installed so as to fit within existing island planters in a parking lot. For this particular use, FIG. 13 depicts runoff entering system 100 from a preexisting landscape swale 106 area and/or drainage channel 103 into forebay 105. As described in detail above, runoff would be given a pretreatment in the forebay 105 area. It would then be directed to the PDB 111 primarily via drainage pipe 112 for a primary treatment.

As shown in FIG. 13, PDB 111 need not be constructed in such a way that its components are installed in a straight line. The modular nature of the system allows for the various components to be placed around corners and even negotiate 90 degree turns where, for example, CUDO® cubes are used. It is furthermore contemplated that system 100 would be able to accommodate any degree of turn, including 180 degrees and/or 360 degrees. Regardless of the variation of turn angle, system 100 still serves the same general purpose of treating runoff. After primary treatment in PDB 111, treated runoff could then infiltrate into the native soil, or be directed away from system 100 via outflow pipe 207.

Additionally, the embodiment depicted in FIG. 13, may be equipped for other uses. Water reuse pipe 117 may be installed to direct reuse water to system 100. Lower detention basin 205 may consist of double or triple stacked pond lined CUDO® cubes to maximize retention in order to reuse treated water. Moreover, in the event that space is truly at a premium, forebay 105 may be dropped and a system similar to that described in FIG. 12 may be installed allowing for pre and primary treatment to occur rather simultaneously. These variations flesh out the numerous capabilities and possibilities of system 100.

Figure 14:
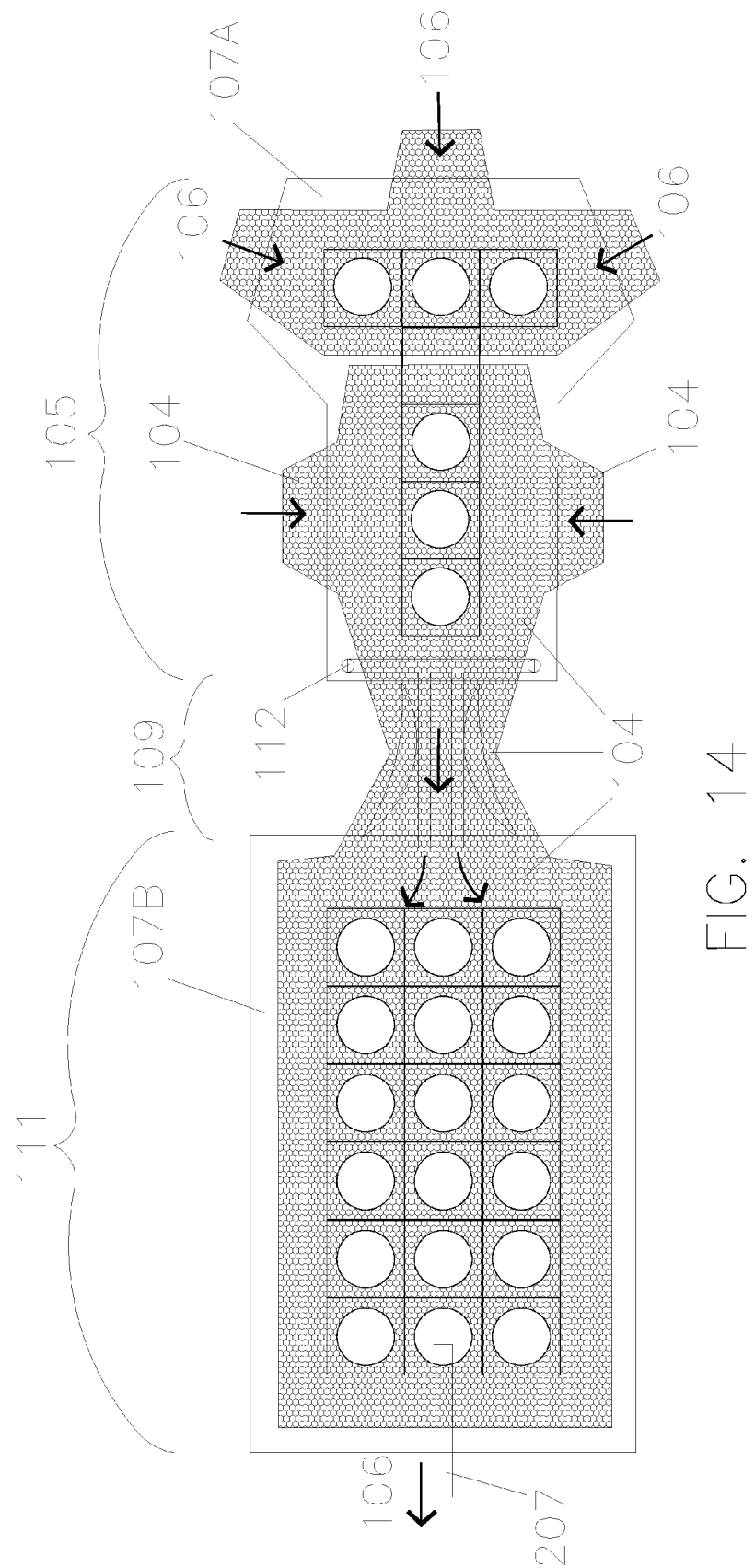
FIG. 14 is a top plan view of an alternative embodiment of a high performance bioswale system depicting a larger forebay and primary detention basin for a larger site.

FIG. 14 depicts an alternative embodiment of system 100 that again represents the modular nature of the system that may be installed according to the needs of the particular site. As represented here, an alternative configuration of forebay 105 depicts horizontally and vertically aligned initial catch basins within forebay excavation 107A area, designed to allow for a multitude of landscape and paving drainage sources entering system 100 from various directions. PDB 111 also represents an alternate configuration where an additional row of catch basins and requisite lower components is installed, i.e. lower detention basin 205, which may be wrapped in any variation of material to achieve the desired purpose, such as to retain, detain, test, or otherwise make alternate uses of treated water.

Furthermore, each modular component of PDB 111 may be used for an alternate purpose. For example, one catch basin and its lower components, or a group of catch basins and its lower components—such as a square group of four or one horizontal row—may be used solely to retain water for reuse, while the rest of the system may be designed to treat runoff in order to safely drain to the city's stormwater drainage system.

Figure 15:
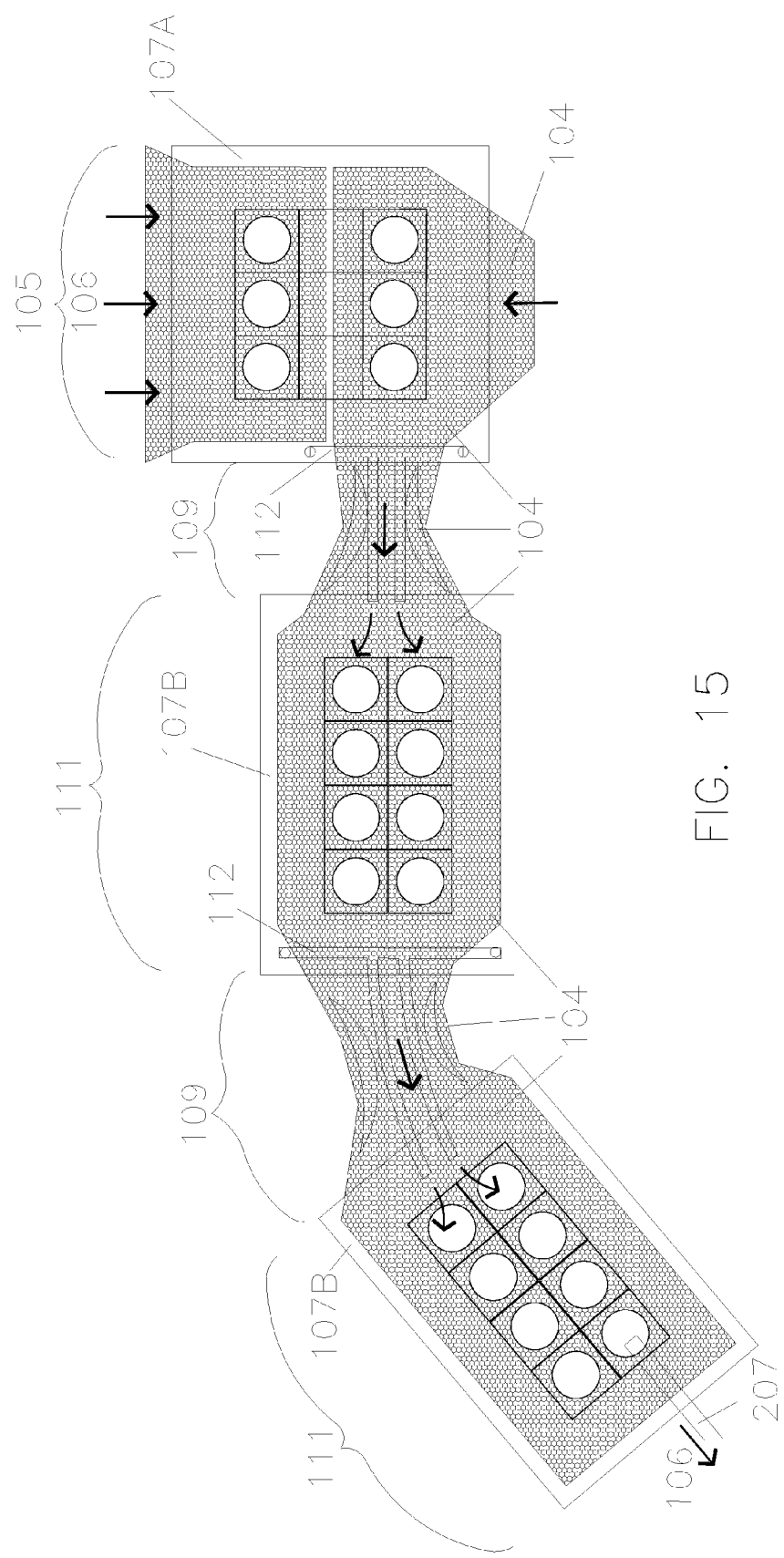
FIG. 15 is a top plan view of an alternative embodiment of a high performance bioswale system depicting the modular and flexible nature of the system.

FIG. 15 depicts an embodiment of system 100 that includes two separate PDBs, 111 which represent the modular nature of system 100. However, this is not to limit the scope of system 100, as a multitude of PDBs 111, and/or forebays 105 may be necessary to properly accommodate the needs of the particular location, such as for stormwater volume and site restrictions. In addition, by adding PDBs 111, and adjusting corresponding pond-lined weirs 109 and drainage pipes 112, system 100 can be aligned with preexisting or proposed bioswales and may become a part of the landscape both functionally and aesthetically. This embodiment may also be modified in accordance with any of the other FIGS. discussed throughout this specification.

Figure 16:
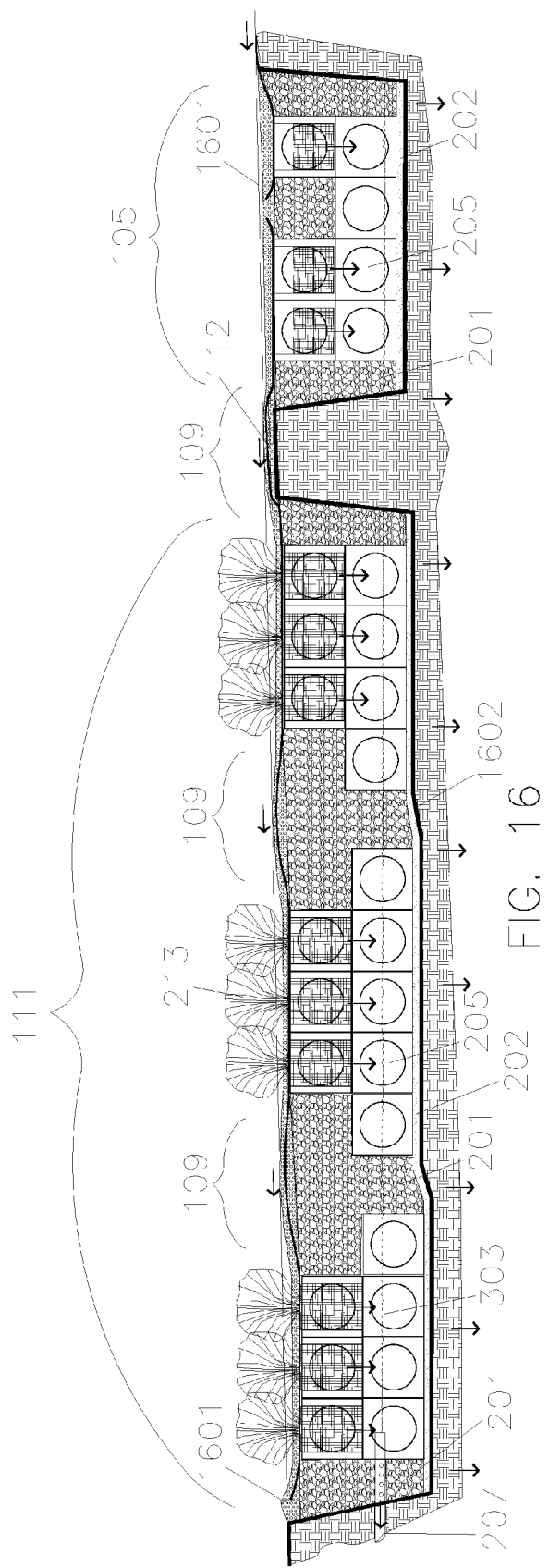
FIG. 16 is a longitudinal cross section view of an alternative embodiment of a high performance bioswale demonstrating the modular nature of the system and its components.

FIG. 16 depicts an embodiment of system 100 with one forebay 105 and one continuous PDB 111 with multiple groups of catch basins situated within PDB 111. FIG. 16 also depicts a variation in the configuration of lower detention basin 205 in both forebay 105 and PDB 111. As depicted, lower detention basin 205 in forebay 105 may be comprised of four CUDO® cubes upon which rest three initial catch basins. This demonstrates the modular nature of the system, in particular when it would be desirable to create a larger void for lower detention basin 205. This same concept of variation on lower detention basin 205 is also applicable to PDB 111 as depicted in FIG. 16.

Furthermore, it is not necessary to have a contiguous row of catch basins in PDB 111. System 100 can function effectively by using pond-lined weirs 109 to direct pretreated runoff to separate groups of catch basins. In the preferred embodiment, pretreated runoff may flow from forebay 105 to the first group of catch basins in PDB 111 where the water may be treated at such a rate that inflow into the catch basin and its components would exceed outflow into lower detention basin 205. As such, the pretreated runoff level would rise and flow over pond-lined weir 109 to the subsequent group of catch basins where a similar process may take place, until the pretreated runoff entered into the final group of catch basins. Top existing grade 1601 depicts an existing downward slope at 2% which may help to facilitate the process of channeling water from one group of catch basins to the next and eventually through the entirety of system 100. Similarly, terrace 1602 depicts an alternative method of construction for PDB excavation 107B, which also helps to facilitate the overall downward slope of system 100 in order to achieve the desired result of properly channeling water through and out of system 100. Terrace 1602 also may serve to allow for lower detention basin 205 to rest upon a level base, which may further allow for the system to optimally function.

Modular Catch Basin

Figure 17A:
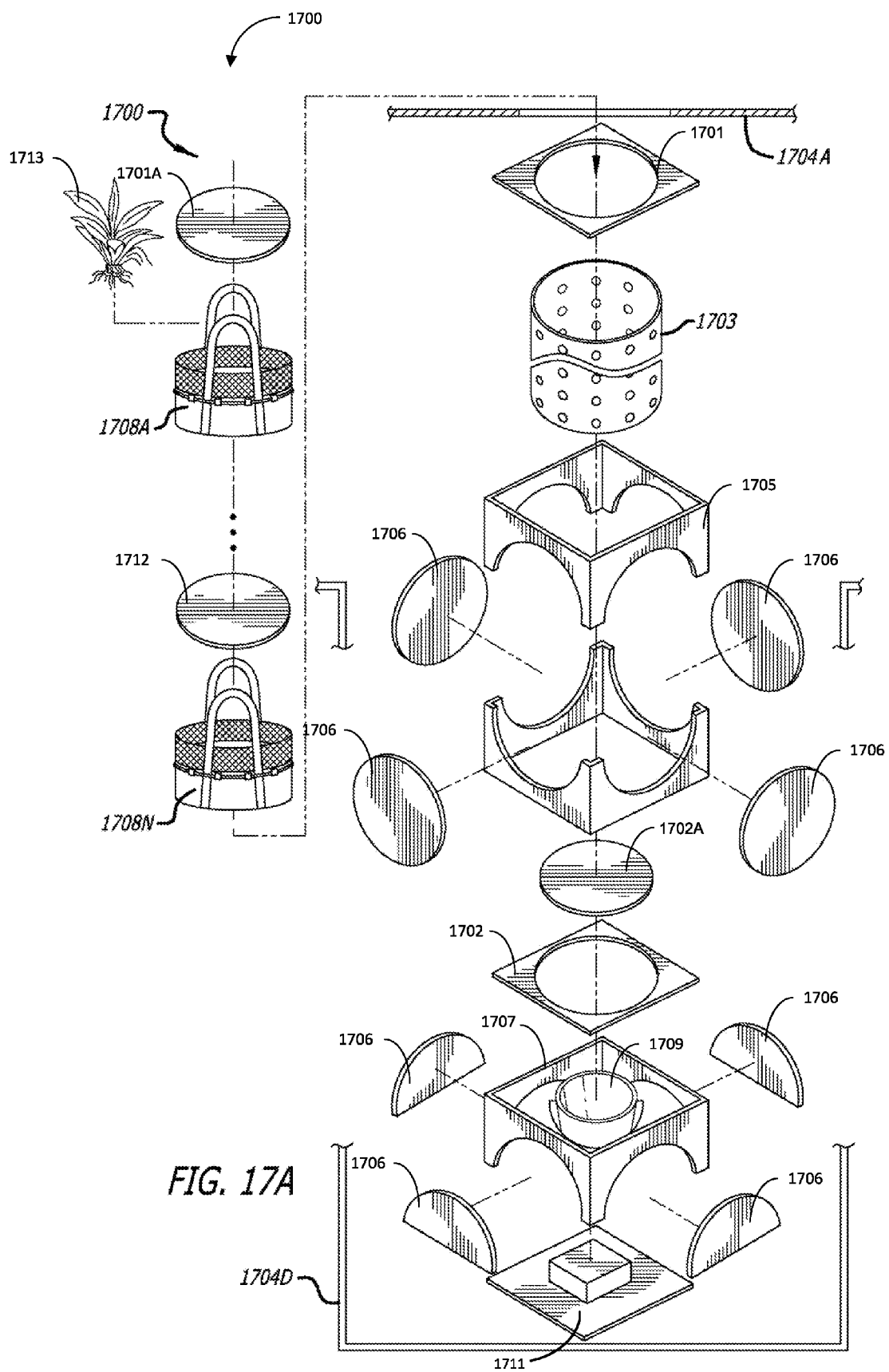
FIG. 17A is an exploded view of an embodiment of a modular catch basin, depicting its primary components including a plurality of bio-media filters, a filter housing, a filtration housing, and a cistern container.

FIG. 17A is an exploded perspective view of a modular catch basin 1700 in accordance with an embodiment of the invention. The primary elements of the modular catch basin 1700 may include cistern container 1707, filtration housing 1705, hollow cylindrical filter sock housing 1703, and biomedia filter 1708. Elements of the modular catch basin 1700 are described in detail herein including descriptions of sub-elements and combination of elements.

An excavation lined with filter fabric or liner 1704D is generally excavated to house the modular catch basin. Liner 1704D may be an impermeable liner such as a pond liner if the bioswale is to hold water for irrigation. Cistern container 1707 generally forms the base unit of the modular catch basin 1700. The cistern container 1707 ideally may be placed upon a bed of sand to provide stability and also some amount of protection for the modular catch basin 1700 components. Cistern container 1707 is adapted to aggregate and, in some embodiments, store filtered water from a high performance bioswale. To funnel runoff or storm water into the modular catch basin 1700 for treatment, a water impermeable liner 1704A,1704B may be placed over a top grate 1701. As discussed above, the treated water may be reused in irrigation, routed to a municipal storm water facility for further treatment, or allowed to permeate into the surrounding soil.

Another use of a cistern container 1707 is as a sampling unit. For example, a water testing device 1709 such as a bucket or other container may be placed inside a cistern container 1707. Water collected in the bucket 1709 is readily accessible for sampling, testing, and reporting on the quality of the water. Such testing may be periodically conducted to determine the overall "health" of the bioswale system. Depending on the test results, bio-media or filter media replacement, vegetation replacement, or the addition of more modular catch basins 1700 may be warranted. Due to the importance and repeated nature of the sampling, it may be advantageous that access to the cistern container 1707 is quickly and easily accomplished so that maintenance can be accomplished economically by one maintenance worker.

Referring to FIG. 17A, the exemplary cistern container 1707 is formed of a hollow support structure half-unit mounted on a bottom grate 1711. Atop the bottom grate 1711 may be placed a sampling bucket 1709 also referred to as a water testing device or sampling device.

In FIG. 17A the cistern container 1707 is depicted as a half-unit but it should be noted that one or more hollow support structure full units may be used to form the cistern container 1707. The amount of water to be stored, the depth limit of the excavation, and width of the bioswale may all be factors when considering the quantity of half-units to stack atop each other to form the cistern container 1707. For example, if the filtered run-off water to be collected in the cistern containers 1707 are to be used for irrigation, two or more hollow support structure full units may be used because of the need to collect and store more water. On the other hand, if the depth of the bioswale excavation is limited by pipes, subterranean rock formations, or other obstructions then a hollow support structure half-unit may be used instead. Similarly, a hollow support structure half-unit may be used if excavation depth is limited but the width of the bioswale is not as constrained. Likewise, city and state regulations may require expensive civil engineers to excavate beyond a certain depth. Thus it may be preferable to excavate a shallower basin and use a shallower cistern container 1707.

In FIG. 17A, a sampling bucket 1709 is placed on a bottom grate 1711. The sampling bucket 1709 may be optional depending on the type of cistern container 1707 needed. In some embodiments of a high performance bioswale, a plurality of cistern containers 1707 may be placed adjacent to each other. In such a configuration, typically only one of the plurality of cistern containers 1707 would include a sampling bucket.

Each side of the cistern container 1707 may include removable sidewalls or side grates 1706. In FIG. 17A the four removable side grates 1706 (of the cistern container 1707) are half sized to fit the hollow support structure half-unit. Removable side grates 1706 are designed to keep sand, silt, and gravel out of the cistern container 1707. Filter fabric may be wrapped around the entire modular catch basin system to help keep sand and finer particulates from sifting down into the cistern container 1707. The filter fabric, the hollow support structure, and side grates 1706 allow water (and air) to enter and exit the cistern container 1707, yet keeps out sand, gravel and silt.

Covering the top of the cistern container 1707 is a connector ring 1702. A connector ring 1702 generally includes a removable support grate 1702A to rapidly access the cistern container 1707 and the sampling bucket 1709 contained therein. The connector ring 1702 may be fastened to the cistern container 1707 at the perimeter of the ring connector. The center of the connector ring 1702 may include a removable support grate 1702A. Once attached to the connector ring 1702, the support grate 1702A serves to support a filter sock housing 1703. In FIG. 17A the support grate 1702A is depicted as being circular shaped, however other shapes may also serve the same support function.

Atop the cistern container 1707 and resting on the connector ring 1702 is a filtration housing 1705. The exemplary filtration housing 1705 depicted in FIG. 17A is comprised of two hollow support structure half-units coupled to each other by their leg portions. The modular nature of the hollow support structure allows for more half-units to be added depending on the height of the filter sock housing 1703 to be housed.

As the name implies the filtration housing 1705 houses the bio-media filters 1708 and filter sock housing 1703. The bio-media filter 1708 may be further divided into sub-components; a bio-media filter sock or handbag and bio-media or filter media. The filtration housing 1705 supports and protects the bio-media filters 1708 and filter sock housing 1703, providing stability and a barrier against side or shear forces on the filter sock housing 1703. Full circle side grates 1706 may also be attached to the filtration housing 1705 to prevent sand, gravel and silt intruding into the filtration housing 1705.

In one embodiment of the invention, as illustrated in FIG. 17A, the filter sock housing 1703 is a hollow cylinder open at both ends. The sides of the cylinder 1703 may be perforated with holes or openings. The perforations may aid gas exchange of the bio-media filters 1708 and aeration of the vegetation 1713. Although vegetation 1713 is depicted as a leaf bearing plant, it should be noted that grass plants are preferable due to their higher root to shoot ratio, durability, and ability to sequester metals. The perforated cylinder 1703 is adapted to hold a plurality of bio-media filters 1708 in a stacked configuration. The perforated cylinder 1703 is sized to fit the bio-media filter 1708 such that the latter can be removed easily but without allowing excessive water to run down between the sides of the cylinder and the bio-media filter 1708. The height of the perforated cylinder 1703 may depend on the quantity of bio-media filters 1708 the perforated cylinder 1703 will hold. The height dimension of the perforated cylinder 1703 may also need to account for the one inch (1") preferred clearance from the top of the modular catch basin 1700 to the pond liner. As mentioned above, the one inch (1") elevation from the pond-lined channel 104 allows for even distribution of run-off into the modular catch basins 1700.

Inside each perforated cylinder 1703 may be one or more bio-media filter 1708. The bio-media filter 1708 are designed to contain a filter media such as sandy loam, bio-char, lava rock, perlite, sand, and activated carbon or additives such as chlorinated tablets. The filter media may also be a bio-media such as proprietary designer soil. A designer soil may contain a specified mixture of organic and inorganic minerals that target and sequester contaminants such as metals, hydrocarbons, bacteria, and organic and inorganic nutrients. Other combinations of organic and inorganic filter media may be utilized without deviating from the scope of the invention. A sealing disk 1712 may be placed at the bottom of the lowest bio-media filter 1708N to prevent root growth from entering the cistern container 1707. The bio-media filter 1708 is adapted to allow easy maintenance, removal, and replacement of the filter media. Each bio-media filter 1708 may be individually lifted out of the perforated cylinder 1703 and replaced by a minimal amount of personnel with a minimal amount of training.

In some embodiments of the invention, cistern container 1707 and filtration housing 1705 are both formed of hollow support structure half-units. While hollow support structure units are preferred for reasons that will be made apparent by the rest of the specification, other types of a containers or plastic crates may suffice. Rigid plastic crates or boxes may be substituted in place of the cistern container 1707 and filtration housing 1705 with positive results.

Refer now to FIG. 17B-17D for an in-depth look at the hollow support structure halves. Generally any material that can be molded or cast can be used to fabricate each hollow support structure half-unit used in the cistern container 1707 and filtration housing 1705. Materials may include but are not limited to plastics such as injection-molded polymer, polypropylene, high density polyethylene (HDPE), low-density polyethylene (LDPE).

The hollow structure of each hollow support structure half-unit allows air to circulate through the modular units to avoid anaerobic conditions and to facilitate grass plant growth within the top bio-media filter 1708A. For filtration to function properly there has to be an exchange of gases (aerobic conditions) so the biology, bacteria, and grass roots in the bio-media thrive and filter pollutants. Anaerobic conditions may also promote methane gas buildup in the cistern container 1707 as organic matter decomposes in the modular catch basin. Furthermore, gas exchange allows the cistern container 1707 to dry so that silt collected therein can be readily vacuumed out.

Referring now to FIG. 17B, a hollow support structure half-unit is depicted stacked atop another hollow support structure half-unit such that the legs of each half-unit are joined at the ends. As can be seen in FIG. 17B-17D, between each leg 1715 of the hollow support structures is a semi-circle or arch. When coupled together the two circle semi-circle create an opening into the center portion of the joined hollow support structure full unit. As shown in FIG. 17C, the legs 1715 are coupled together by complementary peg 1716 and hole element 1717 formed into each leg. In FIG. 17C the peg 1716 is formed on the upper leg and the hole 1717 in the lower leg, however the position of peg 1716 and hole 1717 may be reversed as shown in FIG. 17B (the two legs on the left side). The peg 1716 may include drainage slit 1719 to transfer water from the top half-unit to the bottom half-unit. Water inside the bottom half-unit may exit through drain holes 1714 formed in the hollow support structure.

Each hollow support structure half-unit may have a plurality of drain holes 1714 on an inside surface to allow water to flow out of the hollow spaces and into the inner portion of the hollow support structure. The upper half-unit typically has plugs positioned within its drain holes 1714 so that the water may drain down inside of the hollow structure through a side filter media 1723 (e.g., sand), a filter fabric, the hollow legs, and out though the drain holes 1714 in the lower half-unit.

In FIG. 17D, the upper and lower half-units are coupled to form a hollow support structure full unit. In one embodiment, the hollow support structure full unit measure approximately two feet by two feet (2"×2"), thus forming a cube; however other shapes such as a rectangle, polygon, or cylinder may be substituted without taking away from the inventive concept. The top portion of the upper hollow support structure half-unit may comprise a circular opening sized to fit the perforated cylinder 1703. The circular opening is adapted to receive and support the perforated cylinder 1703.

The lower hollow support structure half-unit may include drain holes 1714 to drain the sand filtered residual run-off water. Silt 1718 may form at the bottom of the lower half-unit after continuous use. This silt may be left to dry and vacuumed out or otherwise removed during maintenance of the high performance bioswale.

Previously, a means of attaching the upper and lower half-units of a filtration housing 1705 was disclosed. A similar method of using pegs 1716 and complementary holes 1717 may be used to fasten the legs 1715 of a hollow support structure to the corners of a bottom grate 1711. For example, in FIG. 17E a leg 1715 with a peg extension 1716 may be mated to a corner connector 1720 with a complementary hole 1717. In a similar but reversed situation illustrated in 17F, a leg 1715 with a hole 1717 is mated to a corner unit 1720 with a complementary peg 1716. The corner connectors 1720 may be molded as a unitary part of the top and bottom grate 1711 or may be added as needed. For example, in FIG. 17G, a snap-in corner unit 1721 may be snapped in place and fastened with a lock-tie 1722 or other fastening device. Snap-in corner units 1721 allow modification of existing catch basin grates with additional cistern containers 1707 or filtration housings 1705.

Figures 18A, 19A:
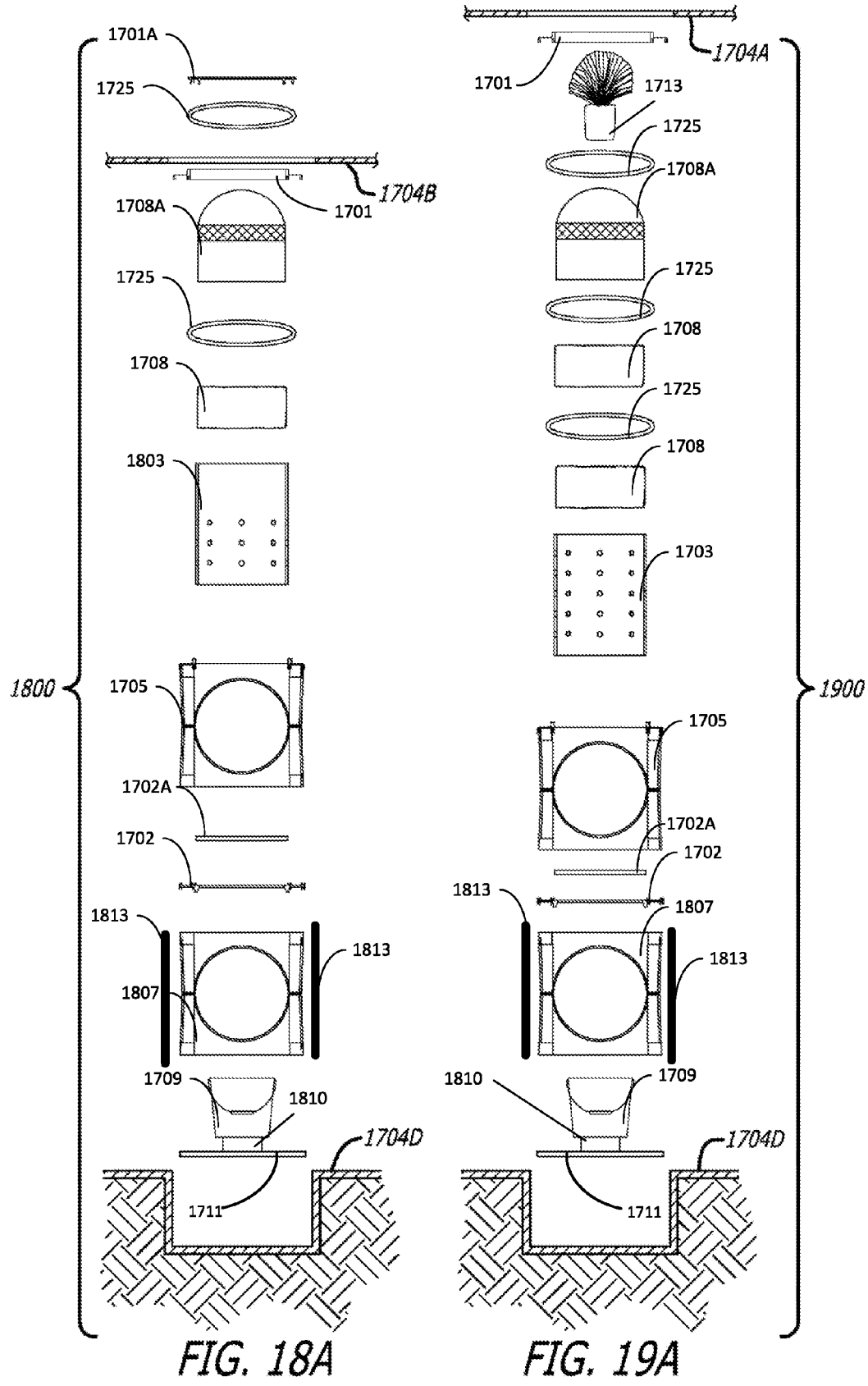
FIG. 18A is a system diagram of a catch basin embodiment containing two bio-media filter.
FIG. 19A is a system diagram of a catch basin embodiment containing three bio-media filter.

FIG. 18A is a system diagram of a modular catch basin embodiment 1800 which may be used in the forebay of a high performance bioswale. The modular catch basin 1800 illustrated in 18A share similar elements with the system described in FIG. 17A with some notable additions and differences. The modular catch basin 1800 of FIG. 18A, includes a sealing ring 1725. The modular catch basin 1800 also uses cistern container 1807 comprising a hollow support structure full-unit instead of a half-unit. This modular catch basin 1800 also includes a perforated cylinder 1803 that is not perforated along a portion of its length. Although the system diagrams 1800 and 1900 attempts to illustrate each component in its correct relative position, it should be noted that some components may fit through other components, thus their order is variable.

It is preferable to leave the upper portion of the perforated cylinder 1803 free of perforation when no vegetation 1713 is planted in the top bio-media filter 1708A. As mentioned previously, the perforations in the perforated cylinder 1803 aid in gas exchange and aeration. In this embodiment, vegetation 1713 is not present; therefore the perforations are not needed in the upper portion of the perforated cylinder 1803. The modular catch basin 1800 illustrated in FIG. 18A may be more suited for use in the forebay of a high performance bioswale system. The forebay pretreats and regulates the stormwater. Once the forebay fills up with pretreated stormwater, the water flows into the primary detention basin (PDB) where it receives a primary treatment.

Sealing ring 1725 is designed to prevent run-off water from bypassing the bio-media filter 1708 and flowing unimpeded through the gap between the bio-media filter 1708 and the inner wall of the perforated cylinder 1703. The sealing ring 1725 blocks the gap and forces run-off water to percolate through the bio-media. The sealing rings 1725 in FIG. 18A are shown separated from the bio-media filter 1708. This exemplary sealing ring 1725 may be a foam strip applied between the bio-media filter 1708 and the inner wall of the perforated cylinder 1703.

Sealing ring 1725 may also be attached to the bio-media filter 1708 via a series of loops sewn around the circumference of the bio-media filter 1708. The sealing ring 1725 may be threaded through the loops much like a belt through the belt loops of a pair of pants. When the bio-media filter 1708 is filled with a filter media and placed in the perforated cylinder 1703, the sealing ring 1725 presses against the perforated cylinder 1703 to prevent leakage.

The use of two hollow support structure half units as the cistern container 1807 may necessitate the use of a riser 1810. The purpose of the riser 1810 is to adjust the elevation of the sampling bucket 1709. It may be preferable for the top of the sampling bucket 1709 to be approximately four (4) inches above the waterline high level. The riser 1810 may be formed of a water resistant material strong enough to resist the weight of a filled bucket 1709 of water over a lengthy period of time. Furthermore, the riser 1810 may be adapted to removeably secure the sampling bucket 1709 to prevent it from sliding or tipping. For example, the riser 1810 may include a shallow depression in which the bottom of the sampling bucket 1709 may rest.

FIG. 19A illustrates another embodiment of a modular catch basin 1900. The modular catch basin system 1900 of FIG. 19A includes three bio-media filters 1708 in contrast to the two found in FIG. 18A. The use of a variable number of bio-media filter 1708 allow the modular catch basin 1900 to be specifically tailored to the particular types of pollutants found in the local run-off water. For example, in a three bio-med filter system, three types of filter media, such as pre-treatment, primary treatment, and polishing treatment, may be tailored to the type of pollutants found. In this specific embodiment, vegetation 1713 is illustrated as part of the modular catch basin 1900. This particular system shown in FIG. 19A may be more suited to use in a primary detention basin ("PDB"). The forebay removes larger debris from the run-off and regulates the flow of water whereas the PDB "polishes" the stormwater for reuse, infiltration or release. Vegetation 1713 is preferably used only in the PDB.

Figure 18B:
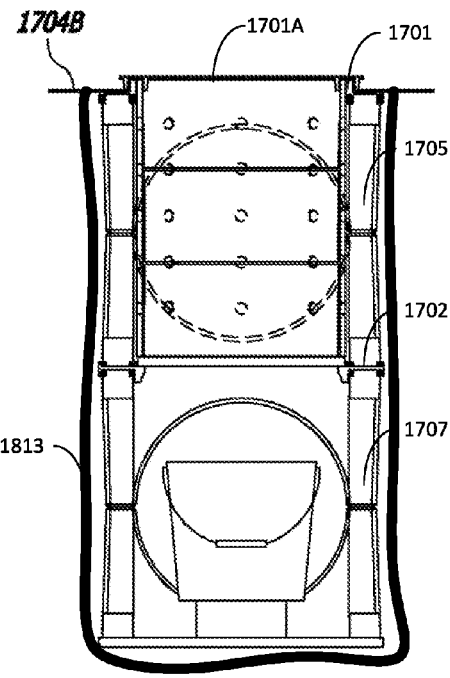
FIG. 18B is a side view of an exemplary filtration housing stacked above an exemplary cistern container 1707.
Figure 19B:
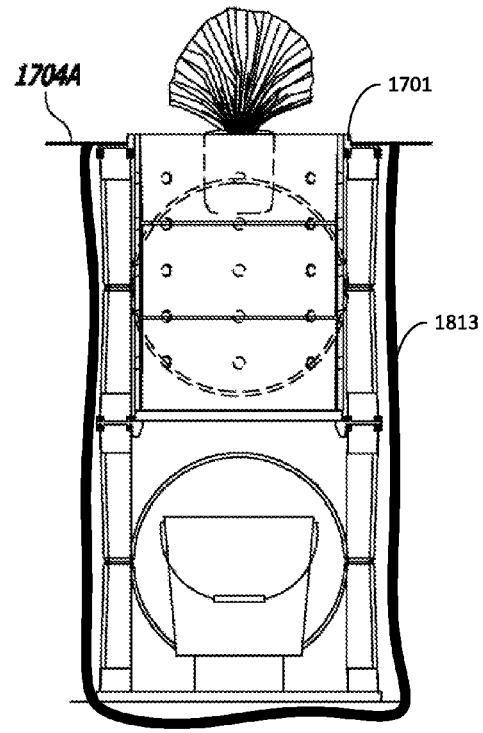
FIG. 19B is a side view of an exemplary filtration housing stacked above an exemplary cistern container, the first bio-media filter containing optional vegetation.

FIGS. 18B and 19B illustrate cross section side views of the modular catch basin 1800 and 1900, respectively as they would appear when assembled. Connector rings 1702 are shown connecting the cistern container 1707 to the filtration housing 1705. The connector rings 1702 are held in place by rows of parallel ridges adapted to lock onto the bottom of the filtration housing 1705 and top of the cistern container 1707. Filter fabric 1813 may be wrapped around the entire modular catch basin system. The filter fabric 1813, the hollow support structure, and side grates 1706 allow water (and air) to enter and exit the modular catch basin, yet keeps out sand, gravel and silt.

At the top of the modular catch basin covering the filtration housing 1705 is a top grate 1701 and a top grate cap 1701A. In FIG. 18B a top grate 1701 and a top grate cap 1701A are illustrated attached to and covering the filtration housing 1705. In FIG. 19B only the top grate 1701 is illustrated covering the filtration housing 1705. The top grate cap 1701A was removed to accommodate vegetation 1713. The top grate 1701 and top grate cap 1701A removeably attach to the filtration housing 1705 in a similar manner as the connector ring 1702. More details on the means of attachment may be seen in the magnified cross section views (FIGS. 18C and 19C)

Figure 18C:
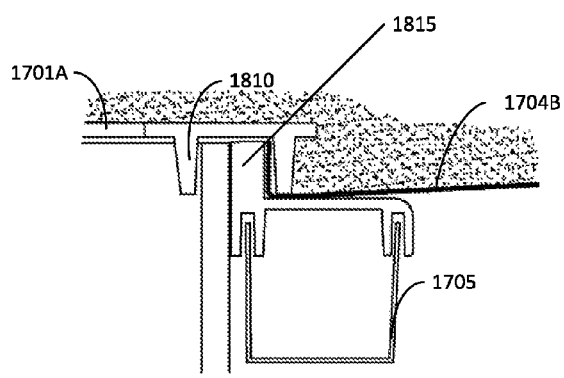
FIG. 18C is a magnified side view of the corner of an exemplary filtration housing depicting the fastening prongs of the top grate.

The attachment of a top grate 1701 and top grate cap 1701A to the filtration housing 1705 is shown in more detail in FIG. 18C. Two parallel ridges 1810 running along the perimeter of the top grate cap 1701A are adapted to lock onto the top of the perforated cylinder 1703 and a flange 1815 of the top grate 1701. An edge of pond liner 1704B may also be locked between the two parallel ridges 1810. Specifically, the wall of the perforated cylinder 1703, the flange 1815, and the edge of the pond liner 1704B fit tightly between the twin ridges 1810 of the top grate cap 1701A. Although the circular ridges are illustrated as prong like structures, keep in mind that FIG. 18C is a cross section side view and thus the prongs are merely a slice of continuous parallel circular ridges 1810.

Pond liner 1704B is also ballasted by decorative rocks (not shown) to keep the pond liner in place.

Figure 19C:
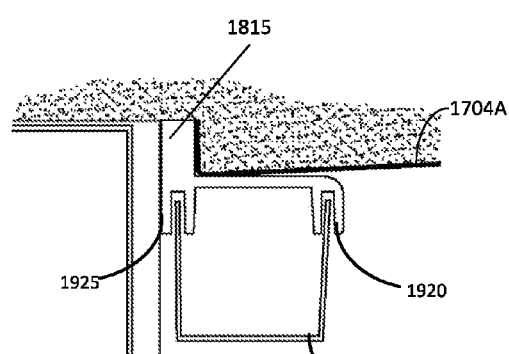
FIG. 19C is a magnified side view of the corner of an exemplary filtration housing depicting the fastening prongs of the top grate.

In FIG. 19C. a cutout side view of a top grate 1701, with the top grate cap 1701A removed, is illustrated. In this illustration, the top grate 1701 attaches to the walls of the filtration housing 1705. Like the top grate cap 1701A, the top grate 1701, also attaches by means of parallel ridges locking onto the walls of the filtration housing 1705. Specifically, the outer prong 1920, at the perimeter of the top grate 1701, locks onto the straight peripheral wall of the filtration housing 1705 and the inner prong 1925 locks onto the circular wall of the opening in the center of the filtration housing 1705. In FIG. 19C, the top grate cap 1701A has been removed to allow vegetation to grow from the top bio-media filter. The edge of pond liner 1704A is not trapped by top grate cap 1701A; however the pond liner 1704A is tightly fitted around the circular flange 1815 in the top grate 1701 and is also ballasted by decorative rocks to prevent excessive movement.

Once the primary components of a modular catch basin 2000 are assembled, they may be placed in a high performance bioswale to treat urban run-off. FIGS. 20A-20D illustrate cross section side views of assembled exemplary modular catch basins. The modular catch basins depicted in FIGS. 20A-20D are similar in most respects. To avoid repetition, only FIG. 20A will be described in detail.

Figure 20A:
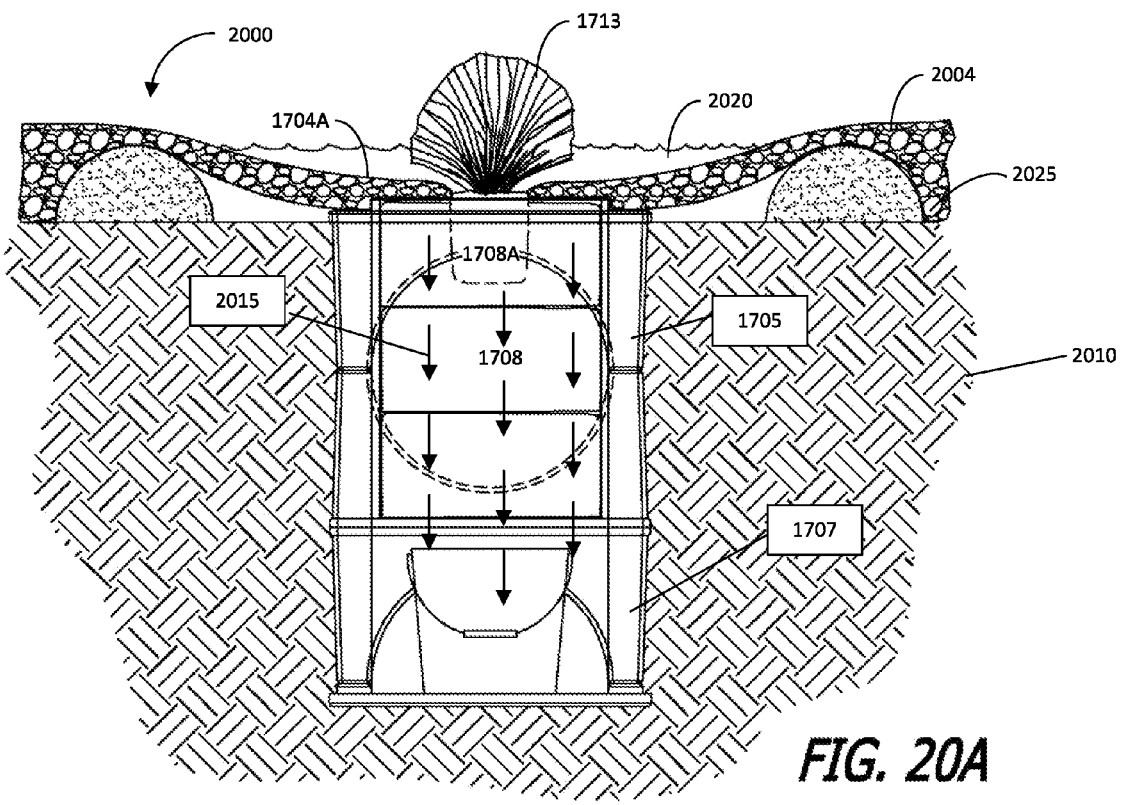
FIGS. 20A-20D illustrate the modularity of the modular catch basin with various heights and widths of hollow modular cube structural housing.
Figure 20B:
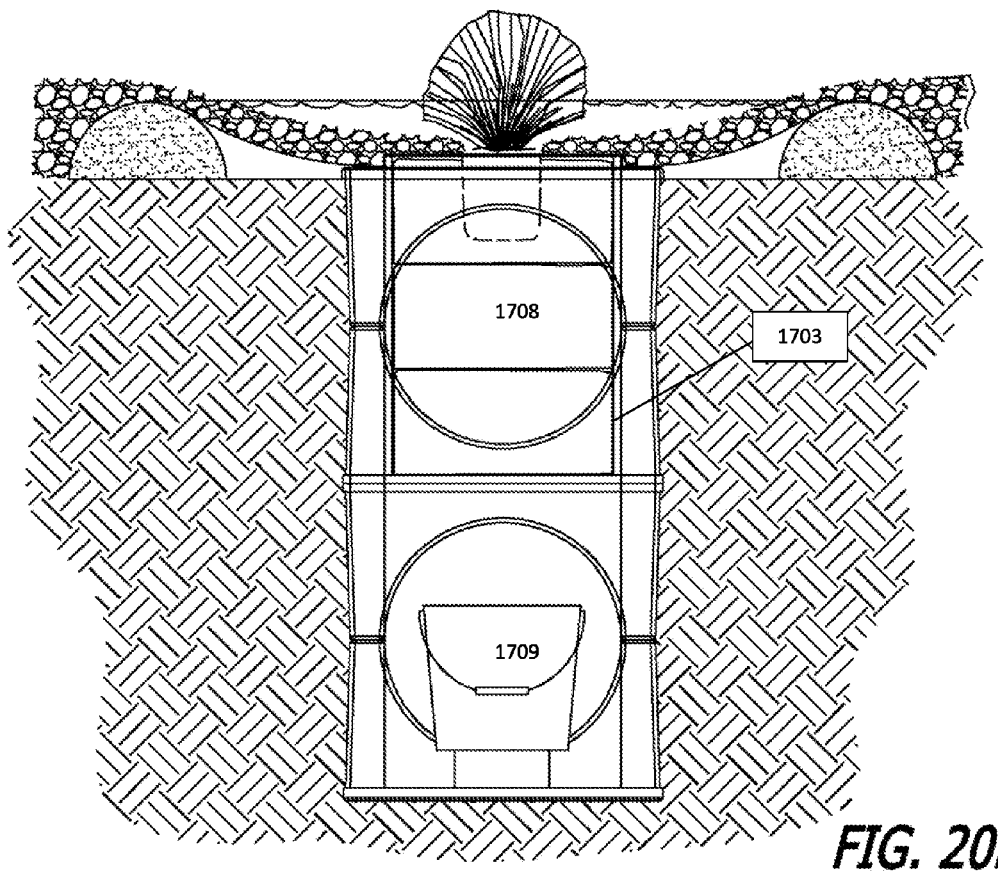

In FIG. 20A, the exemplary catch basin system 2000 includes a cistern container 1707 and a filtration housing 1705. A hollow support structure half-unit, with sampling bucket 1709 therein, comprise the cistern container 1707. Above the cistern container 1707 is the filtration housing 1705, comprising a hollow support structure full-unit containing three bio-media filters 1708. The top bio-media filter 1708A is potted with vegetation 1713. Pond liner 1704A forms the bottom of the bioswale and is slightly sloped towards the opening of the modular catch basin to channel run-off 2020 into the catch basin. The slope in the pond liner 1704A may be accomplished by placing curbs or bases of pea gravel or landscape foam 2025 such as geofoam to elevate the pond liner 1704A at the sides of the forebay or primary detention basin.

Decorative rocks 2004 may be placed atop the pond liner to provide an aesthetic touch. Decorative rocks 2004 may aid in ballasting the pond liner 1704A and may also filter out large debris before they reach the top grate 1701 of the catch basin. Decorative rocks 2004 also displaces the storm water so that water flows into the perforated cylinders 1703 evenly and provide ultra violet radiation (UV) protection to the pond liner 1704A underneath, preventing deterioration. The top of the modular catch basins are preferably elevated approximately one inch (1") above the pond liner 1704A to evenly distribute run-off water 2020 to all the catch basins in the bay. Directional arrows 2015 in FIG. 20A represent the direction of the water flow as the run-off 2020 percolates through the bio-media filter 1708 towards the cistern container 1707.

The various embodiments of the modular catch basins described herein share a fundamental advantage over many of the bioswale filtration systems currently in use. Rather than using piping that is prone to clogging and has relatively low flow volume, the high performance bioswale uses pond liners to channel the run-off towards the modular catch basins.

From there, the run-off water percolates by gravity action through the bio-media filters 1708 and is collected in the cistern container 1707. The modular catch basins are easy to install and easy to maintain. The current invention, improves on prior art filtration systems with a less costly, more reliable, and more eco-friendly method and apparatus of filtering storm water run-off.

Figure 20C:
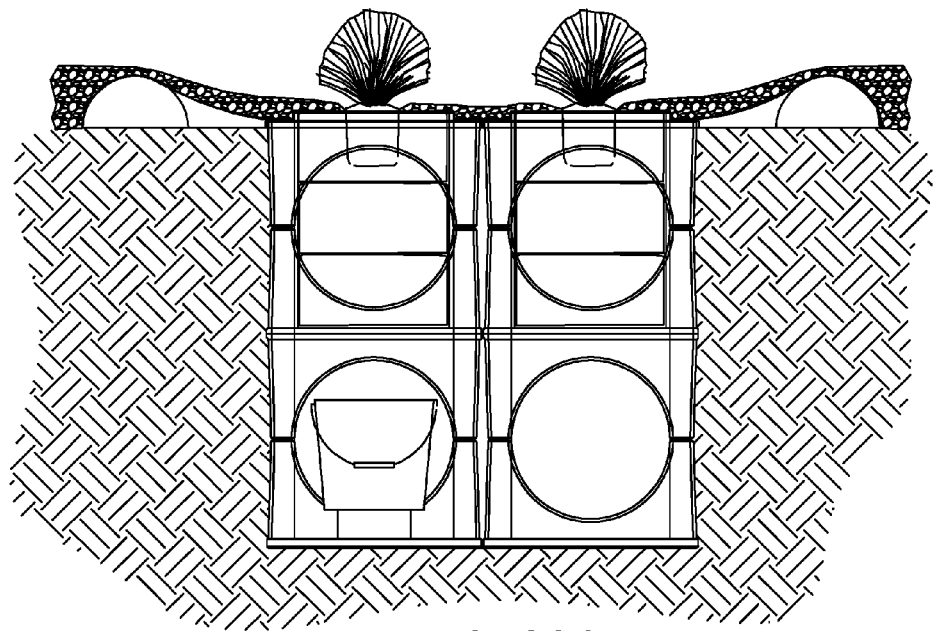
Figure 20D:
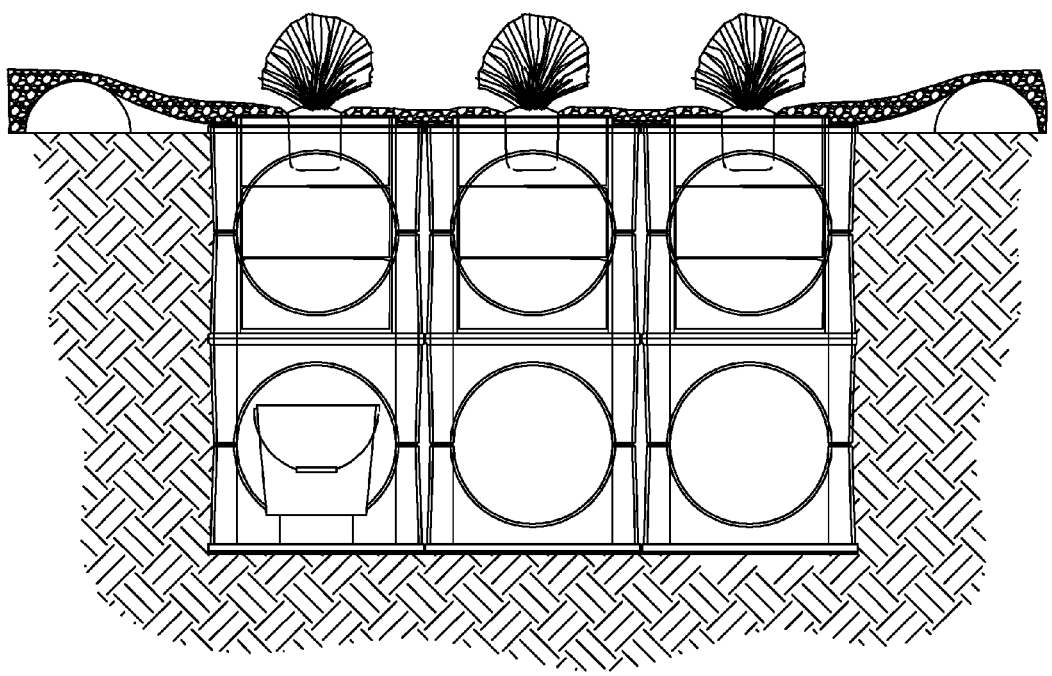

The modular advantage of the exemplary catch basin systems is exemplified in FIGS. 20A-20D. Various configurations of modular catch basin are illustrated showing the ease with which the bioswales can be scaled to accommodate project size by adding and subtracting modular catch basins. As shown in FIGS. 20C-20D, two and three modular catch basins may be placed side by side, increasing the volume of run-off treated per unit of time.

Bio-Media Filters

One of the objectives of the modular catch basin system is to provide a bioswale that can be easily maintained without the use of heavy equipment or intensive labor. One of the many novel improvements that allow the modular catch basin 1700 to meet this objective is the addition of the bio-media filter 1708. The bio-media filter 1708 allows one maintenance worker to service a bioswale rapidly and efficiently with minimal training.

Vegetation 1713 may be grown in a bio-media filter 1708 composed of approximately 50% organics (primarily composted greenwaste), the remaining 50% is sandy loam. The bio-media (full of microscopic flora and fauna) and grass roots break down the bacteria, organic nutrients, hydrocarbons and the metals (primarily zinc and copper) are sequestered in the sandy loam.

When the bio-media has reached its capacity to mitigate pollutants it is removed and replaced (by an on-site landscape maintenance contractor) with fresh bio-media filter 1708 and grasses as needed. The used bio-media filter 1708 including the grasses may be added to the site's existing greenwaste and taken to a local greenwaste composting facility where it is diluted and processed into a nutrient rich compost to be used in the landscape. Plants require micro elements such as zinc and copper, making the greenwaste valuable compost. The invention captures urban pollutants, processes it, and reuses it in the landscape—a "cradle to cradle" solution. The old bio-media filter 1708 may be recycled and reused by filling them with new filter media. The old filter media contained therein may be sent to a composting center for recycling and later reuse in a landscaped area.

Various views of an exemplary bio-media filter 1708 are illustrated in FIGS. 21A-21C. In general bio-media filter 1708 is a flexible cylindrical filter hand bag or sock made of a permeable material preferably resistant to degradation from soil and water. The cylindrical body of water permeable material having a ring shaped bottom with a bottom opening 2130 and a circular-shaped edge opposite the ring shaped bottom. The permeable material allowing filtration from bag to bag thru the bio-media.

A drawstring 2115 may be threaded through the top of the bag to cinch the bag closed as needed. The upper section of the bio-media filter may be made of a mesh material. When cinched the mesh material is at the top of the bag and allows more water to flow through the top of the bio-media filter 1708. Two sturdy lifting straps 2110 may be woven into the sides of the bag. A portion of the lifting straps 2110 may be attached to the bottom of the bio-media filter 1708 to provide extra reinforcement. Threaded through loops 2120 around the circumference of the sock may be one or more sealing rings 2125. A mesh disk 2105 may be inserted into the bio-media filter 1708 to cover an opening 2130 in the bottom of the bio-media filter 1708.

The bottom of the sock may have an opening 2130 or cut-out to allow root growth through the opening. Preferably this opening is smaller than the diameter of the bio-media filter 1708. In FIG. 21B the opening 2130 is depicted as a circular hole covered by a mesh material 2105. The mesh material 2105 may be sewn into the bottom of the sock.

Alternately, the mesh material 2105 may be made larger than the opening 2130 and placed inside the sock to cover the opening 2130. The mesh disk 2105 allows root growth but prevents the bio-media from escaping the bio-media filter 1708. Vegetation 1713 may be placed inside the bio-media filter 1708A as shown in FIG. 21C.

Figure 22A:
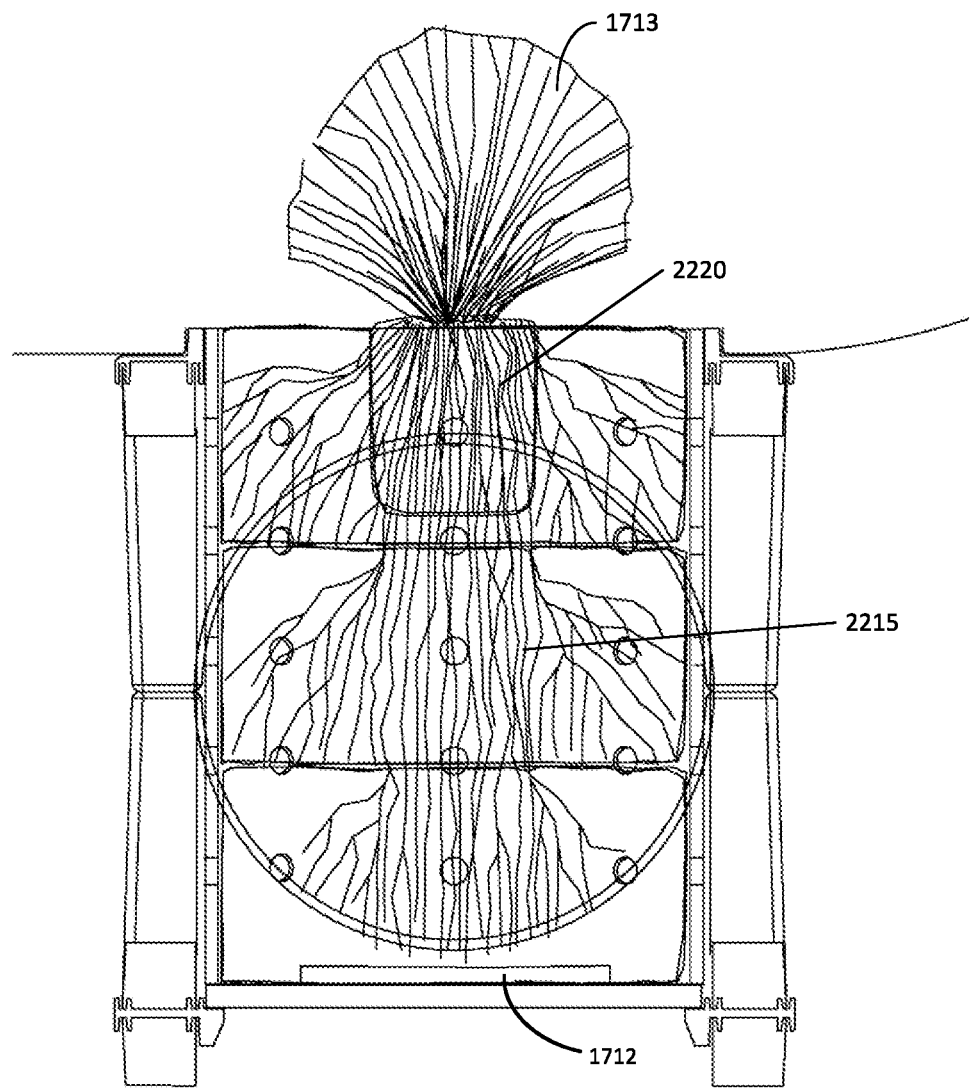
FIGS. 22A-22C are side cross section views of embodiments of bio-media filter inserted into the perforated hollow cylinder within a catch basin.

The bio-media filter 1708 is uniquely adapted to encourage vegetation growth. Besides having a stream of nutrient rich run-off water flowing through, the bottom opening 2130 in the bio-media filter 1708 also allows the root system to grow from the upper sock to the lower sock. As depicted in FIG. 22A, the roots 2215 grow virtually unimpeded through the openings in the socks below the vegetation 1713. For healthier growth, vegetation 1713 may be "potted" in a nutrient rich area of potting soil 2220 or the like within the bio-media 2225. A larger root system 2215 will generally treat more water by accumulating and sequestering more pollutants and metals. A permeable plastic insert or sealing disk 1712 may be placed over opening 2130 in the bottom sock to prevent the root system 2215 from growing out of the perforated cylinder 1703. The sealing disk 1712 will also keep the bio-media 2225 from exiting the last bottommost bio-media filter 1708.

Figure 22B:
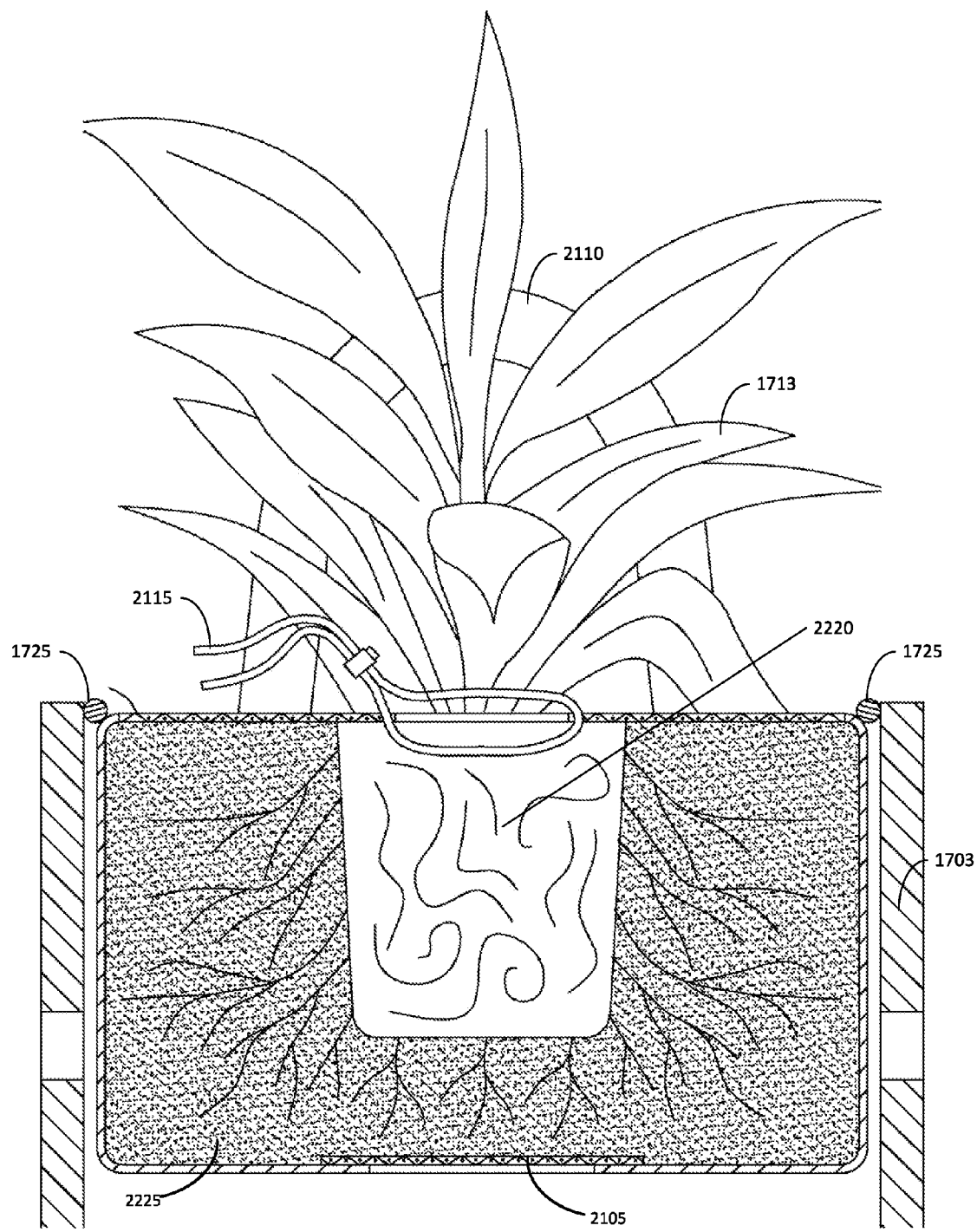
Figure 22C:
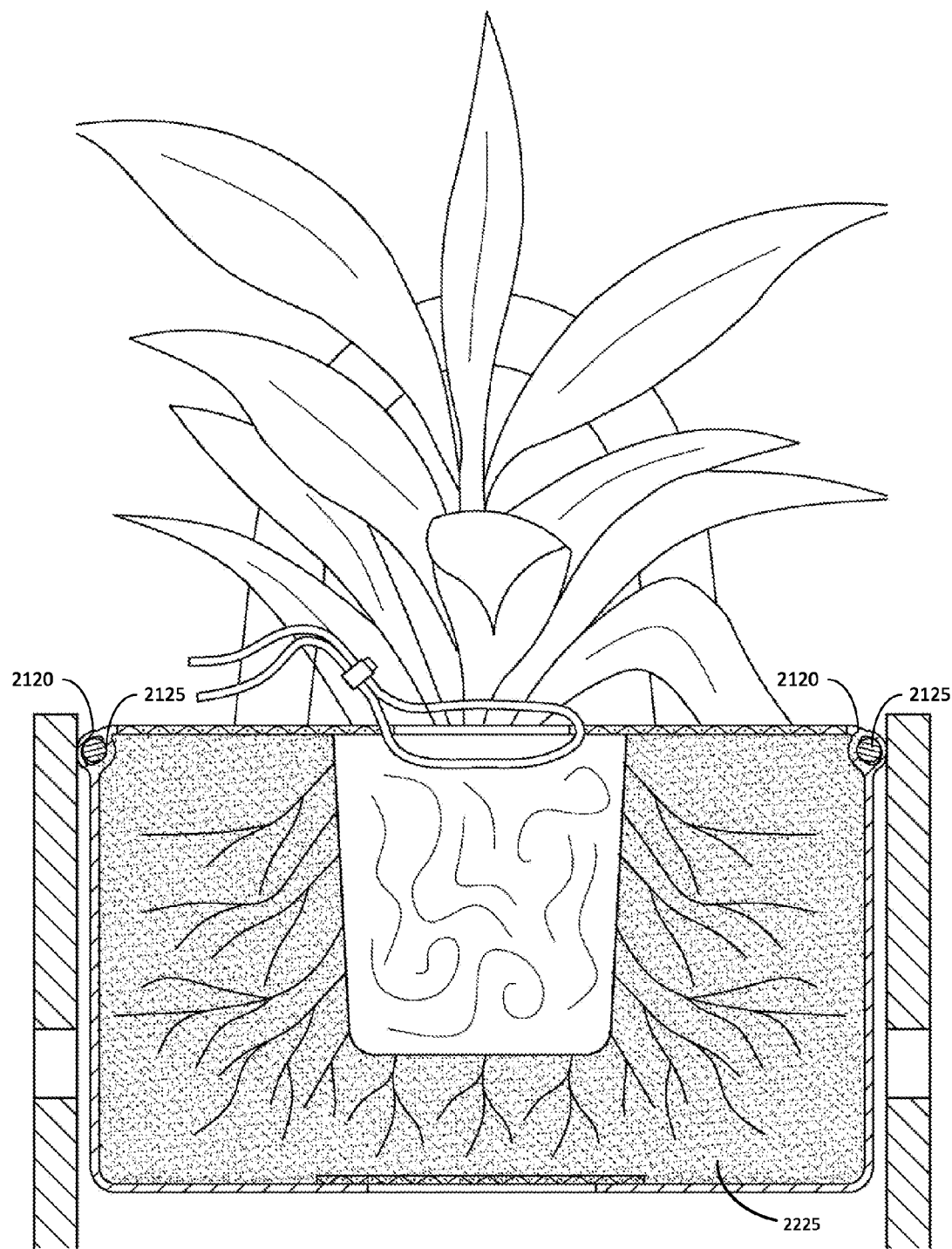

FIGS. 22B-22C illustrate cross section views of exemplary bio-media filter 1708 with different types of sealing rings 1725 attached. The diameter of a bio-media filter 1708 is preferably slightly smaller than the perforated cylinder 1703. However due to manufacturing tolerances and the type of filter media 2225 used, a small gap may be present between the bio-media filter 1708 and the inner wall of the perforated cylinder 1703. Water tends to flow down the path of least resistance thus a gap may permit water to flow unfiltered down into the cistern container 1707. The sealing rings 1725 may prevent water from flowing between the sock and the cylinder wall, bypassing the bio-media filters 1708. The sealing rings 1725 are adapted to substantially fill the gap, thus forcing the water to flow through the filter media 2225. The sealing ring 1725 depicted in FIG. 22B may be a foam strip or tubing separate from the bio-media filter 1708. For example, once the bio-media filter 1708 is placed into the perforated cylinder 1703 and the drawstring 2115 has been cinched closed, a sealing ring 1725 may be wedged into the gap between the sock and the inner wall of the perforated cylinder 1703. The sealing ring 1725 may prevent unfiltered run-off water from flowing down the gap and into the cistern container 1707.

In FIG. 22C, an alternative embodiment of the sealing ring 2125 is illustrated. In this embodiment, the sealing ring 2125 is attached to the bio-media filter 1708 through a series of loops 2120 sewn into the perimeter of the sock. The unitary sealing ring 2125 depicted may be easier to use and thus preferred. Other means of attaching a sealing ring 2125 to the sock should be obvious to one skilled in the art and is within the scope of the invention.

FIGS. 23A-29B illustrate various exemplary side grates 1706, connector rings 1702, support grate 1702A, top grates 1701, and bottom grates 1711 are shown in cross section and plan views. The various structures depicted may be formed of a similar material as the hollow support structure, e.g. injection-molded polymer, polypropylene, high density polyethylene (HDPE), low-density polyethylene (LDPE).

Figure 23A:
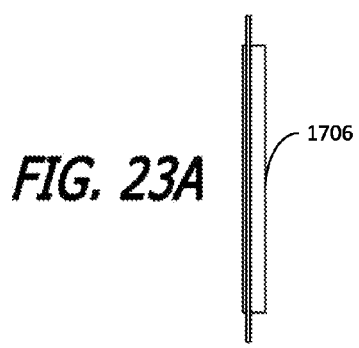
FIGS. 23A-23B are side and plan views of a side grate inserts for sides of a hollow modular cube structural housing full.
Figure 24A:
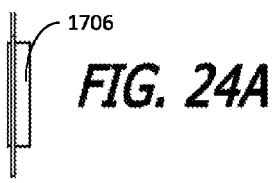
FIGS. 24A-24B are side and plan views of side wall inserts for a hollow support structure half-unit.
Figure 23B:
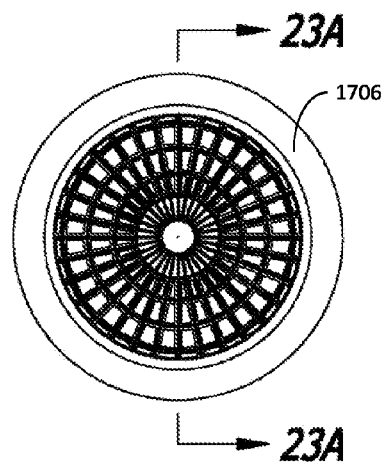
Figure 24B:
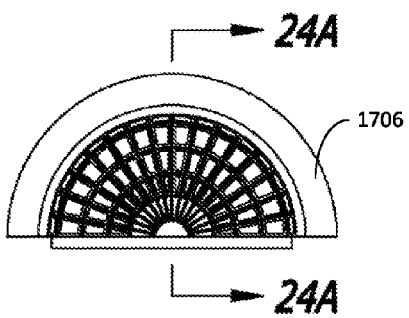

Side grates 1706 are shown in FIGS. 23A-24B. The side grates 1706 of FIG. 23A-23B are full circle side grates 1706 adapted for use with the hollow support structure full units. The side grates 1706 of FIG. 24A-24B are half circle side grates 1706 adapted for use with the hollow support structure half units. The side grates 1706 are preferably formed of radially spaced ribs interspersed with circular ribs in a web-like lattice. The spaces in between the ribs may be hollow allowing the passage of both air and water. A side grate 1706 flange may surround the rib structure. When the side grates 1706 are placed over the openings in the hollow support structure, the flange may overlap the side of the hollow support structure, to keep the side grates 1706 in place.

Figure 25A:
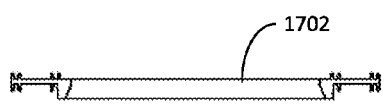
FIGS. 25A-25B are side and plan views of a connector ring for connecting hollow support structure units together.
Figure 25B:
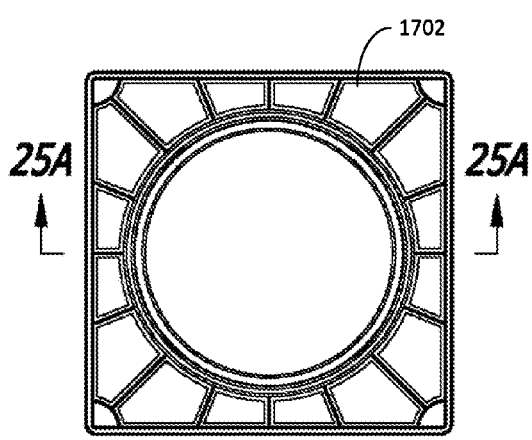

FIGS. 25A-25B illustrate an exemplary connector ring 1702. The connector ring 1702 connects the cistern container 1707 with the filtration housing 1705. The center of the connector ring 1702 has a circular opening to accommodate a support grate 1702A. Radially spaced ribs also provide structural support to the connector ring 1702, and like the grates and side grates, the spacing between the ribs are hollow. Parallel ridge fasteners formed on the connector ring 1702 may be used to secure the cistern container 1707 to the filtration housing 1705.

Figure 26A:
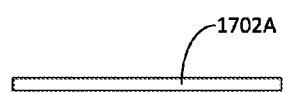
FIGS. 26A-26B are side and plan views of a support grate insertable into an opening of the connector ring of FIGS. 25A-25B.
Figure 26B:
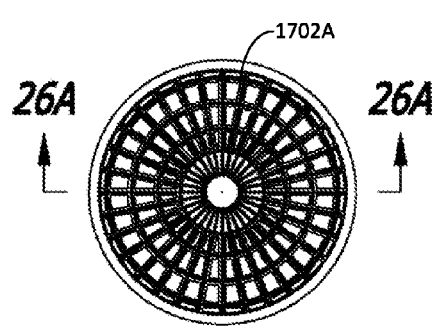

An exemplary support grate 1702A is illustrated in FIGS. 26A-26B. The support grate 1702A may be formed of radially spaced ribs interspersed with circular ribs much like the side grates 1706. The support grate 1702A may fasten to the inner set of upward facing parallel ridge fasteners on the connector ring 1702 or alternatively the support grate 1702A may rest on flanges protruding from the inner opening in connector ring 1702. The support grate 1702A supports the perforated cylinder 1703 and bio-media filter 1708 over the cistern container 1707.

Drain Down Grommets

Figure 30:
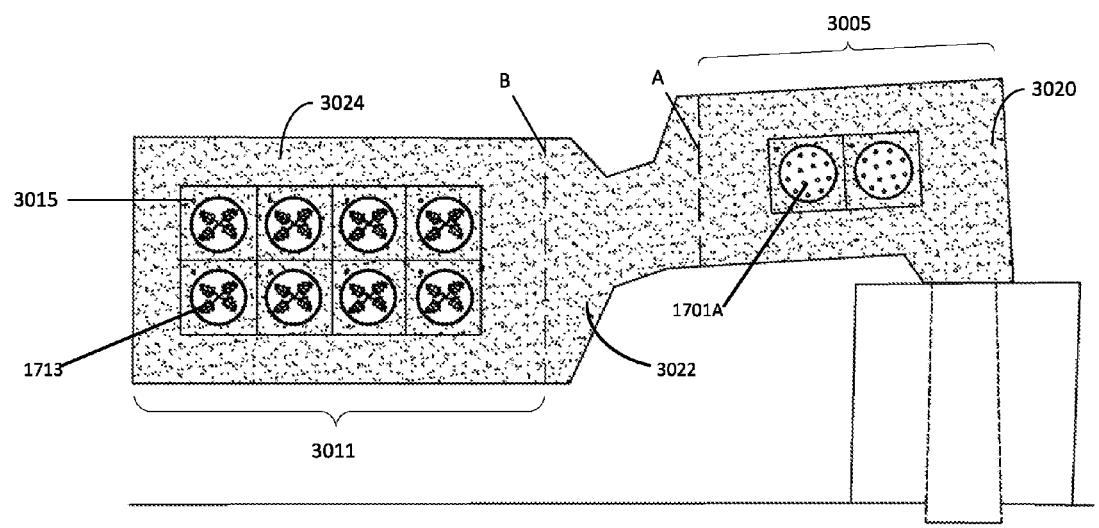
FIG. 30 is a plan view of an exemplary high performance bioswale depicting a drainage channel, forebay, and primary drainage bay (PDB) with catch basins equipped with drain down grommets.

In FIG. 30 an exemplary high performance bioswale is illustrated. Forebay 3005, weir section 3022, and primary detention basin (PDB) 3011 are covered by separate pond liners overlapping at dashed lines A and B. Forebay liner 3020 overlaps wier liner 3022 at dashed line A. Wier liner 3022 overlaps primary detention basin liner 3024 at dashed line B. The individual pond liners 3020, 3022, and 3024 are glued together at the overlap. The order of overlap, forebay to wier to PDB is important to prevent water from flowing under the liner.

As mentioned in the previous sections, the modular catch basin 1700 is elevated approximately one inch (1") above the pond liner. This elevation allows for the even distribution of the run-off water to all the modular catch basins 1700 in a forebay 105 or primary detention basin 111. However, a residual one inch (1") of water may be left behind because of the elevation.

Figure 31:
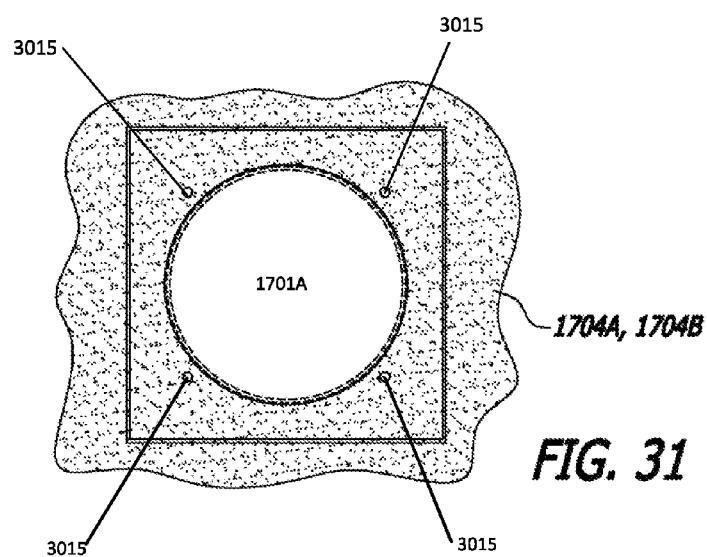
FIG. 31 is a plan view of an exemplary catch basin depicted with drain down grommets.

This residual water may stagnate in the forebay 3005 and primary detention basin 3011 if left untreated. By law, standing pools of water are not permitted because of disease carrying vectors. Thus a method of draining this residual water is needed. Referring to FIG. 30-31, a plurality of drain down grommets 3015 may be adapted to remove and filter the residual run-off water trapped in forebay 3005 and primary detention basin 3011.

Figure 32:
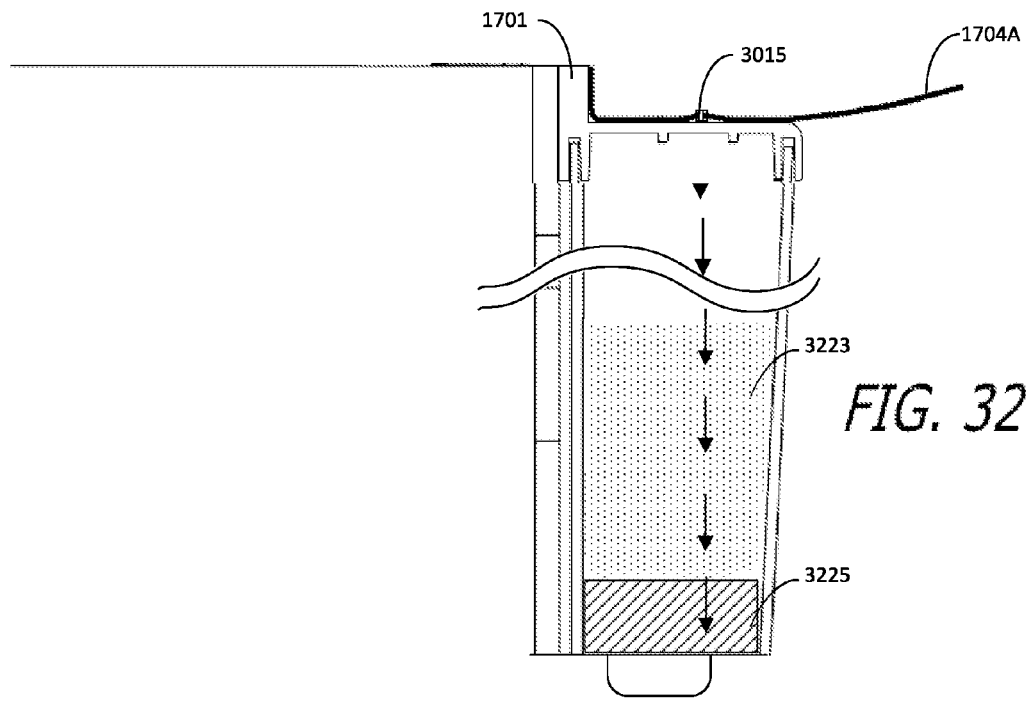
FIG. 32 is a magnified side view of the top corner an exemplary filtration housing with drain down grommets.
Figure 33:
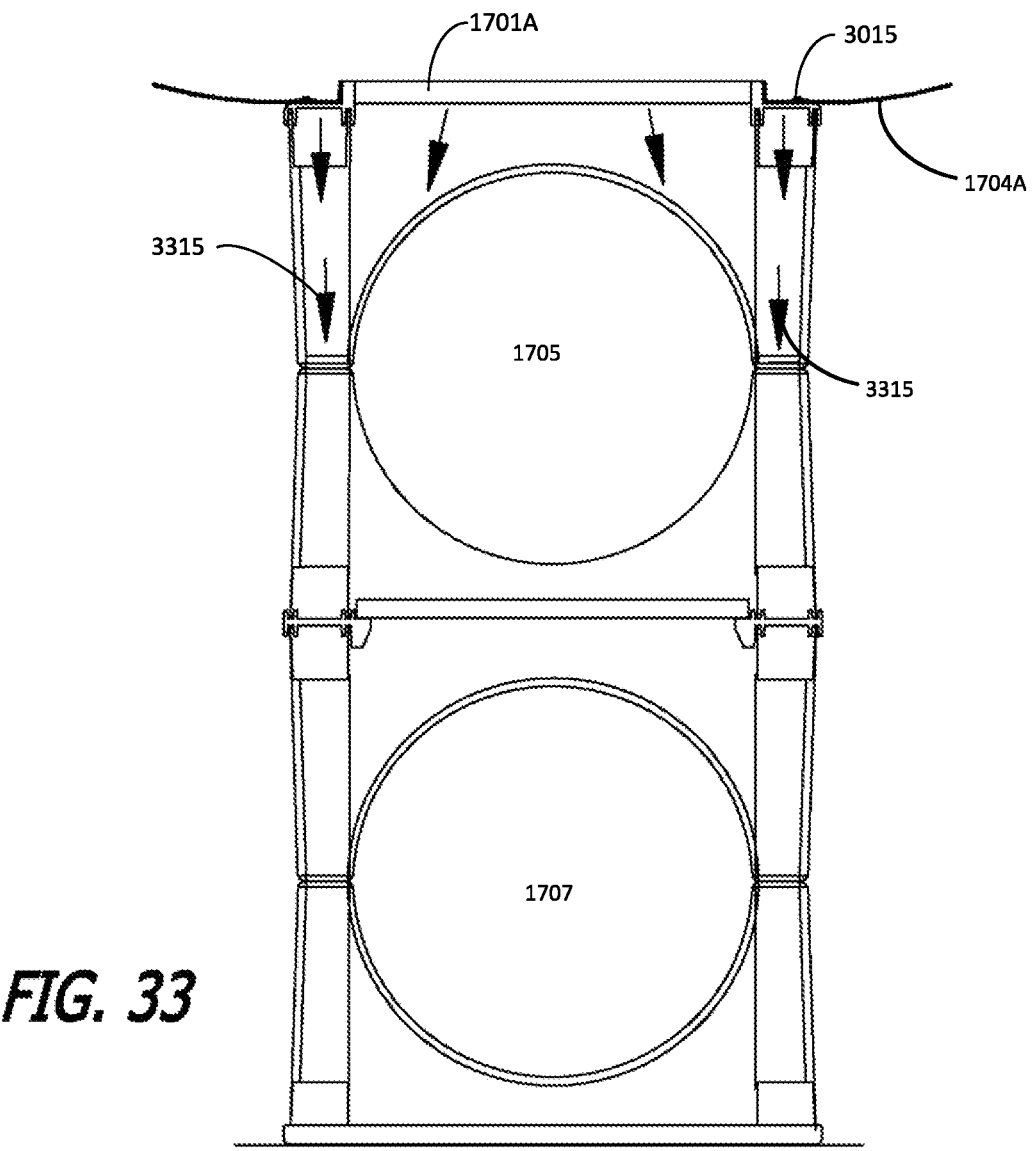
FIG. 33 is side view of an exemplary catch basin depicting the fluid flow through the drain down grommets.

Referring now to FIG. 31-33, in order to filter the residual run-off 3220, one or more drain down grommets 3015 are provided in the pond liner 1704A,1704B above top grate 1701 and the hollow support structure of the filtration housing 1705. The drain down grommets 3015 drains the residual water through the hollow space in the legs and side of the hollow support structure. A filter fabric 3225 is placed in the bottom of one or more legs to retain a filter media. The filter media 3223, for example sand, is placed on top of the filter fabric 3225 in the hollow spaces of the hollow support structure to filter the residual run-off 3220. Residual run-off draining through the drain down grommet 3015 is filtered through the sand 3223 and filter fabric 3225 and exits a drain hole 1714 in the lower half-unit.

Figure 32A:
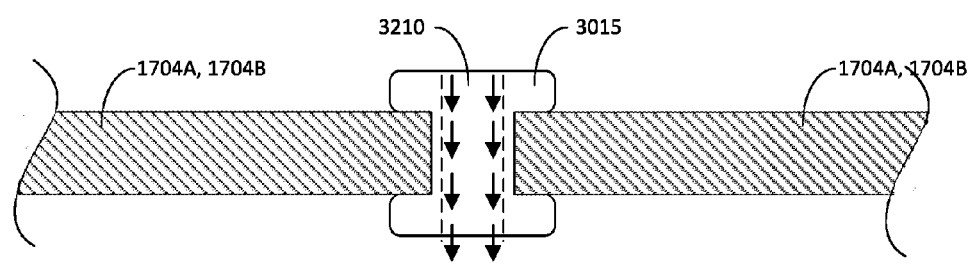
FIG. 32A is a magnified side view of a drain down grommet coupled to a water impermeable material, such as a pond liner.

FIG. 32A is a magnified side view of a drain down grommet 3015 coupled to a water impermeable material, such as a pond liner 1704A, 1704B. The grommet 3015 includes a drainage channel 3210 passes through the middle of the grommet. Run-off water passes though the grommet 3015 and pond liner 1704A, 1704B before entering the hollow walls of the support structure of the filtration housing 1705. FIG. 33, illustrates the flow of residual run-off through the filter media 3223 in the hollow support structure as represented by arrows 3315.

The solid wall support structures illustrated in FIG. 17A may require some modification of the flow path. Instead of flowing through filter media in the hollow walls of the filtration housing 1705, the grommets 3015 drain down directly onto filter media over filter fabric between the four solid walls and the perforated cylinder 1703. Filter fabric 3225 may also be placed over the connector ring 1702 and support grate 1702A to prevent sand and other particulates from migrating into the cistern container 1707.

Self-Supporting Filter Sock Housing

Although previous disclosed embodiments have included a hollow support structure for the filtration housing 1705, the modular catch basin 3400 may operate without the use of a hollow support structure. In FIG. 34-35, a perforated hollow cylinder 3403 connected to cistern container 1707 operates without the support of a hollow support structure. Run-off is still channeled into and through bio-media filter 1708 and into cistern container 1707 as before. However, without a hollow support structure, residual run-off does not have drainage path through the hollow support structure. Instead, hollow cylinder 3403 is adapted with support shoulder 3510 to channel the residual water from the drain down grommet 3015 into the support shoulder 3510 and from there into the perforated hollow cylinder 3403 and bio-media filter 1708. Support shoulders 3510 are hollow ledges fluidly connected to hollow cylinder 3403. The support shoulder 3510 provides a base on which to attach the top grate 1701. Drain down grommet 3015 mounted on the pond liner 1704B above top grate 1701 drain into the support shoulder 3510 fluidly connected to the hollow cylinder 3403. From the hollow cylinder 3403, the residual run-off joins the flow path of normal run-off and is filtered into cistern container 1707. Filter fabric 3325 is wrapped around the cistern container 1707 to prevent sand from migrating into the cistern container 1707.

Connector ring 3602 of FIG. 36 is adapted for use with the hollow support structure-less modular catch basin. The center of the connector ring 3602 has a circular opening to accommodate a support grate 1702A. Radially spaced ribs also provide structural support to the connector ring 3602, but unlike connector ring 1702, sheeting cover the spaces between the ribs and the sheeting is perforated by perforations 3615. Connector ring 3602 may be used to secure the cistern container 1707 to the perforated cylinder 3403. In FIG. 36A the exemplary connector ring with perforations 3602 is wrapped in a filter fabric 3225 to prevent sand from entering the cistern container 1707.

Figure 37:
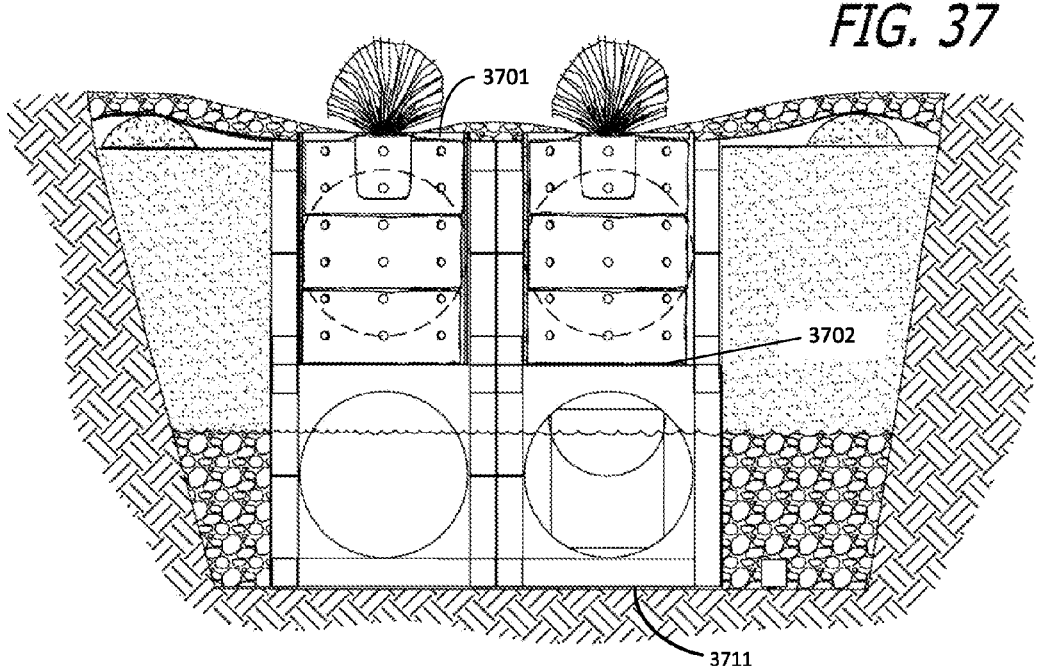
FIG. 37 is side view of an exemplary bioswale.
Figure 38:
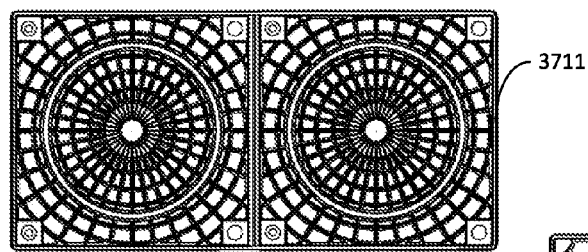
FIG. 38 is a plan view of an exemplary unitary bottom grate.
Figure 39A:
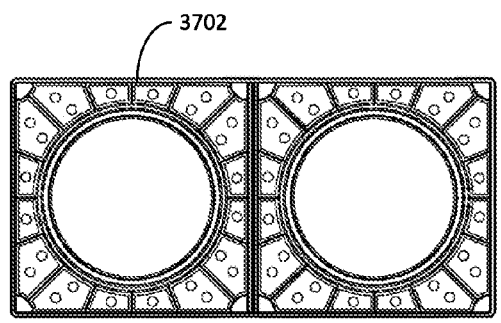
FIGS. 39A-39B are top and cross section views of an exemplary unitary connector ring.
Figure 39B:
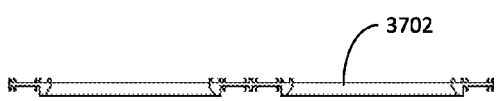
Figure 40:
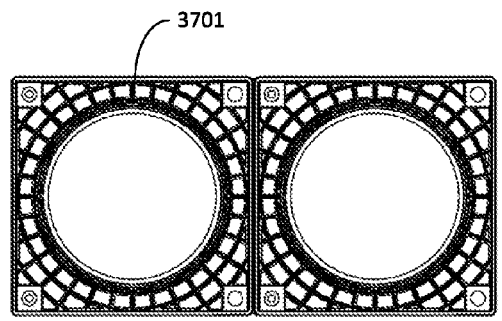
FIG. 40 is a plan view of an exemplary unitary top grate.
Figure 41:
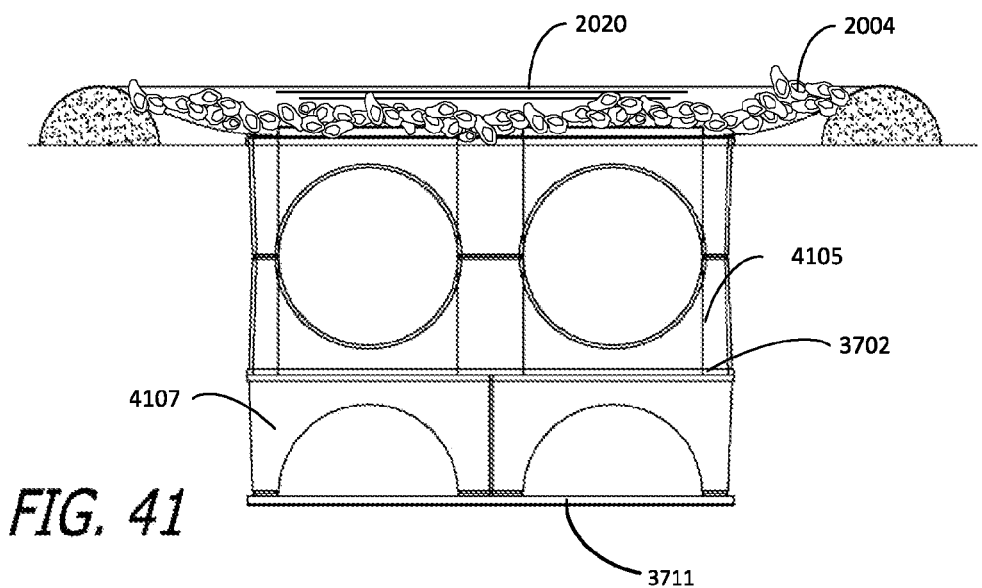
FIG. 41-42 are side views of exemplary catch basins depicting the modular nature of embodiments of the invention.
Figure 42:
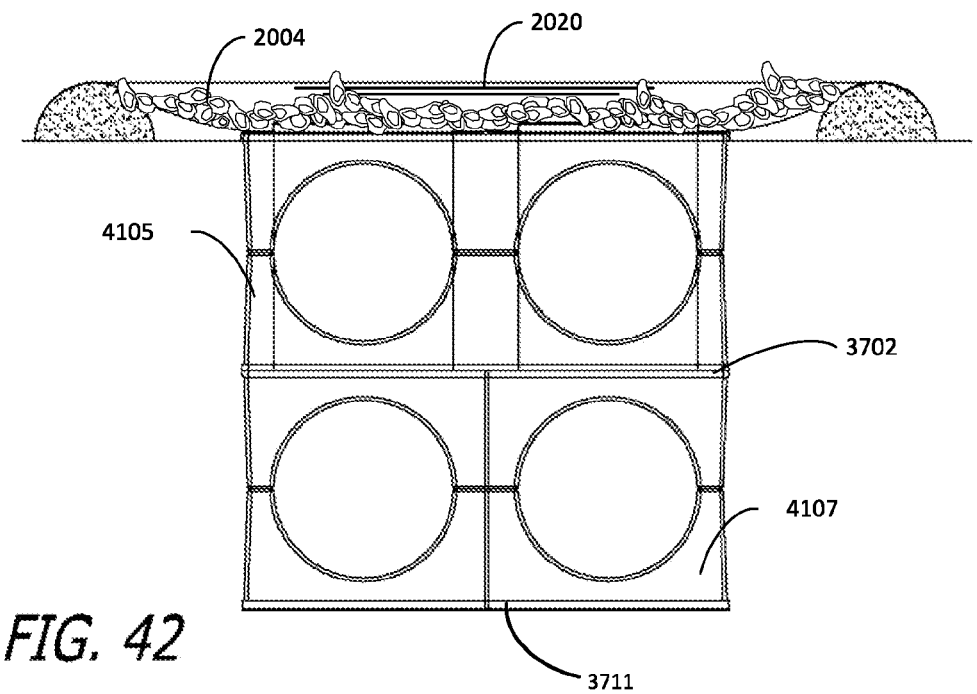
Figure 43:
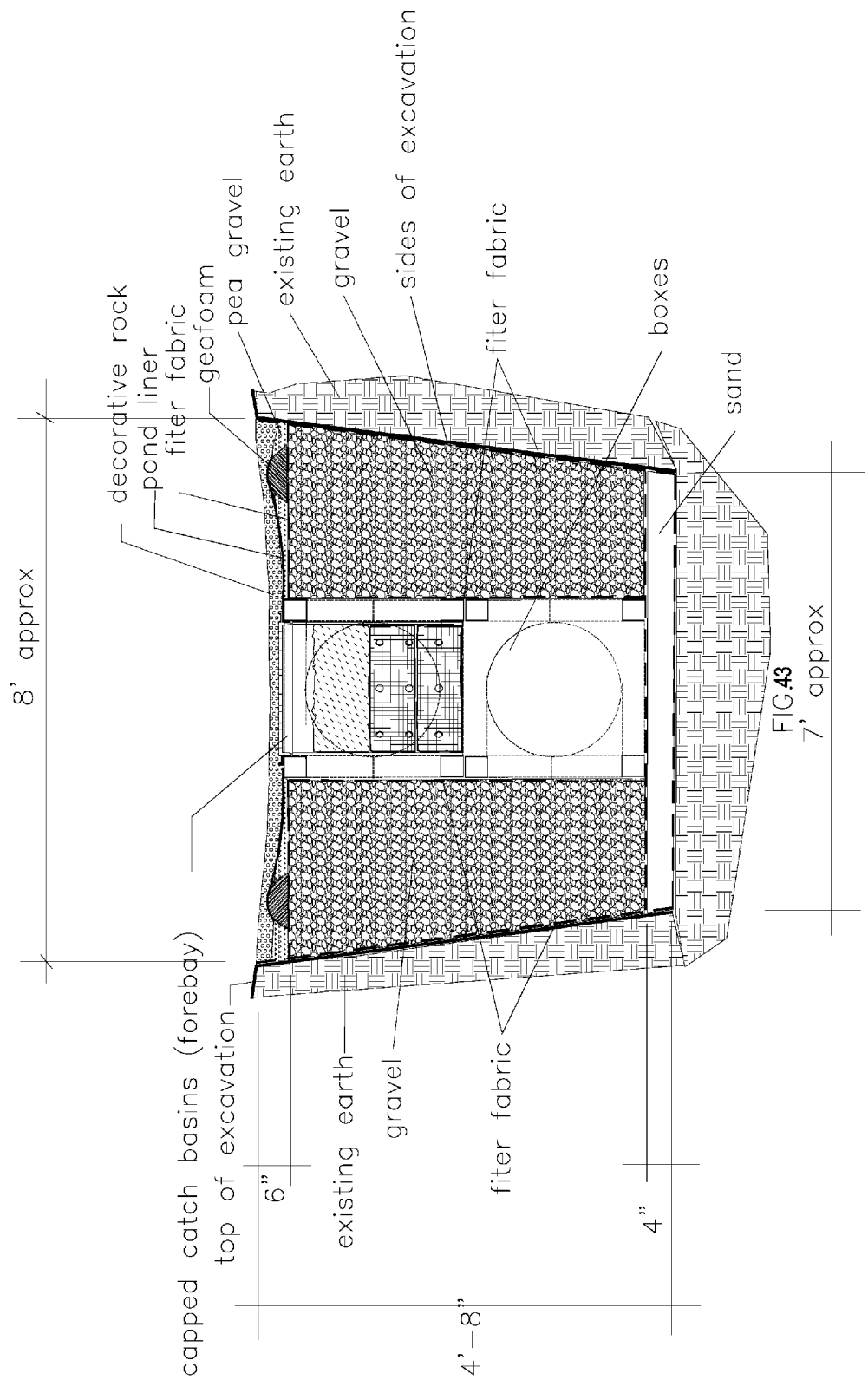
FIG. 43 is a cross section view of an exemplary catch basin depicting with emphasis on the excavation.

In previous disclosed embodiments, the grates and connector rings have been illustrated as being squares. FIGS. 37-40 disclose unitary grates and connector rings for assembling modular catch basin which are connected together. In FIG. 37 unitary top grate 3701, unitary connector ring 3702, and unitary bottom grate 3711 are all of one-piece design. Similarly, FIGS. 41-42 discloses joined filtration housings 4105 and joined cistern container 4107. The unitary grates and joined containers may allow for more precise placement of units next to each other thus allowing more even distribution of run-off to each modular catch basin.

Method of Maintaining a Modular Catch Basin

The typical prior art bioswale requires an extraordinary amount of maintenance to maintain its effectiveness at removing contaminants from run-off. Over the course of many rainfalls, the typical prior art bioswale fills with heavily polluted silt that cause the bioswale's primary filtration means; soil biology and vegetation, to fail. To adequately maintain a bioswale, the polluted silt needs to be removed by removing the top 1"-2" of soil and vegetation. The bioswale may need to be rebuilt. Few existing bioswales are well maintained due to the prohibitive cost. A significant percentage of existing bioswales lay unattended and are virtually useless for removing run-off contaminants. Thus there is a need for a high performance modular bioswale system that is highly effective yet relatively easy to construct and maintain. The following method of maintaining a modular catch basin was developed to meet this need.

The method disclosed herein for maintaining the modular catch basin may be performed at relatively low cost by a single maintenance worker. No costly training or heavy machinery is required to maintain the high performance bioswale at peak operating efficiency for dozens of years. Momentarily refer back to FIGS. 19A, 20A, and 21A for illustrations of the method of installation.

To install a modular catch basin, a maintenance worker first removes decorative rocks 2004 that may be obstructing top grate 1701. Next the maintenance worker removes the top grate 1701 of the modular catch basin to reveal a first bio-media filter 1708A mounted within a hollow perforated circular cylinder 1703;

By reaching down into the hollow perforated circular cylinder 1703, the maintenance worker may grasp and pull up on a pair of lifting straps 2110 at the top used bio-media filter 1708 to remove it from the hollow perforated circular cylinder 1703 and the catch basin. Once the top bio-media filter 1708A is removed, the lower used bio-media filter(s) 1708 can be removed in a similar manner.

If water quality testing needs to be done, a support grate 1702A underneath the hollow perforated circular cylinder 1703 may be removed to reveal a water sampling device 1709. The maintenance worker may test water captured by the water sampling device 1709 to determine if the first and second bio-media filter 1708 require replacement. Excessive silt may accumulate at the bottom of the filtration housing 1705 or cistern container 1707. During summer months or other dry spells the silt may be left to dry and vacuumed out of the catch basin. Some light washing of the hollow support structure may also be done after the silt has been removed.

The decorative rock and pond liner will collect debris and silt. The debris may be removed and the silt washed down into the lower cisterns through an opened catch basin. During the summer months (June-September) the cisterns may dry. Late September the dried silt is ideally vacuumed out of the cisterns The maintenance worker may replace the used bio-media filter 1708A with new ones by first replacing the support grate 1702A and then grabbing a pair of lifting straps 2110 of a first new bio-media filter 1708 and lowering the first new bio-media filter 1708 into the hollow perforated circular cylinder 1703. To ensure that run-off water does not bypass the bio-media filter 1708, the maintenance worker may need to adjust a first sealing ring 2125 to seal between an edge of the first new bio-media filter 1708 and an inner surface of the hollow perforated circular cylinder 1703.

Placement of more bio-media filters 1708 and adjusting their sealing rings 2125 may be repeated as needed depending on the type of bioswale being maintained. Once all the biomedia filters 1708 are in place, the top grate 1701 of the modular catch basin is reinstalled to cover over the new bio-media filter 1708.

Vegetation 1713 may be grown in a bio-media filter 1708 composed of approximately 50% organics (primarily composted greenwaste), the remaining 50% is sandy loam. The bio-media (full of microscopic flora and fauna) and grass roots break down the bacteria, organic nutrients, hydrocarbons and the metals (primarily zinc and copper) are sequestered in the sandy loam.

When the bio-media has reached its capacity to mitigate pollutants it is removed and replaced (by an on-site landscape maintenance contractor) with fresh bio-media filter 1708 and grasses as needed. The used bio-media filter 1708 including the grasses may be added to the site's existing greenwaste and taken to a local greenwaste composting facility where it is diluted and processed into a nutrient rich compost to be used in the landscape. Plants require micro elements such as zinc and copper, making the greenwaste valuable compost. The invention captures urban pollutants, processes it and reuse it in the landscape—a "cradle to cradle" solution. The old bio-media filter 1708 may be recycled and reused by filling them with new filter media 2225. The old filter media 2225 contained therein may be sent to a composting center for recycling and later reuse in a landscaped area.

Method of Installing a Modular Catch Basin

Typical prior art bioswales in use today are often expensive to install. Large excavations are required to house the bioswales and some may even require a concrete housing surrounding the bioswale. The high performance bioswale and modular catch basin disclosed herein require less area, thus leaving a smaller footprint on the environment. Furthermore, instead of costly concrete basins, the high performance bioswales and modular catch basin systems use pond liners to channel run-off and form treatment basins instead of concrete. The following method of installing a modular catch basin allows a high performance bioswale to be scaled to fit the project need. Momentarily refer back to FIGS. 17D, 19A, and 20A for illustrations of the method of installation.

There are generally two excavations that receive the invention. Both excavations are sized according to need. The size of the watershed, soil percolation and volume of stormwater are all factors that are considered when determining the size of the excavation. The first excavation is a forebay 105 where stormwater is pre-treated and volumes regulated. After the forebay treatment, stormwater flows into the primary detention basin 111 where it receives a primary filtration or "polishing" treatment. Treated water is captures in the lower cistern container 1707 where it then allowed to infiltrate existing soils into the aquifer; be reused (pumped) as irrigation water in the landscape, and or allowed to drain into the existing municipal stormwater drainage system.

Soil must first be excavated to create a first excavation for a water treatment system. The area of soil excavated may be less than needed relative to typical prior art bioswale systems, due to the efficiency of the modular catch basin. Once the excavation is completed, the excavation may be lined with a fabric or impermeable lining 1704D. For high performance bioswales that reuse the treated water for irrigation, an impermeable liner holds the water until needed. A fabric or permeable liner can be used in high performance bioswale systems that allow the treated water to permeate back into the soil.

A first hollow support structure is then placed into said first excavation to function as a cistern container 1707. Sand may be used to support and level the cistern container to the proper elevation.

A second hollow support structure can be coupled to the first hollow support structure to function as a filter container 1705. A filter fabric 3225 may be inserted into at least one hollow leg 1715 of the second hollow support structure to filter residual run-off from the drain down grommets. At least one hollow leg 1715 of the second hollow support structure may also be filled with a with filter material 1723 such as sand, for a final drain down of the residual run-off water 3220.

Next, a first perforated cylinder 1703 is installed into said second hollow support structure. Then, at least one bio-media filter 1708 is placed into said first perforated cylinder 1703. The at least one bio-media filter 1708 comprising a proportion of at least one filtrating substance, e.g. sandy loam, bio-char.

Once the bio-media filter(s) 1708 are in place, the second hollow support structure is capped with a top grate 1701 and an impermeable liner 1704B is overlaid around the first perforated cylinder 1703 over the top grate 1701. Drain down grommets 3015 in the impermeable liner 1704B are aligned to the hollow leg 1715 with filter material 1723 inside. Decorative rocks 2004 may be installed to ballast portions of said impermeable liner 1704B and hold it in place.

The above method of installation may be repeated as needed to scale the high performance bioswale system to fit the project size. Different combinations of cistern container 1707 and filtration housings 1705 may be used to fit the filtration requirements as well as space availability.

Embodiments of modular catch basins for high performance bioswales have been described. The foregoing description of the various exemplary embodiments of the invention has been presented for the purposes of illustration and disclosure. It is not intended to be exhaustive or to limit the embodiments of invention to the precise form disclosed. Many modifications and variations are possible in light of the above teaching. It is intended that the scope of the embodiments of the invention not be limited by this detailed description, but construed by the claims and the equivalents to the claims that follow below.

What is claimed is:

1. A reusable flexible filter hand bag for holding a replaceable filter media, the reusable flexible filter hand bag comprising:
   a hollow cylindrical base of water permeable material having a ring shaped bottom with a bottom opening and a circular-shaped edge opposite the ring shaped bottom;
   a first mesh netting coupled to the ring shaped bottom of the hollow cylindrical base over the bottom opening;
   a cylindrical ring of a second mesh netting having a first circular-shaped edge coupled to the hollow cylindrical base near the circular-shaped edge thereof and a second circular-shaped edge forming an upper opening to receive filter media;
   a cinchable drawstring intertwined near a second circular-shaped edge of the cylindrical ring of the second mesh netting, the cinchable drawstring to cinch the second circular-shaped edge together to close the upper opening to a smaller opening around the filter media; and
   a pair of lifting straps coupled to the hollow cylindrical base of water permeable material opposing each other, the pair of lifting straps to ease lifting and carrying of the reusable flexible filter hand bag when filed with filter media.

2. The reusable flexible filter hand bag of claim 1, further comprising:
   a sealing disk of water permeable material insertable into the hollow cylindrical base to cover over the first mesh netting and the bottom opening.

3. The reusable flexible filter hand bag of claim 1, further comprising:
a sealing ring coupled to the hollow cylindrical base of water permeable material near the circular-shaped edge thereof.

4. The reusable flexible filter hand bag of claim 3, wherein:
the hollow cylindrical base of water permeable material includes a plurality of loops to receive a sealing tube to form the sealing ring coupled to the hollow cylindrical base.

5. The reusable flexible filter hand bag of claim 1, wherein:
the water permeable material is a woven plastic.

6. The reusable flexible filter hand bag of claim 1, wherein:
the first and the second mesh nettings are plastic mesh netting.

7. A reusable flexible filter hand bag comprising:
a hollow cylindrical base of water permeable material having a ring shaped bottom with a bottom opening and a circular-shaped edge opposite the ring shaped bottom;
a first mesh netting coupled to the ring shaped bottom of the hollow cylindrical base covering over the bottom opening;
a filter media within the hollow cylindrical base over the ring shaped bottom and the first mesh netting;
a cylindrical ring of a second mesh netting having a first circular-shaped edge coupled to the hollow cylindrical base near the circular-shaped edge thereof and a second circular-shaped edge forming an upper opening around the filter media;
a cinchable drawstring intertwined near a second circular-shaped edge of the cylindrical ring of the second mesh netting, the cinchable drawstring cinching the second circular-shaped edge together to close the upper opening to a smaller opening around the filter media; and
a pair of lifting straps coupled to the hollow cylindrical base of water permeable material opposing each other, the pair of lifting straps to ease lifting and carrying of the reusable flexible filter hand bag with the filter media.

8. The reusable flexible filter hand bag of claim 7, further comprising:
a sealing disk of water permeable material in the hollow cylindrical base under the filter media and covering over the first mesh netting and the bottom opening.

9. The reusable flexible filter hand bag of claim 7, further comprising:
a sealing ring coupled to the hollow cylindrical base of water permeable material near the circular-shaped edge thereof.

10. The reusable flexible filter hand bag of claim 9, wherein:
the hollow cylindrical base of water permeable material includes a plurality of loops to receive a sealing tube to form the sealing ring coupled to the hollow cylindrical base.

11. The reusable flexible filter hand bag of claim 7, wherein:
the water permeable material is a woven plastic.

12. The reusable flexible filter hand bag of claim 7, wherein:
the first and the second mesh nettings are plastic mesh netting.

13. A reusable flexible filter hand bag comprising:
a hollow cylindrical base of water permeable material having a ring shaped bottom with a bottom opening and a circular-shaped edge opposite the ring shaped bottom;
a first mesh netting coupled to the ring shaped bottom of the hollow cylindrical base covering over the bottom opening;
a filter media within the hollow cylindrical base over the ring shaped bottom and the first mess netting;
potting soil within a portion of the filter media;
vegetation potted into a top of the filter media within the potting soil;
a cylindrical ring of a second mesh netting having a first circular-shaped edge coupled to the hollow cylindrical base near the circular-shaped edge thereof and a second circular-shaped edge forming an upper opening around the filter media and the vegetation;
a cinchable drawstring intertwined near a second circular-shaped edge of the cylindrical ring of the second mesh netting, the cinchable drawstring cinching the second circular-shaped edge together to close the upper opening to a smaller opening around the filter media and the vegetation; and
a pair of lifting straps coupled to the hollow cylindrical base of water permeable material opposing each other, the pair of lifting straps to ease lifting and carrying of the reusable flexible filter hand bag with the filter media, the potting soil, and the vegetation.

14. The reusable flexible filter hand bag of claim 13, further comprising:
a sealing disk of water permeable material in the hollow cylindrical base under the filter media and covering over the first mesh netting and the bottom opening.

15. The reusable flexible filter hand bag of claim 13, further comprising:
a sealing ring coupled to the hollow cylindrical base of water permeable material near the circular-shaped edge thereof.

16. The reusable flexible filter hand bag of claim 15, wherein:
the hollow cylindrical base of water permeable material includes a plurality of loops to receive a sealing tube to form the sealing ring coupled to the hollow cylindrical base.

17. The reusable flexible filter hand bag of claim 13, wherein:
the water permeable material is a woven plastic.

18. The reusable flexible filter hand bag of claim 13, wherein:
the first and the second mesh nettings are plastic mesh netting.

* * * * *